US012608024B1

(12) United States Patent
Thompson

(10) Patent No.: US 12,608,024 B1
(45) Date of Patent: Apr. 21, 2026

(54) AUTONOMOUS DRONE SWARM SYSTEM WITH AI-DRIVEN COORDINATION AND MULTI-MODAL SENSOR INTEGRATION

(71) Applicant: Drone Operations LLC, Mosinee, WI (US)

(72) Inventor: Nicholas Thompson, Mosinee, WI (US)

(73) Assignee: DRONE OPERATIONS LLC, Mosinee, WI (US)

( * ) Notice: Subject to any disclaimer, the term of this patent is extended or adjusted under 35 U.S.C. 154(b) by 0 days.

(21) Appl. No.: 19/262,766

(22) Filed: Jul. 8, 2025

(51) Int. Cl.
*G05D 1/698* (2024.01)
*G05B 13/02* (2006.01)
(Continued)

(52) U.S. Cl.
CPC ......... *G05D 1/6985* (2024.01); *G05B 13/027* (2013.01); *G05D 1/223* (2024.01); (Continued)

(58) Field of Classification Search
None
See application file for complete search history.

(56) References Cited

U.S. PATENT DOCUMENTS 6,904,335 B2 * 6/2005 Solomon ............. G05D 1/0088
700/262
9,524,648 B1 * 12/2016 Gopalakrishnan ...... G06F 21/00
(Continued)

OTHER PUBLICATIONS

Ayedmir, Fatih & Cetin, Aydin; "Multi-Agent Dynamic Area Coverage Based on Reinforcement Learning with Connected Agents", Computer Systems Science and Engineering, vol. 45, No. 1, pp. 215-230. Jun. 9, 2022, https://doi.org/10.32604/csse.2023.031116.

(Continued)

*Primary Examiner* — Jonathan M Dager
(74) *Attorney, Agent, or Firm* — GALVIN PATENT LAW LLC; Brian R. Galvin

(57) ABSTRACT

An autonomous drone swarm system and method utilizing artificial intelligence for coordinated operations comprises command drones equipped with large language model processors and subordinate drones coordinated through a hierarchical Queen-Worker architecture. The system processes natural language commands, generates autonomous mission plans, and coordinates multi-drone operations through an encrypted self-healing mesh communication network utilizing laser, radio frequency, and visual communication channels. Multi-modal sensor integration including electro-optical, infrared, LiDAR and photogrammetry, radio frequency, and chemical detection provides comprehensive environmental awareness while federated learning algorithms enable distributed coordination in signal-denied environments. The system implements configurable operational modes spanning tactical (15 minutes-2 hours over 2 to 5 square kilometers), operational (6-24 hours over 20 to 50 square kilometers), and strategic (7-30+days over 200 to 500 square kilometers) mission profiles for military and commercial applications. Fault-tolerant protocols ensure continued operation despite individual failures through automatic task redistribution and leader election procedures.

18 Claims, 30 Drawing Sheets

(51) Int. Cl.

| | | |
|---|---|---|
| *G05D 1/223* | (2024.01) | |
| *G05D 1/87* | (2024.01) | |
| *G06F 40/40* | (2020.01) | |
| *G05D 105/85* | (2024.01) | |
| *G05D 109/20* | (2024.01) | |

(52) U.S. Cl.
CPC .............. *G05D 1/87* (2024.01); *G06F 40/40* (2020.01); *G05D 2105/85* (2024.01); *G05D 2109/20* (2024.01)

(56) References Cited

U.S. PATENT DOCUMENTS

| | | | | |
|---|---|---|---|---|
| 10,025,303 | B1 * | 7/2018 | Annan | B64U 50/37 |
| 10,162,351 | B2 * | 12/2018 | Shaw | G05D 1/0027 |
| 10,310,518 | B2 * | 6/2019 | MacCready | G05D 1/104 |
| 10,694,529 | B2 * | 6/2020 | MacCready | H04W 8/005 |
| 10,909,859 | B1 * | 2/2021 | Dodd | G08G 5/53 |
| 11,237,877 | B2 * | 2/2022 | Anderson | G06F 9/45558 |
| 11,644,829 | B2 * | 5/2023 | Shaw | G05D 1/0027 |
| | | | | 701/2 |
| 11,721,030 | B2 * | 8/2023 | Liu | H04N 23/661 |
| | | | | 382/284 |
| 11,920,899 | B2 * | 3/2024 | Squillace | F41G 7/2253 |
| 11,958,183 | B2 * | 4/2024 | Zhang | B25J 9/1664 |
| 12,050,476 | B2 * | 7/2024 | Kang | G01S 13/765 |
| 12,366,854 | B2 * | 7/2025 | Venkatesh | G06Q 10/0631 |
| 2004/0030449 | A1 * | 2/2004 | Solomon | H04L 67/12 |
| | | | | 700/248 |
| 2014/0222248 | A1 * | 8/2014 | Levien | G08G 5/57 |
| | | | | 701/2 |
| 2015/0334768 | A1 * | 11/2015 | Ranasinghe | G06V 10/84 |
| | | | | 370/328 |
| 2016/0247404 | A1 * | 8/2016 | Srivastava | G08G 5/723 |
| 2016/0293018 | A1 * | 10/2016 | Kim | G08G 5/53 |
| 2017/0083979 | A1 * | 3/2017 | Winn | G06Q 20/102 |
| 2017/0131727 | A1 * | 5/2017 | Kurdi | G05D 1/0027 |
| 2017/0236428 | A1 * | 8/2017 | High | G08G 5/55 |
| | | | | 701/120 |
| 2018/0074520 | A1 * | 3/2018 | Liu | G08G 5/25 |
| 2018/0139152 | A1 * | 5/2018 | Shaw | H04W 84/18 |
| 2018/0247544 | A1 * | 8/2018 | Mustafic | H04W 48/08 |
| 2019/0355145 | A1 * | 11/2019 | Bruner | H04W 4/38 |
| 2023/0058405 | A1 * | 2/2023 | Chen | B64C 39/024 |
| 2023/0081963 | A1 * | 3/2023 | James | G05D 1/6985 |
| | | | | 701/2 |
| 2023/0086306 | A1 * | 3/2023 | Venkatesh | G08G 5/22 |
| | | | | 701/2 |
| 2023/0089776 | A1 * | 3/2023 | Venkatesh | B64U 10/13 |
| | | | | 701/3 |
| 2023/0091555 | A1 * | 3/2023 | Venkatesh | G08G 5/55 |
| | | | | 700/3 |
| 2023/0409054 | A1 * | 12/2023 | Bradley | G05D 1/106 |
| 2025/0208619 | A1 * | 6/2025 | Frey | G05D 1/2247 |
| 2025/0223036 | A1 * | 7/2025 | Venkatesh | B64C 39/024 |
| 2025/0224737 | A1 * | 7/2025 | Bohez | G06N 3/0499 |

OTHER PUBLICATIONS

Cai, Xuli, et al; "Multi-Agent Deep Reinforcement Learning for Optimized Multi-UAV Coverage and Power-Efficient UE Connectivity", arXiv:2503.23669v1, Mar. 31, 2025.

Chan, Brian J. et al; "Don't Do RAG: When Cache-Augmented Generation is All You Need for Knowledge Tasks", arXiv:2412.15605v2, Feb. 23, 2025.

Dewi, Maya Utami, et al; "Optimizing AI Performance in Industry: A Hybrid Computing Architecture Approach Based on Big Data", Journal of Technology Informatics and Engineering, 3(3), pp. 308-323, Dec. 12, 2024.

Goecks, Vinicius G. & Waytowich, Nicholas; "COA-GPT: Generative Pre-trained Transformers for Accelerated Course of Action Development in Military Operations", arXiv:2402.01786v2, Mar. 28, 2024.

Hoang, Duc N. M., et al; "Clustered and Scalable Federated Learning Framework for UAV Swarms". TechRxiv. May 4, 2023.

Lewis, Patrick, et al; "Retrieval-Augmented Generation for Knowledge-Intensive NLP Tasks", arXiv:2005.11401v4, Apr. 12, 2021.

Lin, Chin-Yew; "Rouge: A Package for Automatic Evaluation of Summaries", In Proceedings of Workshop on Text Summarization Branches Out, Post-Conference Workshop of ACL 2004, Barcelona, Spain.

Reddy, Revanth Gangi, et al; "SmartBook: AI-Assisted Situation Report Generation for Intelligence Analysts" arXiv:2303.14337v3, May 27, 2024.

Spitzer, Philipp, et al; "Looking Through the Deep Glasses: How Large Language Models Enhance Explainability of Deep Learning Models." In Proceedings of Mensch und Computer 2024 (MuC '24). Sep. 1-4, 2024, Association for Computing Machinery, New York, NY, USA, pp. 566-570. https://doi.org/10.1145/3670653.3677488.

Yang, Xinyu, et al; "APE: Faster and Longer Context-Augmented Generation via Adaptive Parallel Encoding", arXiv:2502.05431v2, Feb. 12, 2025.

Zhao, Ji & Lin, Xiao; "General-Purpose Aerial Intelligent Agents Empowered by Large Language Models", arXiv:2503.08302v1, Mar. 11, 2025.

\* cited by examiner

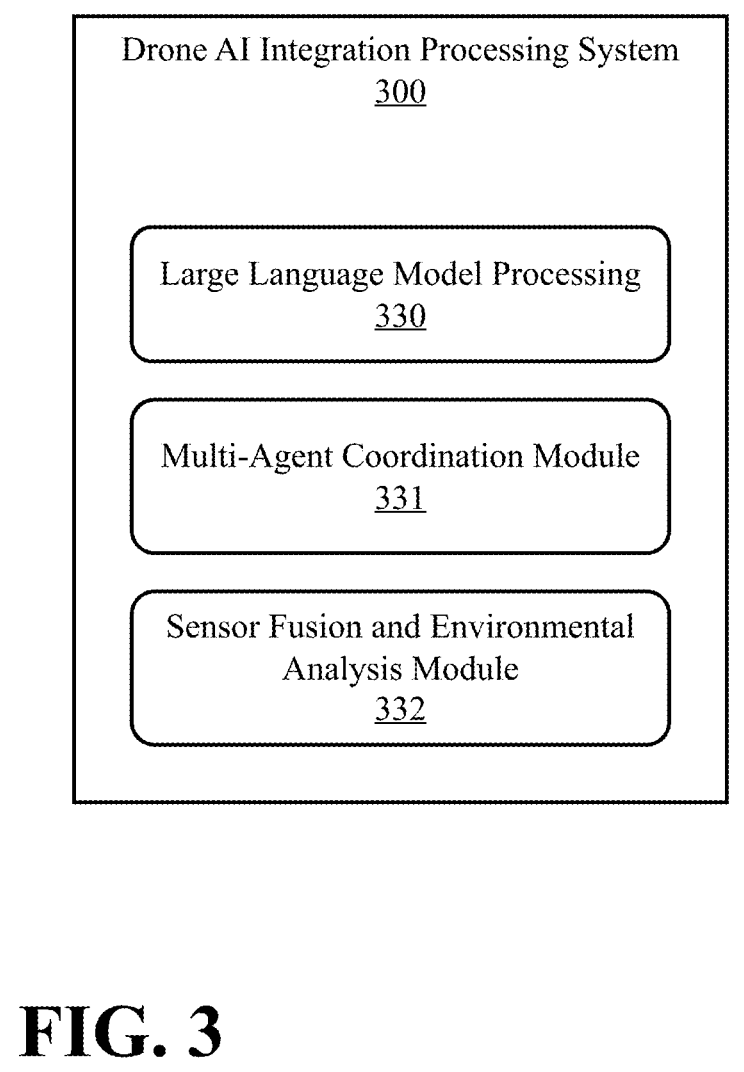

Drone AI Integration Processing System
300

Large Language Model Processing
330

Multi-Agent Coordination Module
331

Sensor Fusion and Environmental
Analysis Module
332

FIG. 3

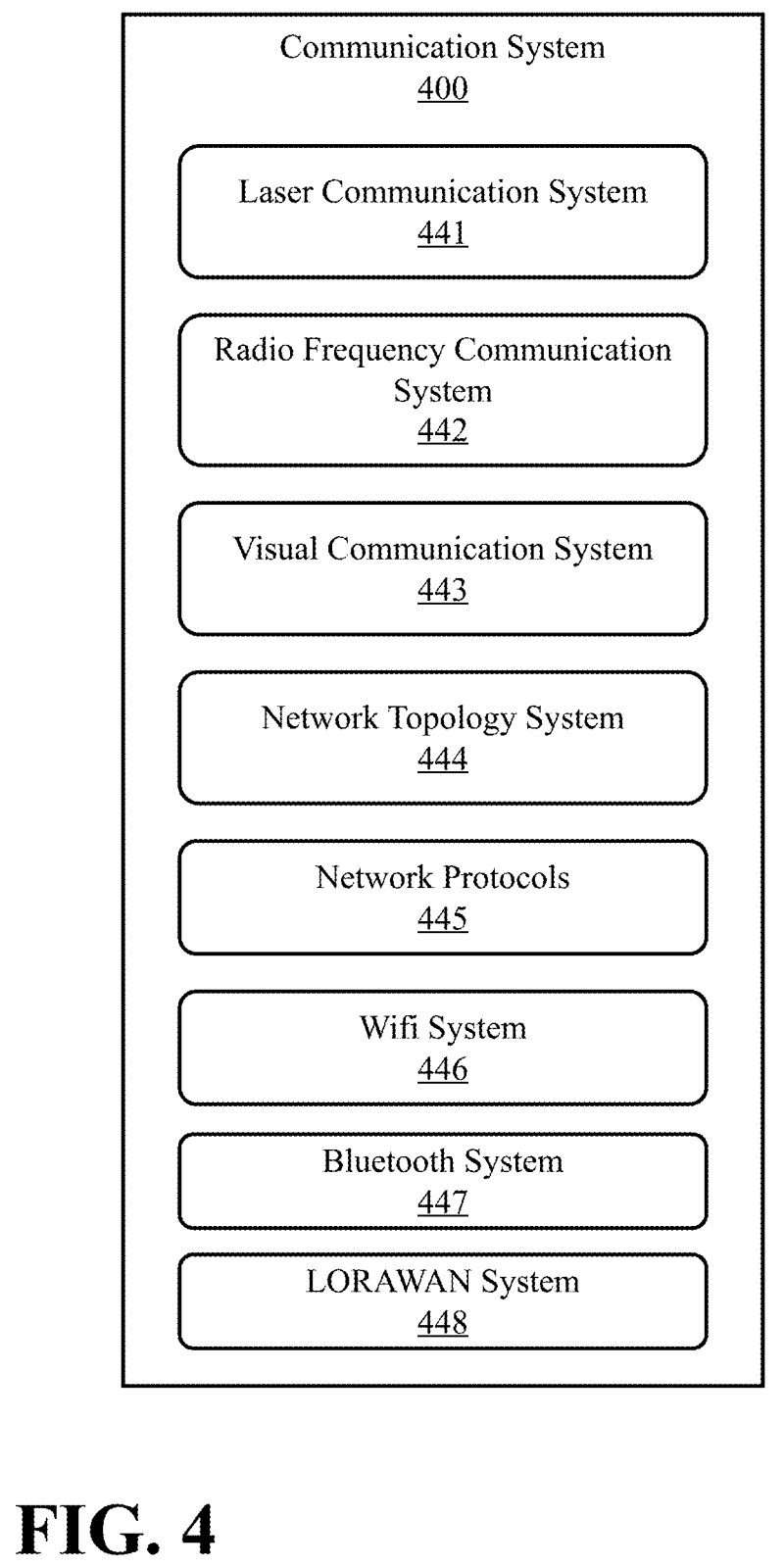

Communication System
400

Laser Communication System
441

Radio Frequency Communication
System
442

Visual Communication System
443

Network Topology System
444

Network Protocols
445

Wifi System
446

Bluetooth System
447

LORAWAN System
448

FIG. 4

Breach overwatch mission configuration
1100

Vertical racetrack pattern establishment
1101

Real-time intelligence feed to ground
forces
1102

Muzzle flash detection and fire
coordination
1103

Breach complete
1104

Landing zone survey mission initialization
1200

Multi-drone swarm deployment and assessment
1201

Automated site scoring and classification
1202

Approved zone marking and guidance
1203

Aircraft support
1204

Deep fires mission initialization and deployment
1400

Extended range target acquisition
1401

High-payoff target normalization and validation
1402

Digital fire mission coordination and BDA
1403

24-hour cycle handoff and continuity
1404

Maritime surveillance mission
establishment
1800

Hybrid air/sea swarm deployment
1801

Vessel identification and classification
1802

Naval asset cueing and coordination
1803

Continuous maritime domain awareness
1804

AUTONOMOUS DRONE SWARM SYSTEM WITH AI-DRIVEN COORDINATION AND MULTI-MODAL SENSOR INTEGRATION

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention relates to unmanned aerial vehicle systems, and more particularly to autonomous drone swarms employing artificial intelligence for coordinated operations, natural language command processing, and agentic, multi-modal sensor integration.

Discussion of the State of the Art

Conventional drone systems typically operate as individual units requiring direct human control or simple pre-programmed flight paths. While some multi-drone systems exist, they generally lack sophisticated autonomous coordination capabilities and require constant operator oversight. Existing swarm systems face significant limitations in contested or GPS-denied environments, suffer from communication vulnerabilities, and cannot adapt dynamically to changing mission requirements or environmental conditions.

Current drone swarm technologies also lack integration with advanced artificial intelligence (AI) systems, particularly large language models (LLMs), which could enable natural language command processing and advanced decision-making capabilities. Furthermore, existing systems do not provide the hierarchical coordination structure necessary for scalable operations, nor do they offer the multi-modal sensor fusion required for comprehensive situational awareness in complex environments.

What is needed is an autonomous drone swarm system that can operate with minimal human oversight, adapt to changing conditions, process natural language commands, and maintain communication and coordination in contested environments while providing comprehensive intelligence, surveillance, and reconnaissance (ISR) capabilities.

SUMMARY OF THE INVENTION

Accordingly, the inventor has conceived and reduced to practice, an autonomous drone swarm system and method utilizing artificial intelligence for coordinated operations which comprises command drones equipped with large language model processors and subordinate drones coordinated through a hierarchical Queen-Worker architecture. The command drone (i.e., Queen) processes natural language commands from human operators, generates structured mission plans, and delegates tasks to subordinate drones (i.e., Workers) based on their capabilities and positions. It defines "what" needs to be done (e.g., fly in a V-formation, survey an area) without specifying the detailed execution. Each Worker autonomously determines "how" to execute its assigned tasks using its onboard processing capabilities. This can include managing its flight path, avoiding obstacles, and adapting to environmental changes while adhering to the Queen's mission parameters. The Queen dynamically assigns tasks to Workers based on mission requirements and real-time drone status. For instance, it might allocate a specific Worker to a position in the swarm or a surveillance task, adjusting assignments as conditions change. Workers handle approximately 80% (for example) of their flight control independently, based on their mission parameters and environmental context. The remaining 20% is guided by the Queen's directives, particularly for maintaining swarm formation and relative positioning. For example, if the Queen instructs a V-formation, a Worker might be tasked to stay 45 degrees off the port wing of the drone ahead, within 30 meters, adjusting its flight dynamically to comply. Workers maintain their assigned positions in the swarm (e.g., in complex formations like a V or grid) as directed by the Queen, using real-time sensor data to adjust their flight paths and ensure cohesive operation. This relationship balances centralized planning by the Queen with decentralized execution by the Workers, enabling efficient and adaptive swarm behavior. The system's design ensures that Workers retain significant autonomy while aligning with the Queen's high-level coordination.

The system processes natural language commands, generates autonomous mission plans, and coordinates multi-drone operations through an encrypted self-healing mesh communication network utilizing laser, radio frequency, and visual communication channels. Multi-modal sensor integration including, but not limited to, electro-optical, infrared, light detection and ranging (LiDAR) and photogrammetry, radio frequency, and chemical detection provides comprehensive environmental awareness while federated learning algorithms enable distributed coordination in signal-denied environments. The system implements configurable operational modes spanning tactical (e.g., spanning time ranges of 15 minutes-2 hours and/or covering a space of 2 to 5 square kilometers), operational (e.g., spanning time ranges of 6-24 hours and/or covering a space of 20 to 50 square kilometers), and strategic (e.g., spanning time ranges of 7-30+days and/or covering a space of 200 to 500 square kilometers) mission profiles for military and commercial applications. Fault-tolerant protocols ensure continued operation despite individual failures through automatic task redistribution and leader election procedures.

According to a preferred embodiment, an autonomous drone swarm system is disclosed, comprising: at least one command drone comprising an artificial intelligence processor configured to: process natural language commands from human operators into structured mission parameters; autonomously generate mission plans based on environmental analysis and available drone resources; and delegate tasks among subordinate drones based on drone capabilities and positioning; a plurality of subordinate drones, each comprising autonomous processing capabilities for coordinated task execution; a multi-modal communication system establishing encrypted communication links between drones using at least two different communication modalities to form a self-healing mesh network; a distributed sensor integration system comprising multiple sensor types across the command drone and subordinate drones providing environmental awareness and target detection capabilities; hierarchical coordination algorithms wherein: the command drone processes natural language operator inputs and generates executable mission plans; specific tasks are automatically assigned to subordinate drones based on mission requirements and drone status; and real-time mission adaptation occurs based on environmental changes and operational feedback; fault-tolerant operation protocols maintaining system coordination despite individual drone failures through automatic task redistribution and dynamic role reassignment.

According to another preferred embodiment, a method for autonomous drone swarm coordination is disclosed, comprising the steps of: processing natural language commands from human operators into structured mission parameters at a command drone using artificial intelligence algorithms; autonomously generating mission plans based on environmental analysis and available drone resources; delegating tasks among a plurality of subordinate drones based on drone capabilities and positioning within a hierarchical command structure; establishing encrypted communication links between drones using at least two different communication modalities to form a self-healing mesh network; integrating sensor data from multiple sensor types distributed across the command drone and subordinate drones to provide environmental awareness and target detection capabilities; implementing hierarchical coordination algorithms wherein: the command drone processes natural language operator inputs and generates executable mission plans; specific tasks are automatically assigned to subordinate drones based on mission requirements and current drone operational status; and real-time mission adaptation occurs based on environmental changes and operational feedback; maintaining system coordination despite individual drone failures through automatic task redistribution and dynamic role reassignment; and executing assigned tasks autonomously at subordinate drones while maintaining coordination with command drone mission objectives.

According to a further aspect, the method includes processing natural language commands comprising the steps of: detecting input modality from voice commands, text instructions, or gesture recognition inputs; implementing large language model processing to interpret high-level operator directives; analyzing current environmental conditions and available swarm resources through contextual awareness algorithms; and converting operator directives into executable mission parameters based on operational context and resource availability.

According to a further aspect, the method includes establishing encrypted communication links comprising the steps of: configuring wireless fidelity communication channels for high-throughput local networking and rapid data exchange with existing network infrastructure; implementing radio frequency communication using software-defined radio transceivers with frequency-hopping spread spectrum protocols, Low Power Wide Area Network protocols for extended range communication, and Long Range Wide Area Network protocols for low-power long-range telemetry; establishing laser fidelity optical communication channels utilizing modulated laser transmission with automatic beam steering and atmospheric compensation for secure line-of-sight operations; activating light fidelity communication channels using visible and near-infrared light modulation for covert, low-signature coordination messaging; configuring Bluetooth communication channels providing short-range protocols for local device integration and maintenance operations; and implementing visual communication channels using light emitting diode pattern generation and computer vision recognition algorithms; wherein the method further comprises executing Primary, Alternate, Contingency, Emergency protocol hierarchy procedures including conditional fallback logic and dynamic protocol adaptation based on terrain constraints, threat assessment, and mission requirements.

According to a further aspect, the method includes implementing hierarchical coordination protocols comprising the steps of: establishing Queen-Worker coordination architecture with each command drone managing one or more subordinate drones; enabling collaboration between multiple command drones for larger operational areas; implementing distributed consensus algorithms for automatic leader election when command drones become unavailable; and maintaining coordination hierarchy while adapting to changing operational requirements and drone availability.

According to a further aspect, the method includes integrating sensor data comprising the steps of: collecting visual surveillance data from electro-optical cameras for target identification; gathering thermal imaging data from infrared systems for night operations and heat signature detection; obtaining three-dimensional environmental mapping data from light detection and ranging and photogrammetry systems for obstacle detection; monitoring for nuclear, biological, and chemical threats using specialized detection sensors; and fusing multi-modal sensor data to create comprehensive environmental awareness and threat assessment.

According to a further aspect, the method includes configuring operational modes by: implementing tactical operations with operator-configurable time duration and spatial coverage parameters optimized for immediate response scenarios and localized coordination requirements; executing operational missions with operator-configurable temporal and spatial parameters optimized for sustained regional coverage and persistent surveillance requirements; conducting strategic deployments with operator-configurable mission duration and geographic area parameters optimized for long-term autonomous operations across extensive areas with automated logistics coordination; dynamically adjusting operational parameters based on mission requirements, available resources, and environmental conditions; and optimizing space-time trade-offs by concentrating force deployment within defined spatial areas to reduce mission duration or extending coverage areas for sustained operations based on operational objectives.

According to a further aspect, the method includes maintaining system coordination despite individual drone failures comprises the steps of: continuously monitoring health status including communication connectivity, hardware performance, and navigation accuracy of all drone platforms; automatically detecting equipment failures and operational problems using anomaly detection algorithms; redistributing tasks from failed drones to operational platforms while maintaining mission continuity; and activating emergency communication protocols when primary coordination systems become unavailable.

According to a further aspect, the method includes implementing federated learning by: generating machine learning model weight updates at subordinate drones based on local operational experience and sensor data analysis; transmitting compressed model parameter updates to the command drone without sending raw sensor data; aggregating learning updates from multiple subordinate drones at the command drone to improve overall swarm artificial intelligence capabilities; and distributing updated artificial intelligence models back to subordinate drones to enhance swarm-wide performance.

According to a further aspect, the method includes autonomous navigation by: obtaining precision positioning using global positioning system (GPS) or global navigation satellite system receivers with anti-jamming capabilities in standard operational environments; maintaining navigation capability in GPS-denied environments using inertial navigation systems for baseline positioning; implementing on-board computation and correction procedures comprising: preloading local maps of operational areas including terrain elevation data, obstacle locations, and geographic reference points; establishing last known reliable position as navigation baseline; continuously processing real-time telemetry data including altitude measurements, speed and acceleration data, bearing information, and wind correction factors; and calculating position updates by correlating movement data with preloaded geographic features and landmarks; executing collaborative navigation protocols by: sharing computed position data and telemetry measurements across the mesh communication network; implementing distributed position verification and drift correction algorithms; and enhancing individual drone positioning accuracy through swarm-wide data fusion; and analyzing terrain characteristics using preloaded map data combined with real-time environmental assessment to identify optimal vantage points and tactical positioning locations.

According to a further aspect, the method includes performing real-time mission adaptation comprises the steps of: continuously monitoring environmental conditions and threat levels using distributed sensor networks; dynamically optimizing resource allocation and task assignments based on current drone availability and performance status; automatically repositioning drones and modifying coverage patterns based on changing mission requirements and tactical conditions; and updating mission parameters and operational objectives while maintaining overall mission effectiveness and swarm coordination.

BRIEF DESCRIPTION OF THE DRAWING FIGURES

FIG. 3 is a block diagram illustrating an artificial intelligence integration architecture, according to an embodiment.

FIG. 4 is a block diagram illustrating an exemplary communication architecture for the multi-modal communication systems, encryption protocols, and mesh network topology that enable resilient coordination and data, according to an embodiment.

Figure 5A:
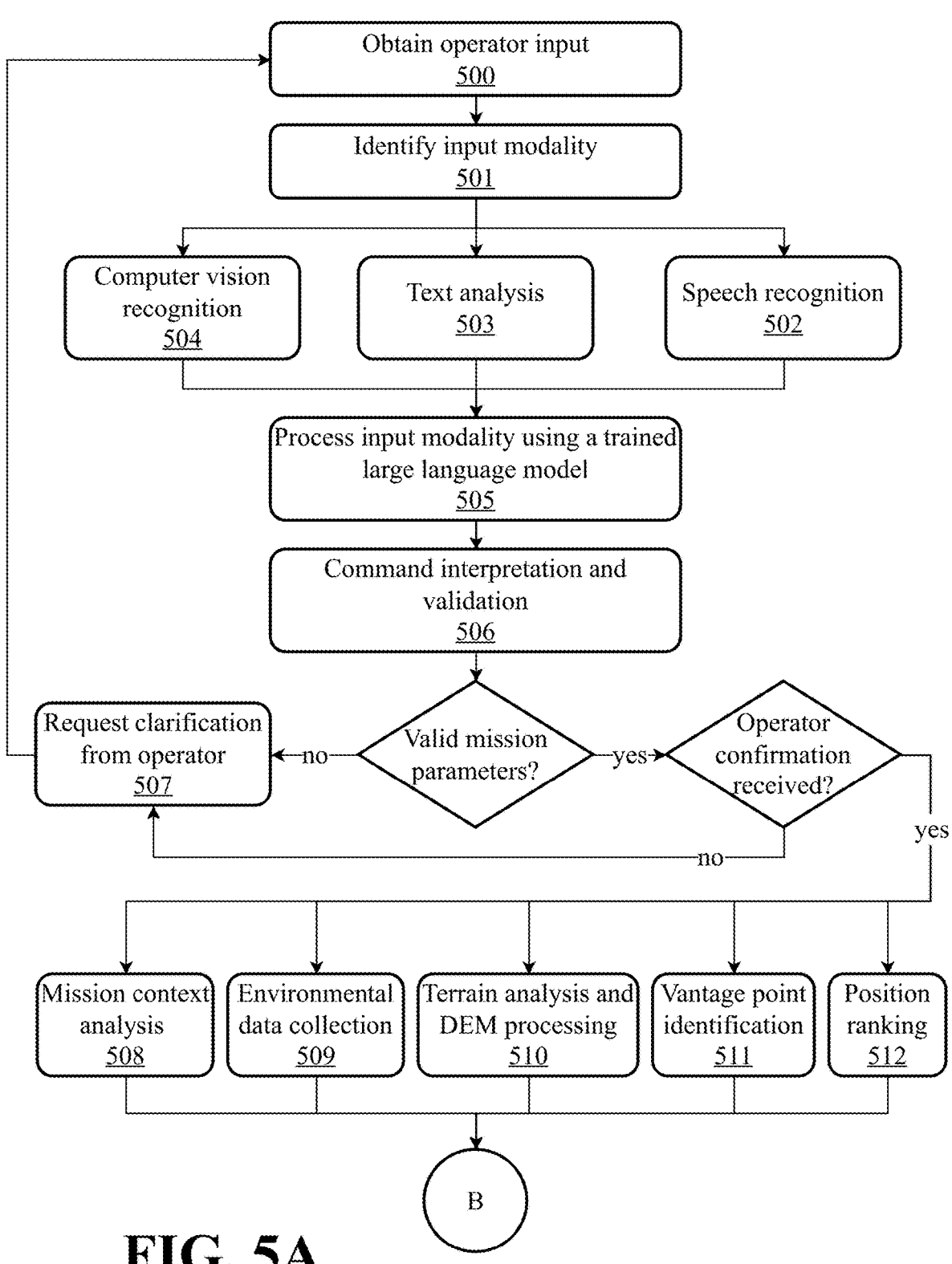
Figure 5B:
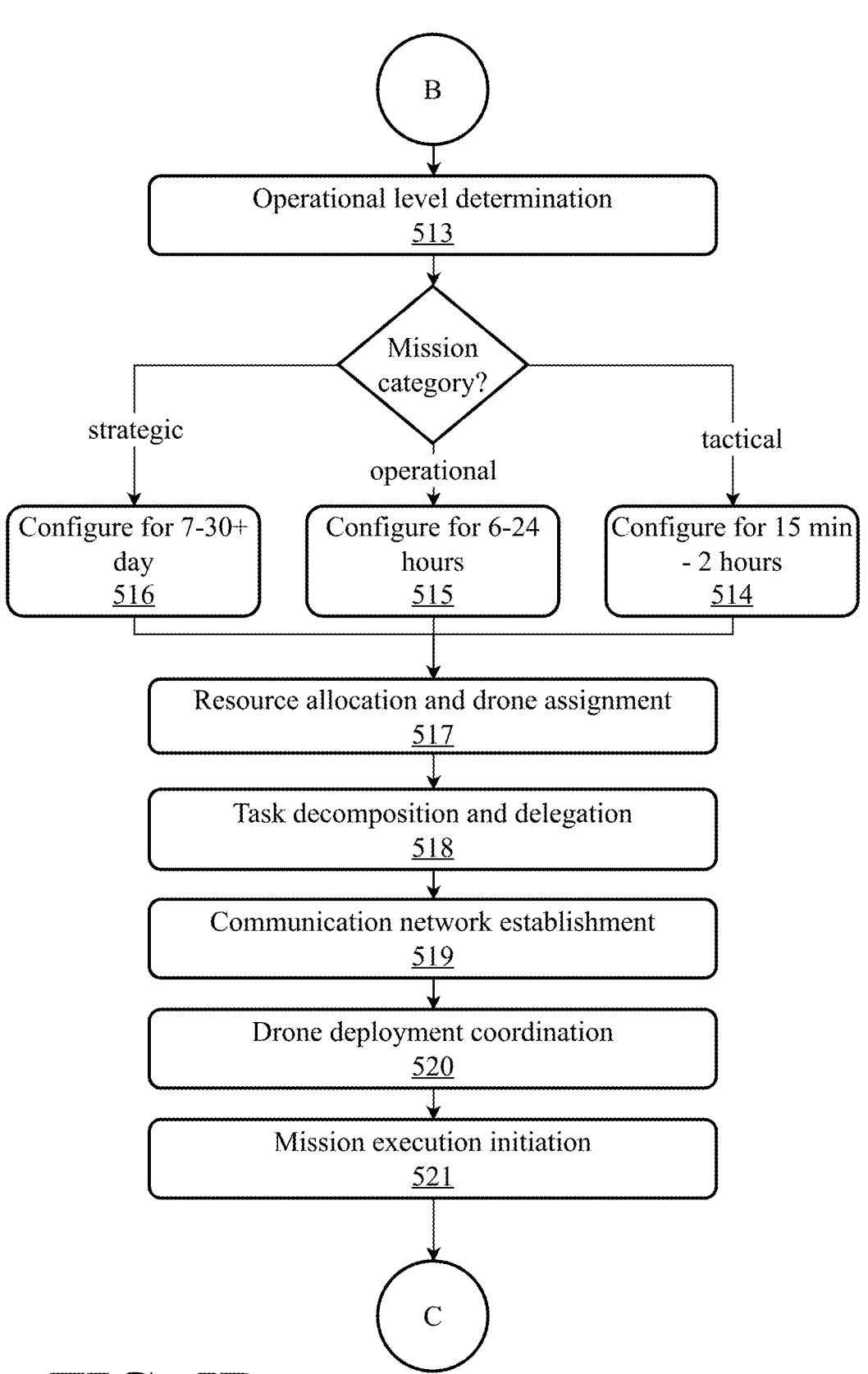
Figure 5C:
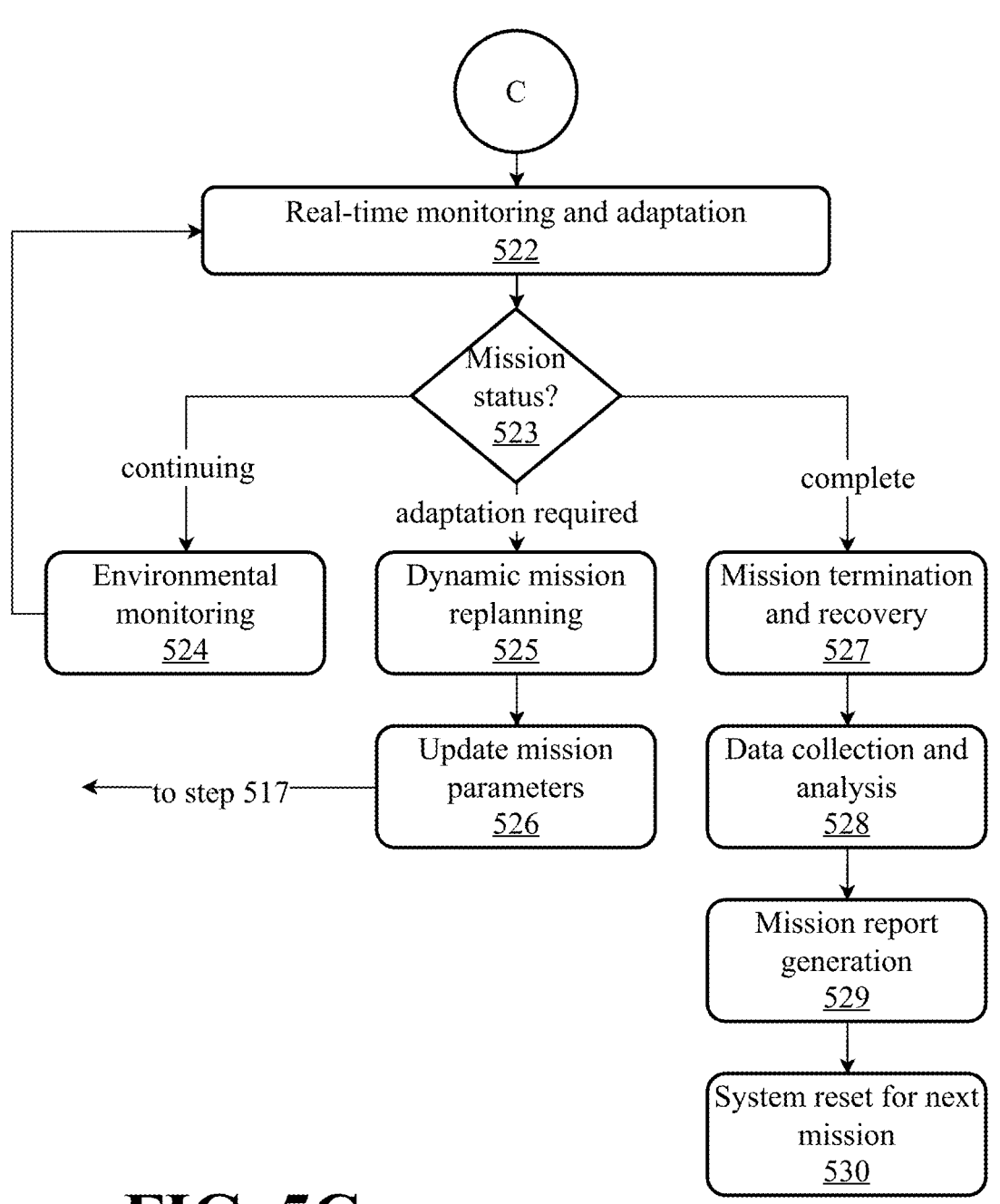

FIGS. 5A, 5B, and 5C illustrate a flow diagram of an exemplary method for autonomous mission planning and deployment implemented by the autonomous drone swarm system, according to an embodiment.

Figure 6A:
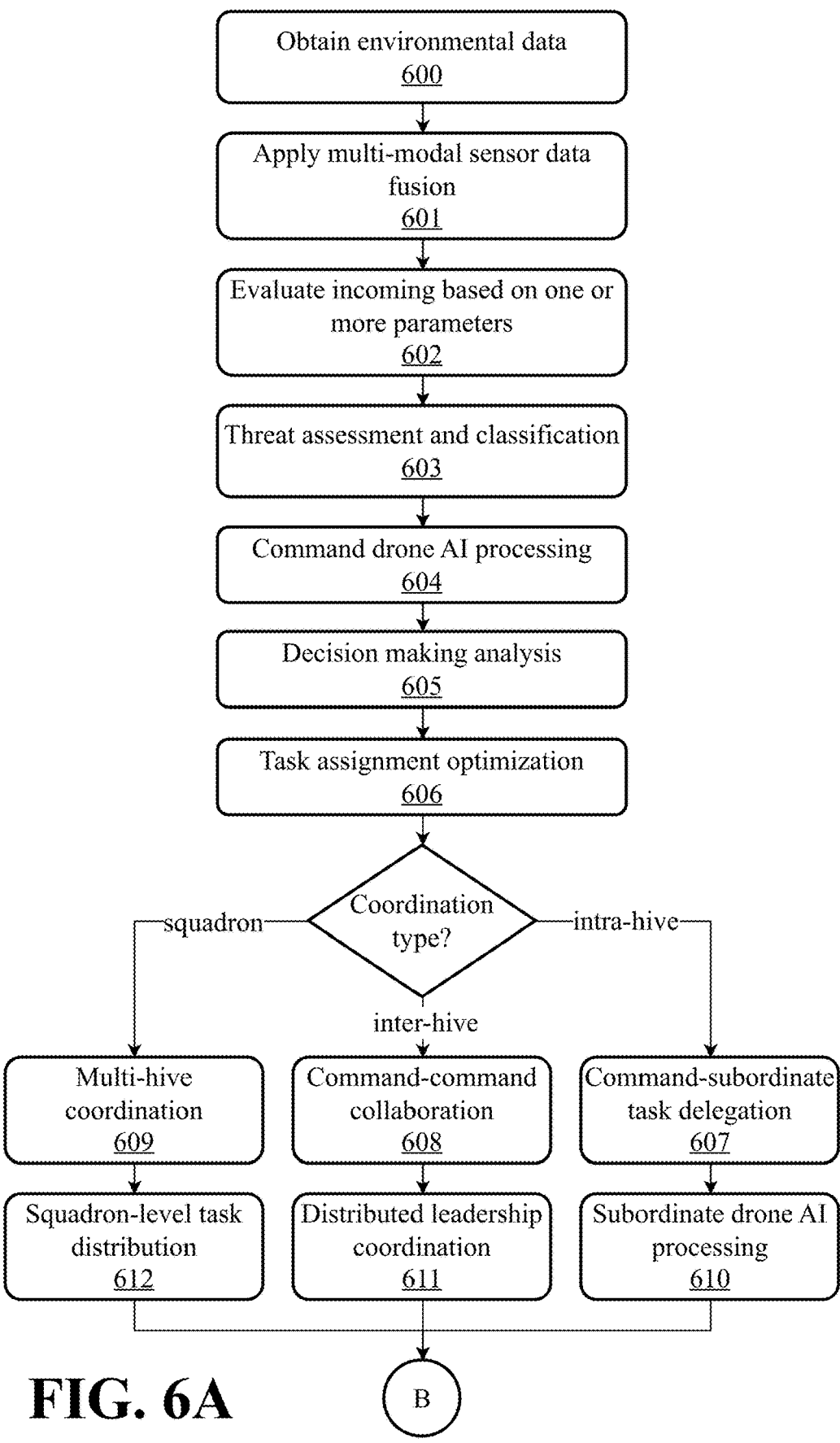
Figure 6B:
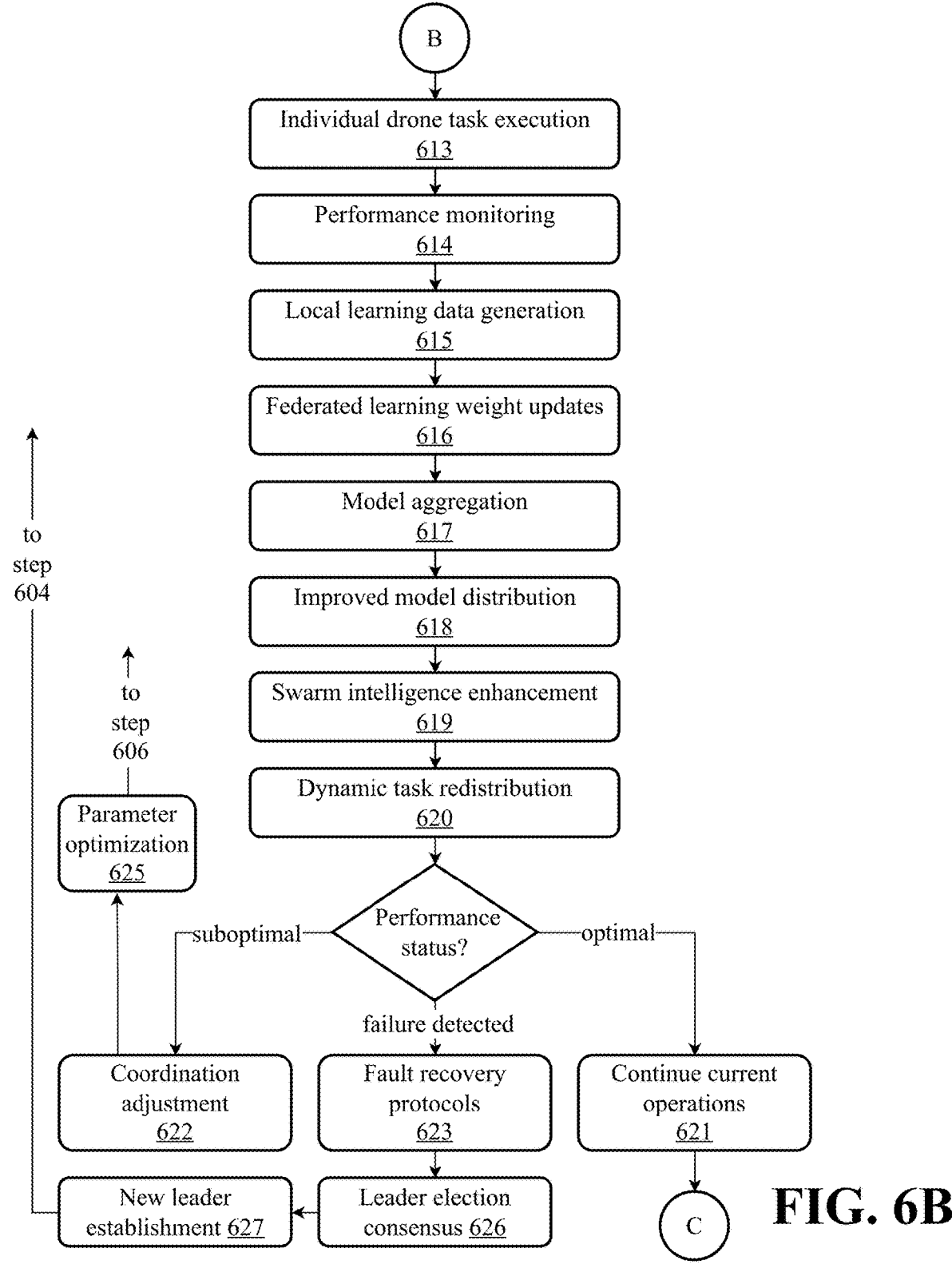
Figure 6C:
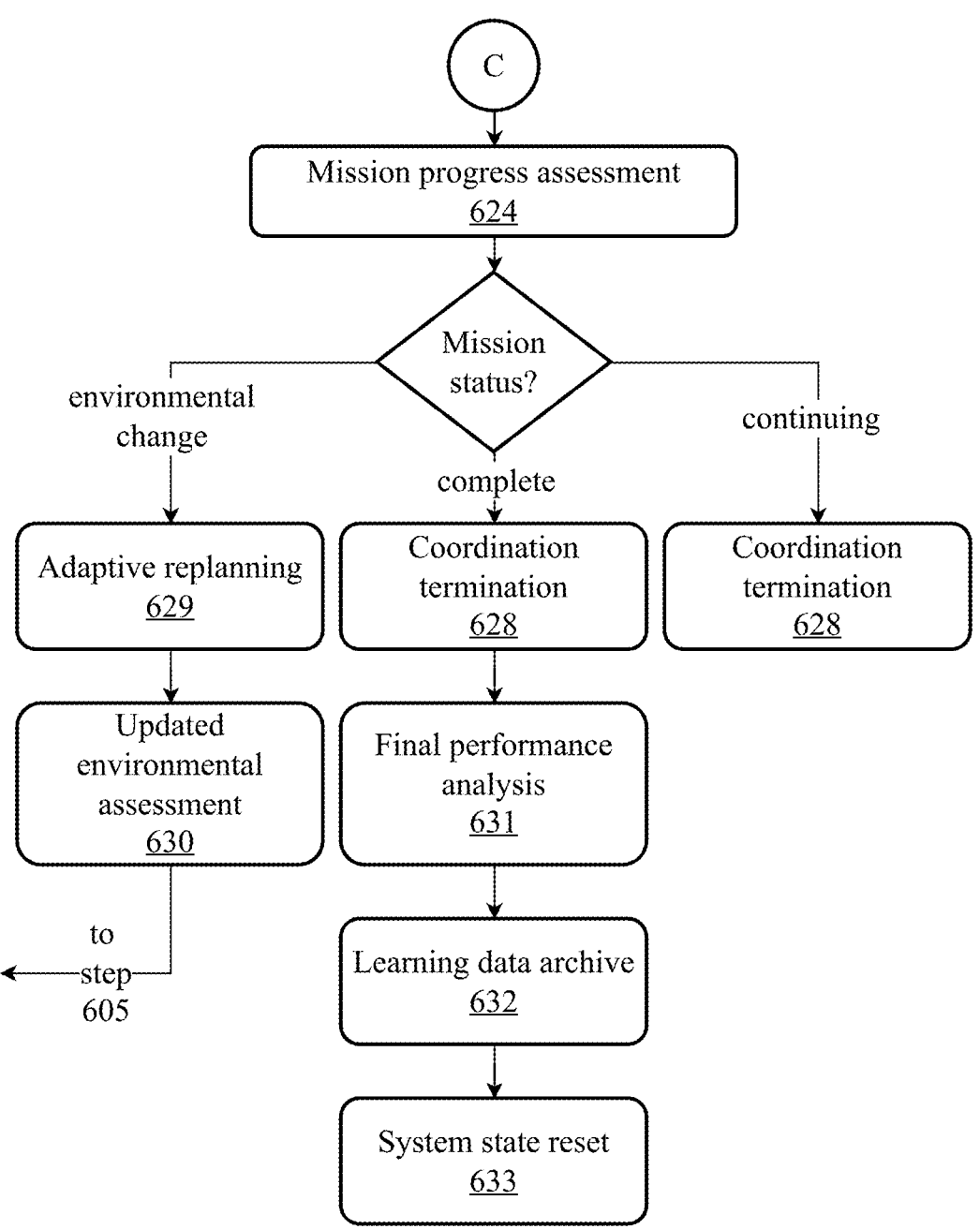

FIGS. 6A, 6B, and 6C illustrate a flow diagram of an exemplary method for multi-agent coordination and decision-making in the autonomous drone swarm system, according to an embodiment.

Figure 7A:
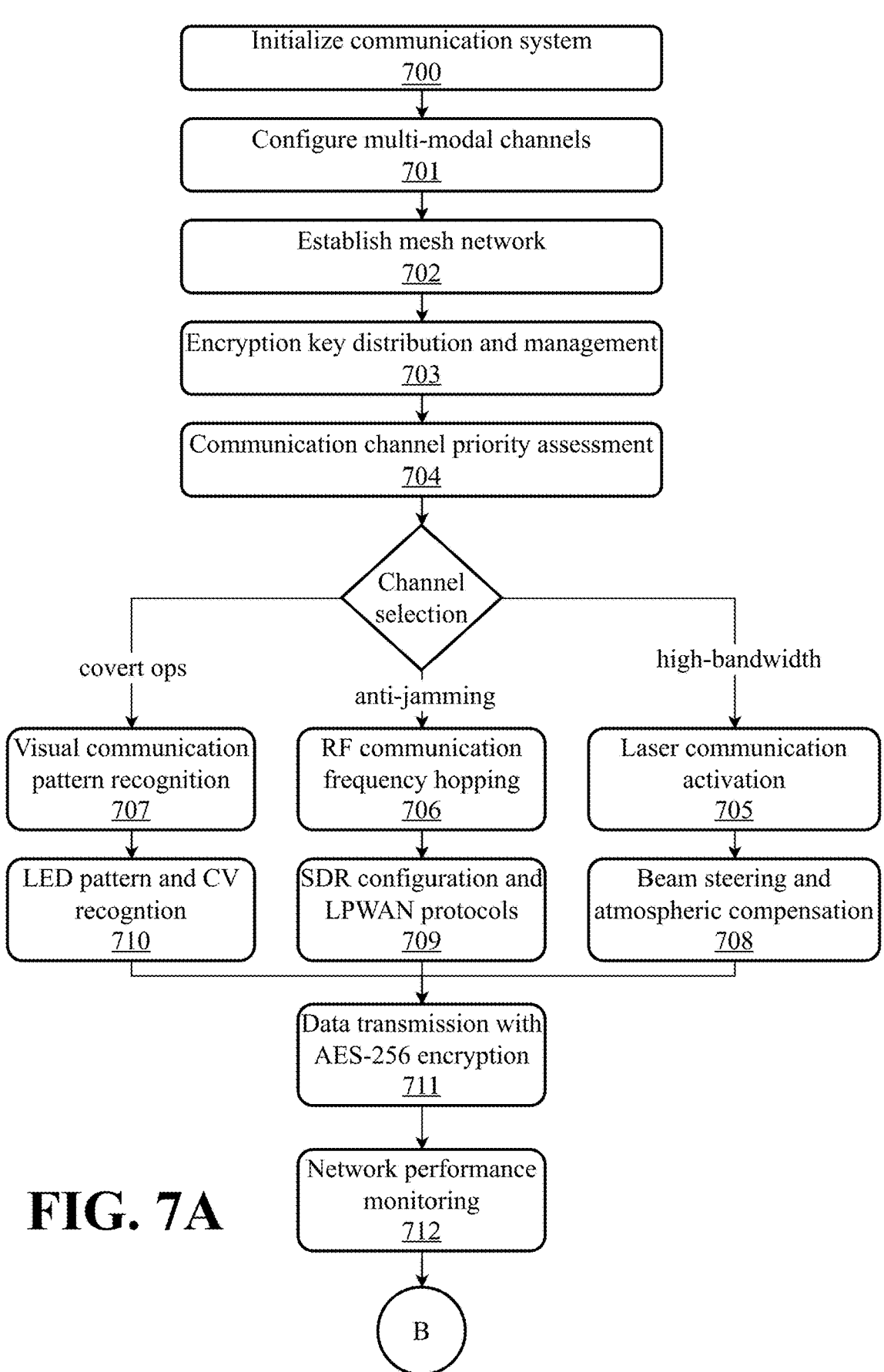
Figure 7B:
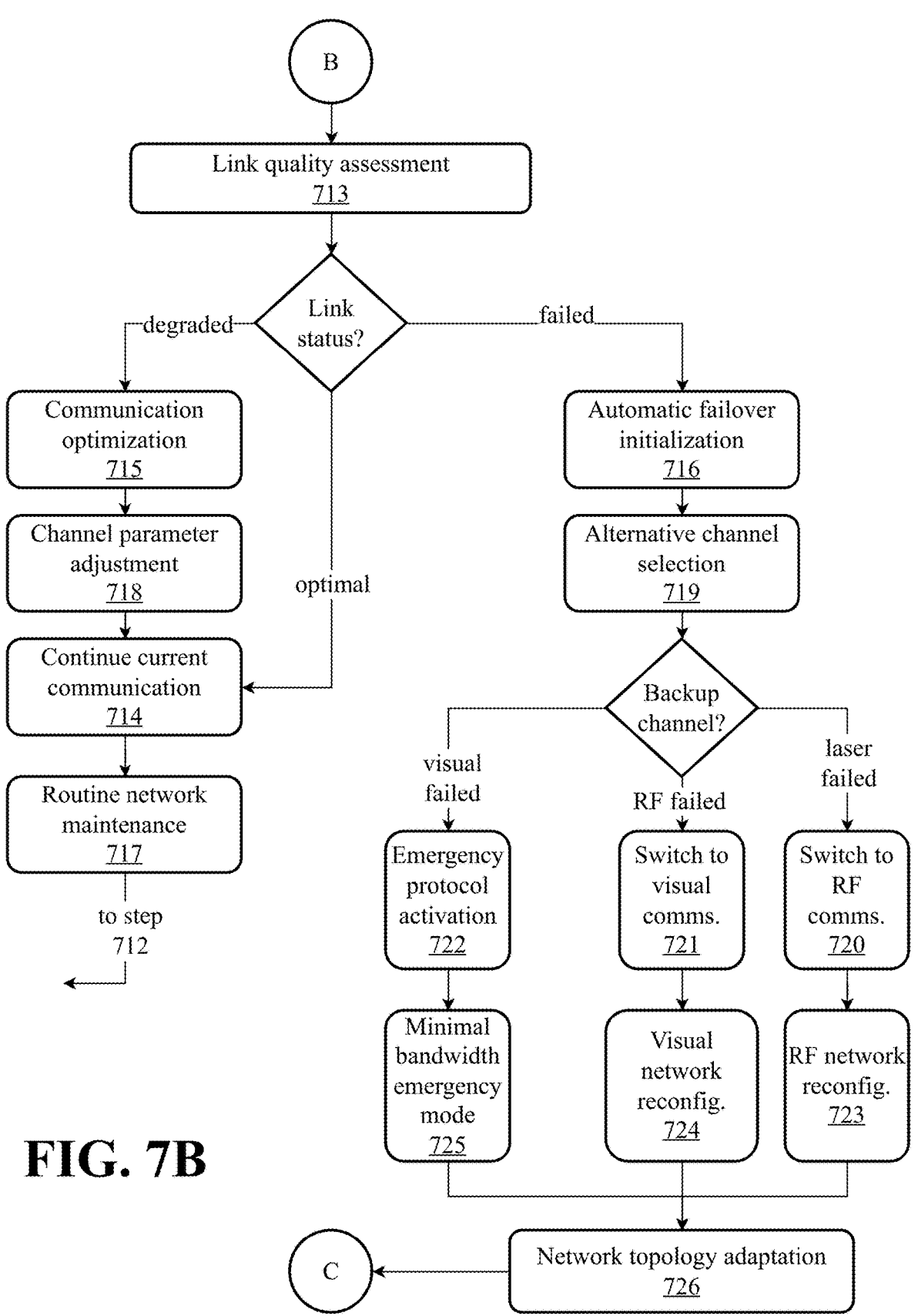
Figure 7C:
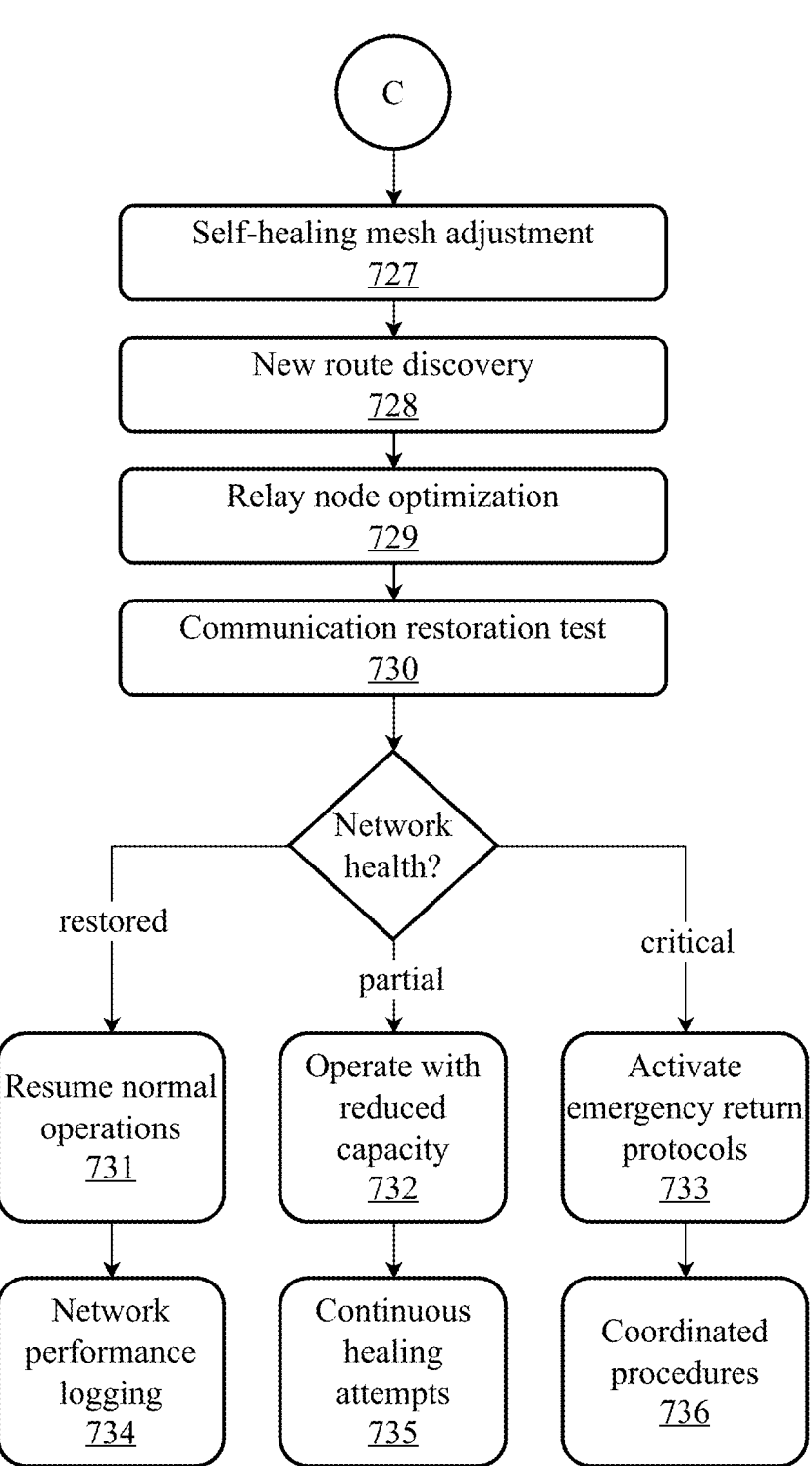

FIGS. 7A, 7B, and 7C illustrate a flow diagram of an exemplary method for multi-modal communication and network healing, according to an embodiment.

Figure 8:
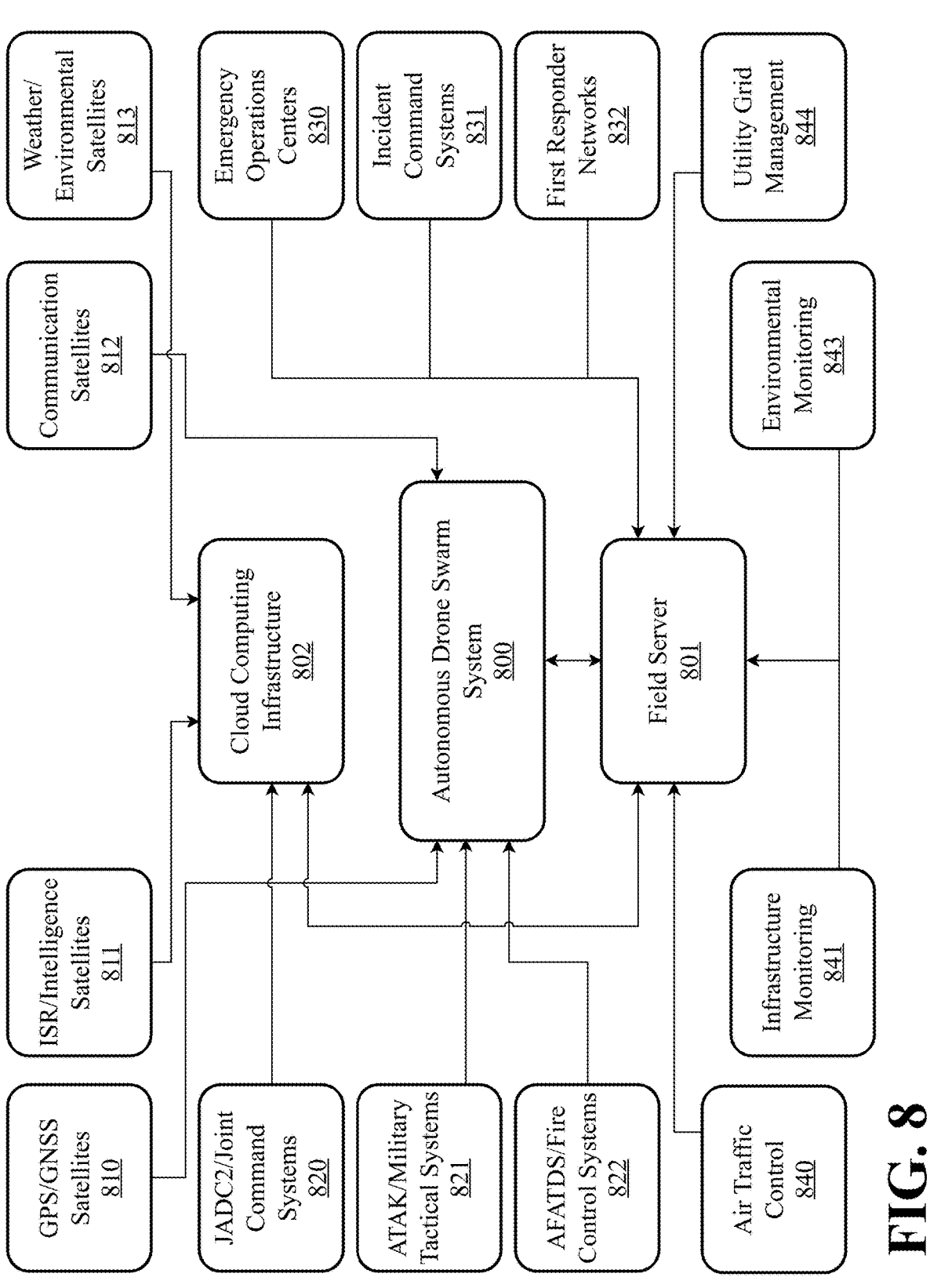

FIG. 8 is a block diagram illustrating exemplary external system connectivity and data exchange capabilities of the autonomous drone swarm system, according to an embodiment.

Figure 9A:
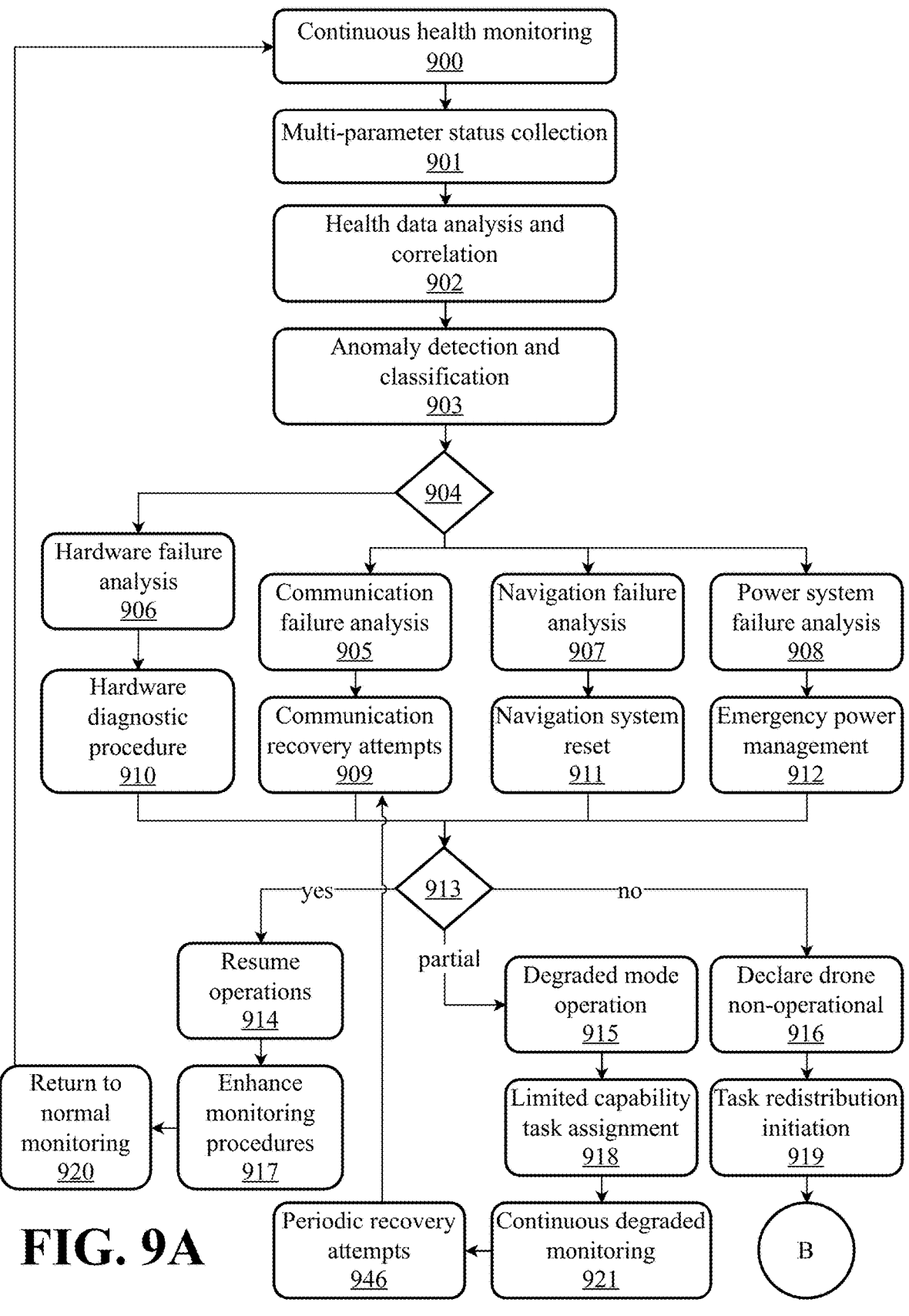
Figure 9B:
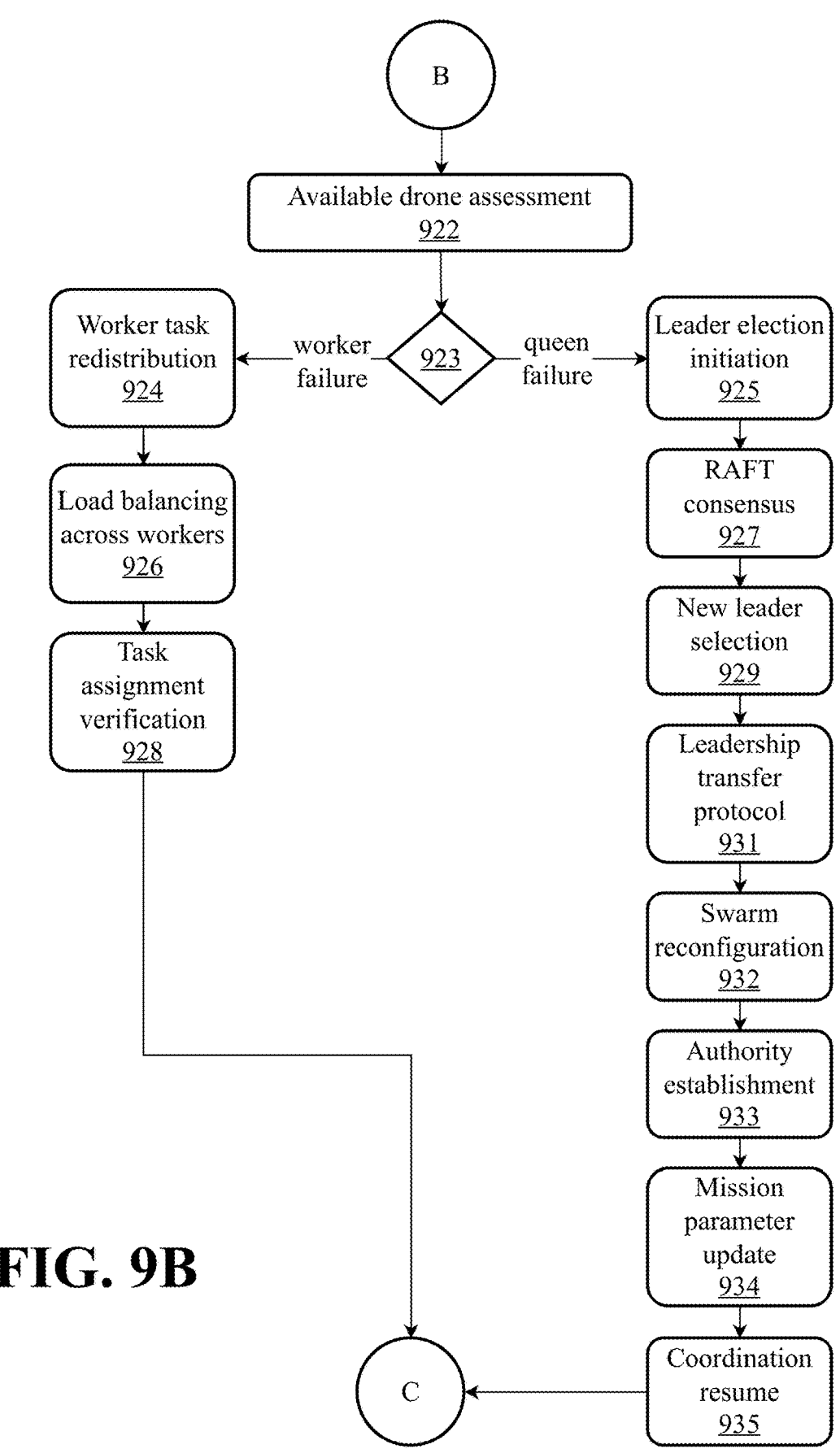
Figure 9C:
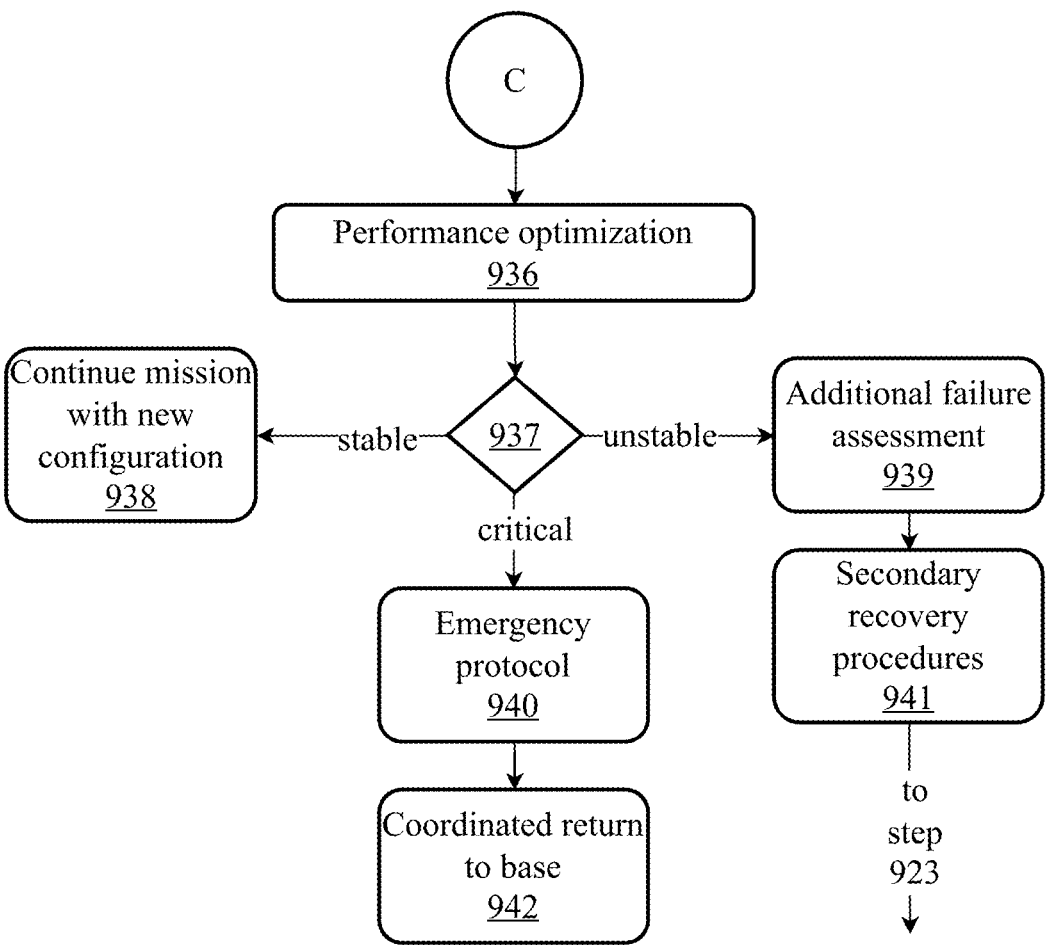

FIGS. 9A, 9B, and 9C illustrate a flow diagram of an exemplary method for drone failure detection and recovery, according to an embodiment.

Figure 10:
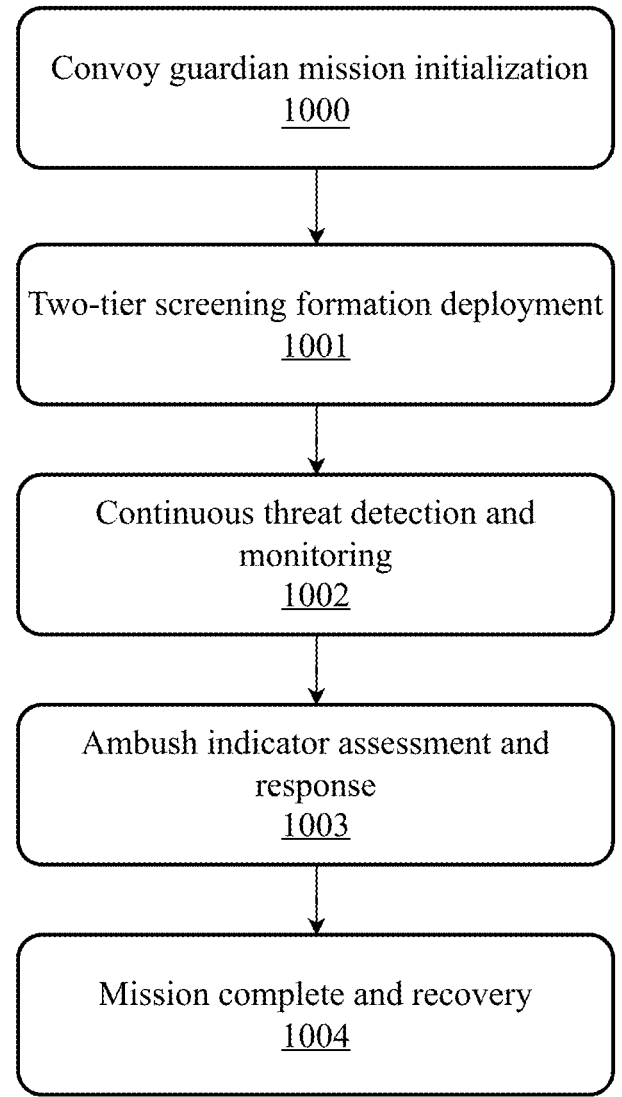

FIG. 10 is a flow diagram illustrating an exemplary method for implementing a "Convoy Guardian" operational mode implemented by the autonomous drone swarm, according to an embodiment.

Figure 11:
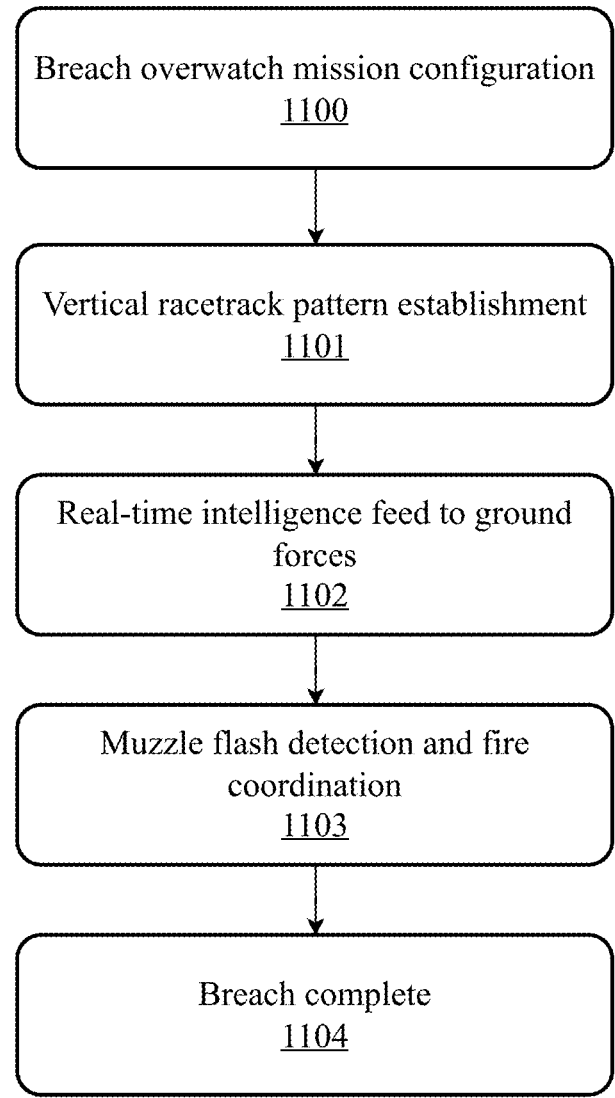

FIG. 11 is a flow diagram illustrating an exemplary method for implementing a "Point-of-Breach Overwatch" operational mode implemented by the autonomous drone swarm system, according to an embodiment.

Figure 12:
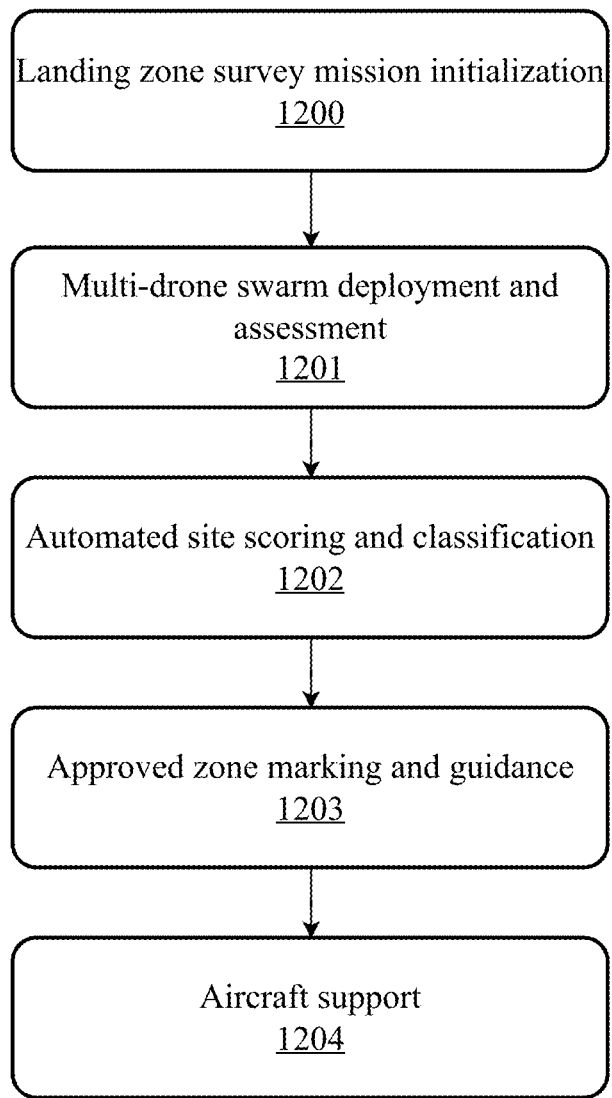

FIG. 12 is a flow diagram illustrating an exemplary method for implementing a "HLZ/DZ Survey" operational mode implemented by the autonomous drone swarm, according to an embodiment.

Figure 13:
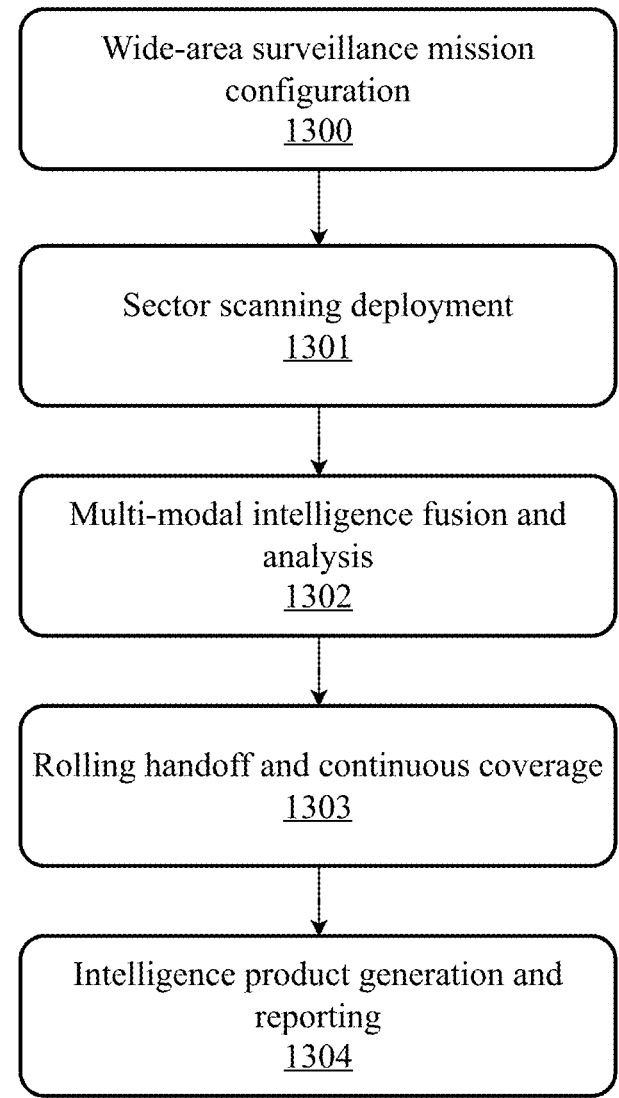

FIG. 13 is a flow diagram illustrating an exemplary method for implementing a "Wide-Area Sentinel" operational mode implemented by the autonomous drone swarm system, according to an embodiment.

Figure 14:
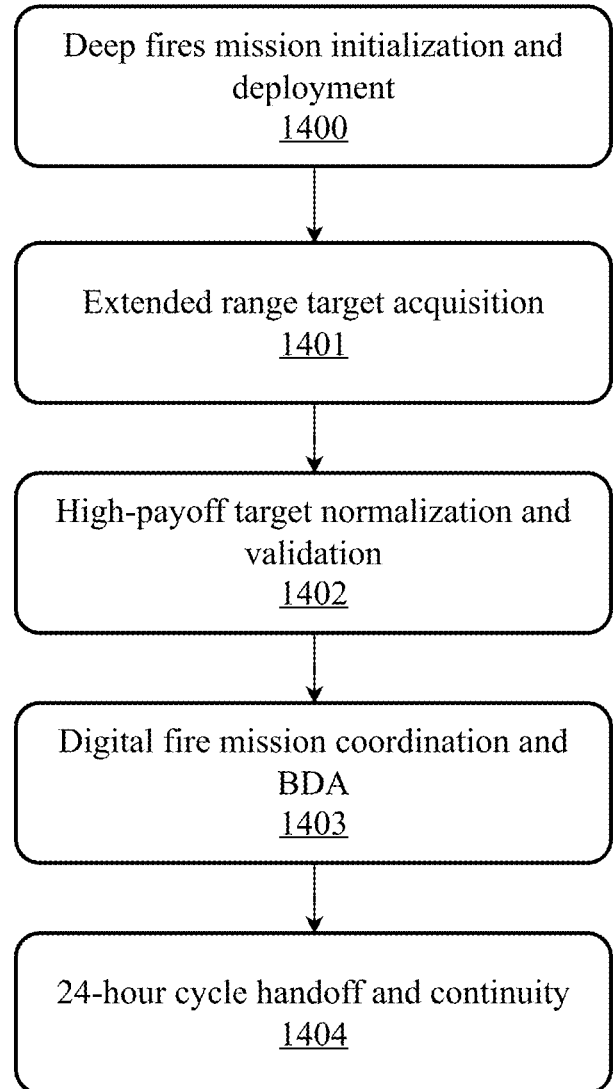

FIG. 14 is a flow diagram illustrating an exemplary method for implementing a "Deep Fires Mesh" operational mode implemented by the autonomous drone swarm system, according to an embodiment.

Figure 15:
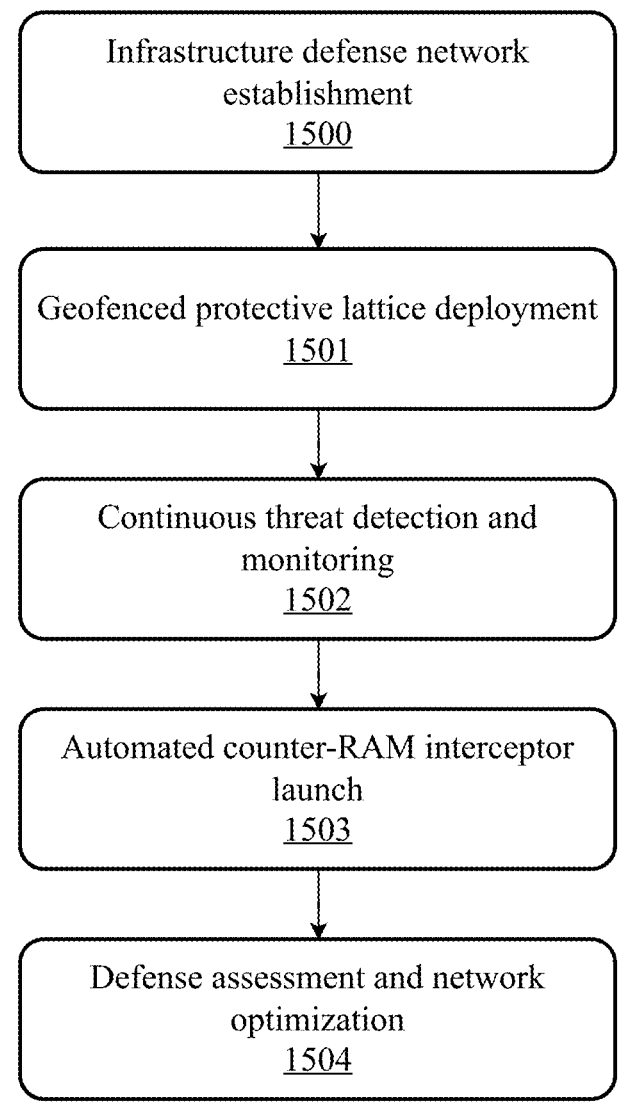

FIG. 15 is a flow diagram illustrating an exemplary method for implementing an "Infrastructure Defense Net" operational mode implemented by the autonomous drone swarm system, according to an embodiment.

Figure 16:
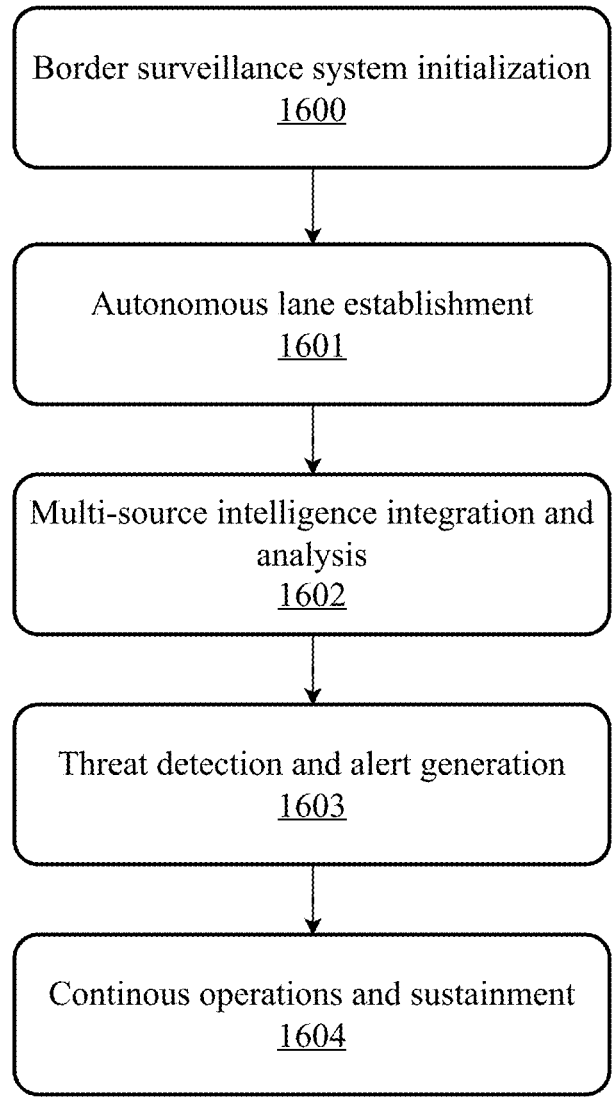

FIG. 16 is a flow diagram illustrating an exemplary method for implementing a "Persistent Border Monitor" operational mode implemented by the autonomous drone swarm system, according to the embodiment.

Figure 17:
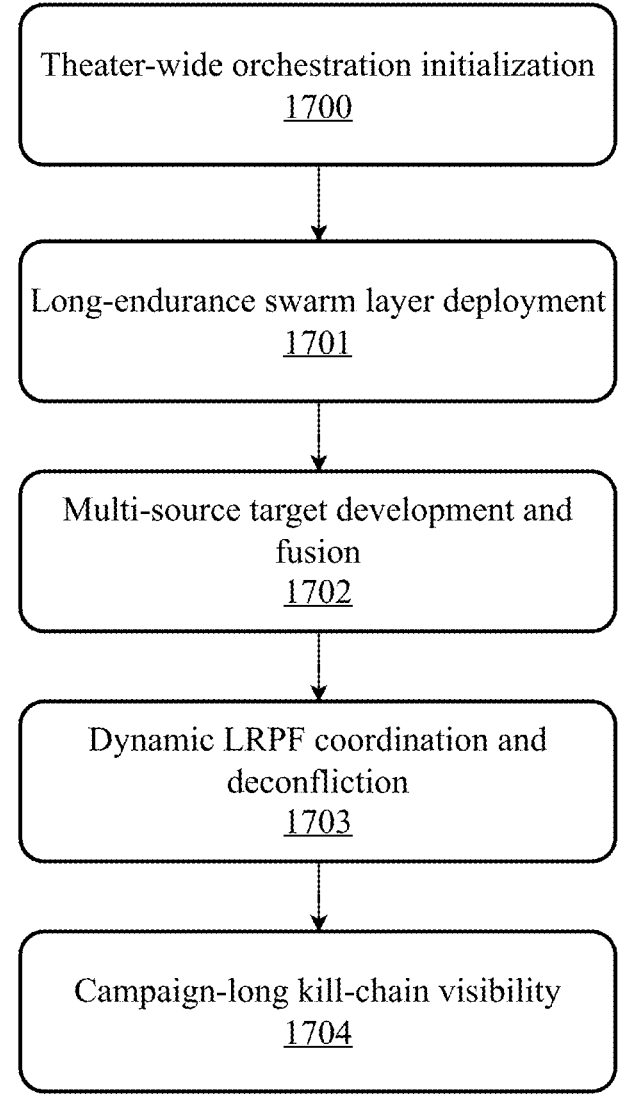

FIG. 17 is a flow diagram illustrating an exemplary method for implementing a "Theater Fires Orchestrator" operational mode implemented by the autonomous drone swarm system, according to an embodiment.

Figure 18:
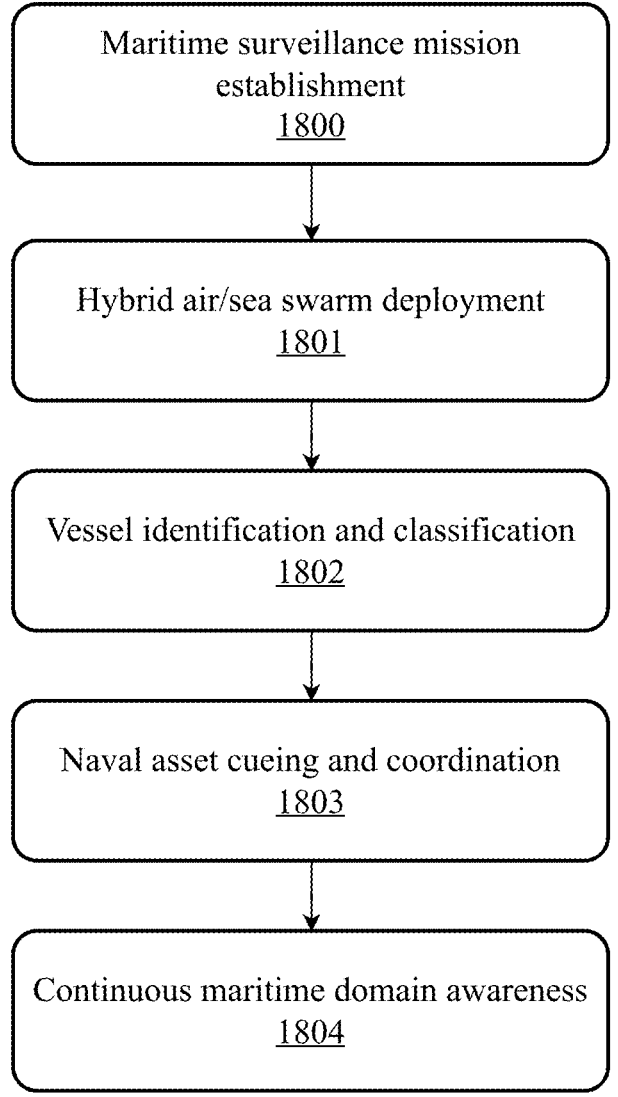

FIG. 18 is a flow diagram illustrating an exemplary method for implementing a "Maritime Chokepoint Watch" operational mode implemented by the autonomous drone swarm system, according to an embodiment.

Figure 19:
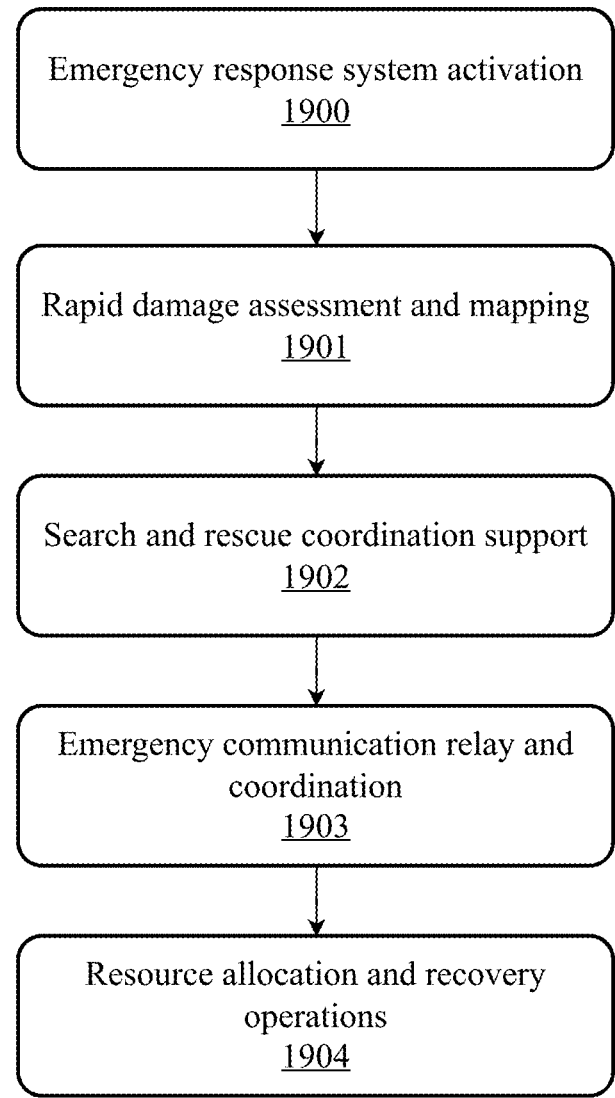

FIG. 19 is a flow diagram illustrating an exemplary method for implementing a "Disaster Response Coordination" operational mode implemented by the autonomous drone swarm system, according to an embodiment.

Figure 20:
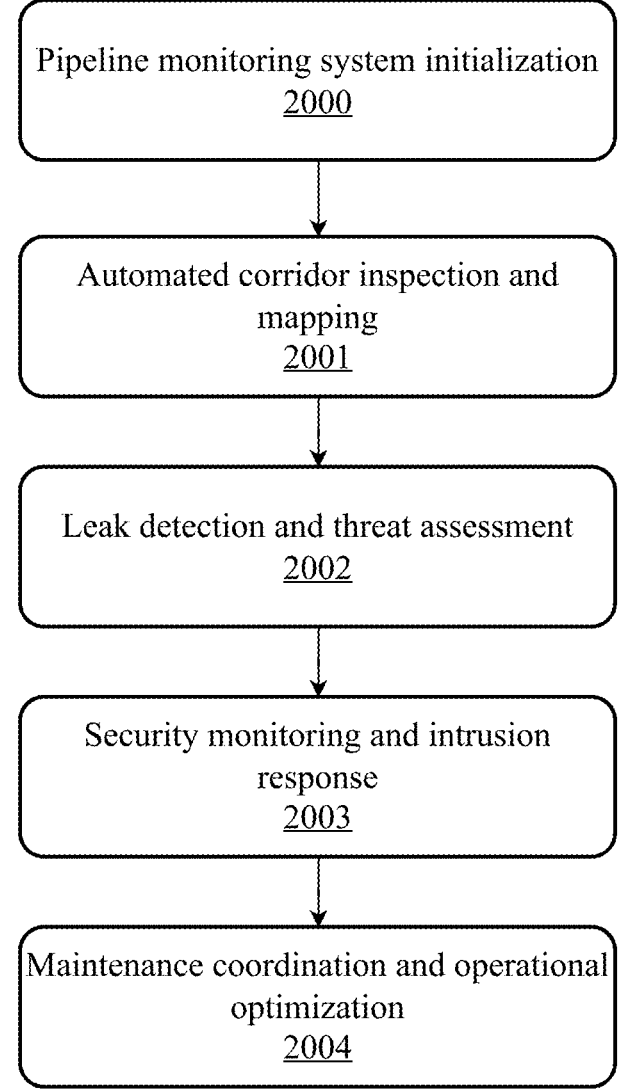

FIG. 20 is a flow diagram illustrating an exemplary method for implementing a "Pipeline Integrity Monitoring" operational mode implemented by the autonomous drone swarm system, according to an embodiment.

Figure 21:
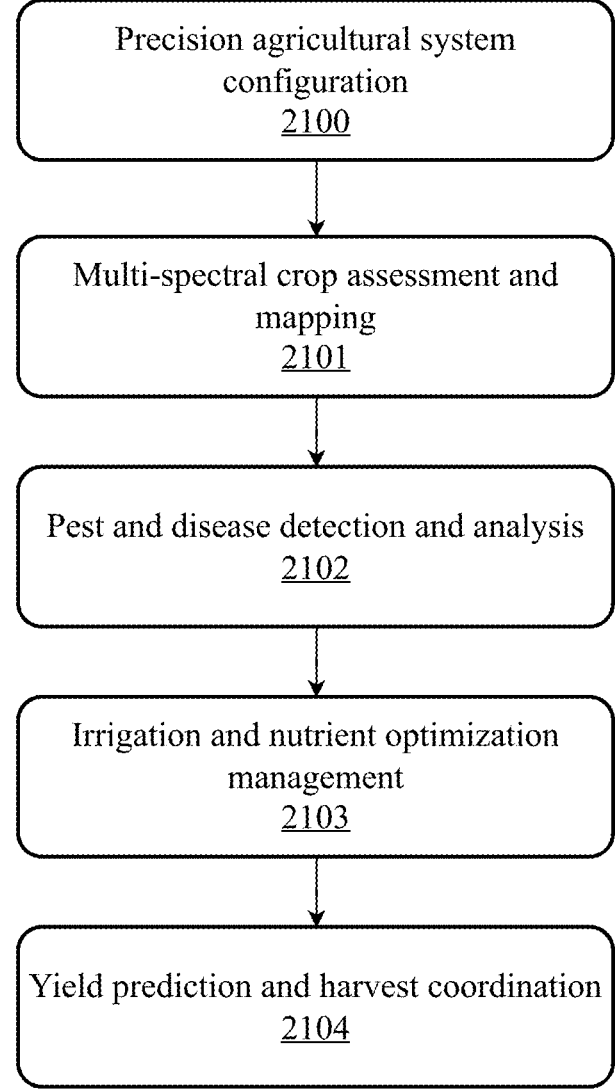

FIG. 21 is a flow diagram illustrating an exemplary method for implementing an "Agricultural Crop Management" operational mode implemented by the autonomous drone swarm system, according to an embodiment.

Figure 22:
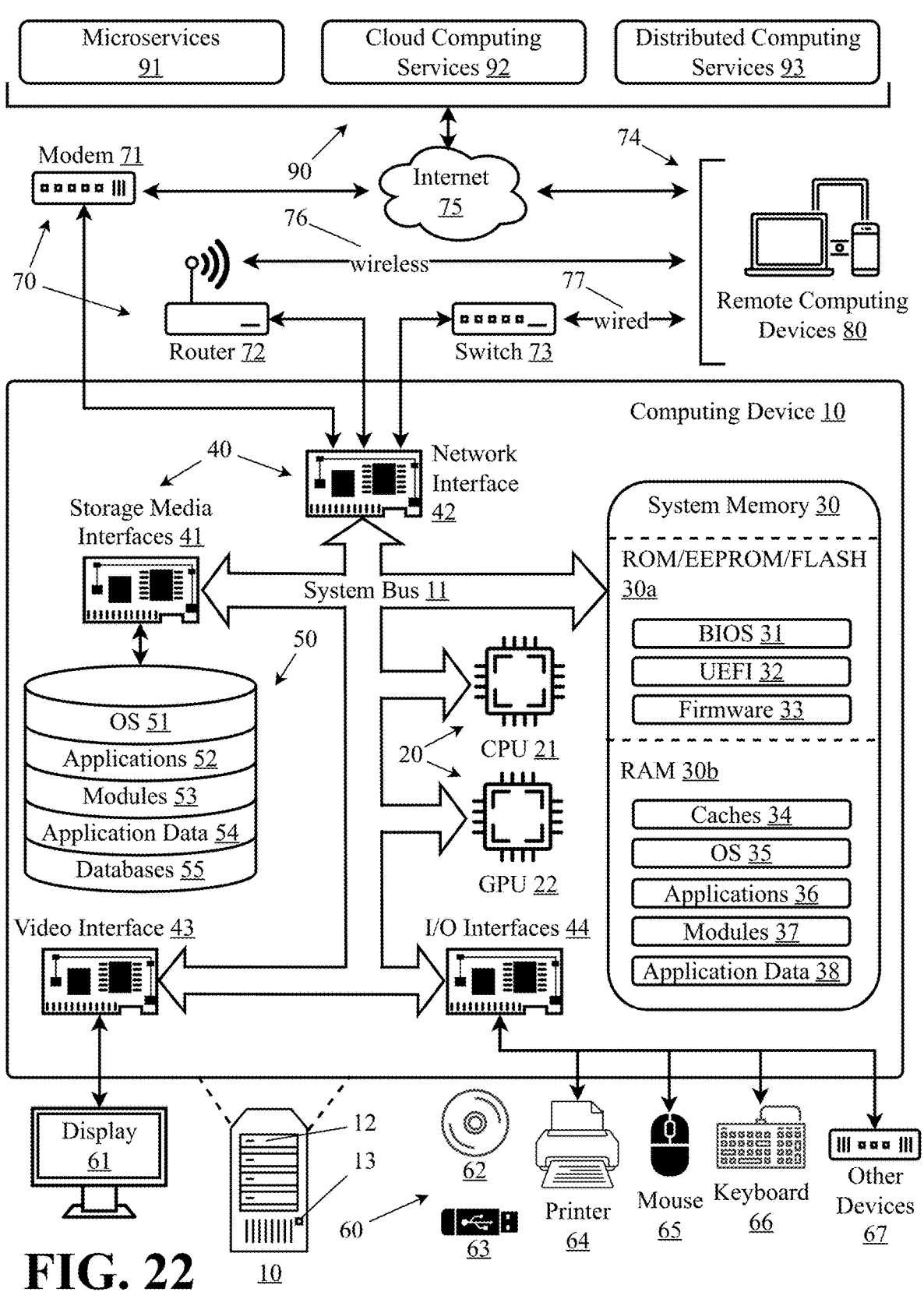

FIG. 22 illustrates an exemplary computing environment on which an embodiment described herein may be implemented.

DETAILED DESCRIPTION OF THE INVENTION

The inventor has conceived, and reduced to practice, an autonomous drone swarm system comprising a hierarchical network of unmanned aerial vehicles (UAVs) with integrated artificial intelligence capabilities. The system includes at least one command drone (i.e., Queen) equipped with a large language model processor and a plurality of subordinate drones (i.e., Workers) coordinated by the command drone through an encrypted mesh communication network.

The command drone processes natural language instructions from operators and autonomously develops mission plans, delegates tasks to subordinate drones, and coordinates swarm operations. The system integrates multiple sensor modalities including, but not limited to, electro-optical, infrared, LiDAR and photogrammetry, radio frequency, thermal, and chemical detection capabilities to provide comprehensive environmental awareness and target recognition.

The system can be implemented as a self-healing communication architecture utilizing redundant laser, radio frequency, and visual communication channels with AES-256 encryption. The system employs federated learning algorithms to maintain coordination in signal-denied environments and includes fault-tolerant protocols for continued operation despite individual drone failures.

The autonomous drone swarm system implements a hierarchical agent architecture wherein command drones function as coordinating agents that process mission objectives, environmental conditions, and swarm status to generate coordination decisions and task assignments, while subordinate drones operate as execution agents that autonomously interpret assigned tasks, adapt to local environmental conditions, and execute mission activities while maintaining coordination with the command agent and peer agents within the swarm network.

Command drone agents implement high-level decision-making capabilities including natural language processing for operator command interpretation, strategic mission planning based on available resources and environmental analysis, dynamic task allocation among subordinate agents based on capabilities and positioning, and swarm-wide coordination oversight that monitors mission progress and adapts coordination strategies based on operational feedback. Subordinate drone agents execute autonomous task processing including local environmental assessment and obstacle avoidance, tactical maneuvering and formation maintenance, sensor data collection and preliminary analysis, and collaborative coordination with peer agents for enhanced mission effectiveness while maintaining communication and coordination with the commanding agent throughout mission execution.

The agent-based architecture enables distributed intelligence wherein each drone operates as an autonomous decision-making entity capable of independent action while contributing to collective mission objectives, providing scalable coordination that adapts to changing swarm composition, environmental conditions, and mission requirements through intelligent agent interaction and collaborative decision-making processes.

In various embodiments, the autonomous drone swarm system implements a comprehensive operational framework comprising three distinct operational levels, each optimized for specific mission durations, coverage areas, and tactical objectives. The operational framework enables scalable deployment from immediate tactical support through sustained operational missions to long-term strategic objectives, providing commanders with flexible autonomous capabilities across the full spectrum of military and civilian operations.

The autonomous drone swarm system's operational framework is fundamentally designed around the military principle that commanders often trade space for time in operational planning. This principle recognizes that applying concentrated force and resources within a defined spatial area can significantly reduce mission duration and increase operational effectiveness. Conversely, operations requiring coverage of larger geographic areas typically necessitate extended mission durations to maintain adequate surveillance density and operational impact. The drone swarm system's configurable operational modes reflect this space-time relationship, enabling commanders to optimize force deployment based on specific mission requirements, available resources, and tactical constraints.

The system's multi-tier operational framework (e.g., tactical, operational, and strategic) incorporates both temporal and spatial parameters as flexible guidelines rather than rigid constraints. In line with military doctrine, these parameters are flexible; applying greater force may reduce mission duration, allowing commanders to trade space for time based on operational requirements. The operator maintains complete control over mission configuration, setting specific parameters including, but not limited to, mission duration, geographic coverage area, surveillance density, force allocation, and operational objectives. Once the operator defines and confirms these mission parameters, the system's agentic artificial intelligence algorithms autonomously optimize all aspects of execution including, but not limited to, drone deployment patterns, resource allocation strategies, power management protocols, communication network configuration, and coordination procedures within the operator-specified constraints.

This clear division of responsibilities ensures that tactical and strategic decision-making remains under human command authority, while the complex technical optimization and real-time operational management are handled autonomously by the system. The operator retains oversight and can modify mission parameters at any time, while the system continuously adapts its autonomous operations to achieve the specified objectives within the established parameters.

This approach provides commanders with the flexibility to adapt the system's capabilities to diverse operational contexts while maintaining the autonomous coordination and fault-tolerant operation that characterize the system's core functionality.

Tactical operations typically last from fifteen minutes to twenty-four hours and cover geographic areas ranging from two to five square kilometers, optimized for immediate, localized response scenarios requiring rapid deployment and concentrated surveillance or tactical support. The tactical mode configures the drone swarm for high-intensity operations with emphasis on rapid response times, detailed surveillance coverage, and immediate tactical impact within confined operational areas. Examples include convoy protection, breach overwatch, emergency medical evacuation support, and immediate threat response operations where concentrated drone coverage within a limited area provides maximum operational effectiveness.

Operational missions typically extend from one day to six days and cover geographic areas ranging from twenty to fifty square kilometers, designed for sustained regional coverage requiring persistent surveillance and coordinated multi-drone operations across moderate geographic scales. The operational mode balances surveillance persistence with resource sustainability, implementing power management protocols, coordinated drone rotation schedules, and extended communication networks that maintain operational effectiveness throughout the extended mission duration. Examples include wide-area surveillance, infrastructure protection, border monitoring segments, and regional security operations where sustained coverage across moderate geographic areas supports broader operational objectives.

Strategic deployments typically span from seven to thirty days and cover geographic areas ranging from two hundred to five hundred square kilometers, configured for long-term, large-scale autonomous operations requiring minimal human oversight and comprehensive integration with theater-level command and logistics systems. The strategic mode emphasizes autonomous operation sustainability, automated logistics coordination, and integration with national-level intelligence and command systems while maintaining persistent surveillance and coordination capabilities across extensive geographic areas. Examples include theater-wide surveillance, strategic border monitoring, maritime domain awareness, and campaign-duration operations where long-term autonomous coverage of large geographic areas supports strategic military objectives.

The autonomous drone swarm system implements a clear separation of responsibilities between human operators and autonomous system functions, ensuring that strategic and tactical decision-making authority remains under human command while complex technical optimization is handled autonomously. Operator responsibilities may comprise defining mission objectives, setting operational parameters such as mission duration and geographic coverage areas, specifying surveillance priorities and force allocation levels, establishing rules of engagement and operational constraints, and maintaining oversight authority with the ability to modify parameters or terminate operations at any time.

System autonomous functions encompass all technical optimization and real-time operational management within operator-defined parameters, including, but not limited to, autonomous calculation of optimal drone deployment patterns based on coverage requirements and available resources, automatic resource allocation and power management optimization to maximize mission duration and effectiveness, real-time coordination protocol implementation and communication network management, continuous environmental monitoring and tactical adaptation based on changing conditions, and automatic fault tolerance and recovery procedures when individual drones fail or become unavailable.

This role separation ensures that human judgment and command authority are preserved for all strategic and tactical decisions, while the system's artificial intelligence capabilities handle the complex technical coordination and optimization tasks that exceed human processing capacity in real-time operational environments. The operator can intervene at any level of operation, from high-level mission modification to direct control of individual drones when necessary, while the system provides comprehensive autonomous support that enhances operational effectiveness without compromising command authority.

The system's operational mode configuration process enables dynamic adjustment of both temporal and spatial parameters based on specific mission requirements and operational constraints, fully reflecting established military doctrine regarding the space-time relationship in operational planning. In line with military doctrine, these parameters are flexible; applying greater force concentration within a defined area may significantly reduce mission duration, while extended coverage areas typically require longer mission durations to maintain operational effectiveness. Mission commanders specify desired coverage areas, surveillance density requirements, mission duration, force allocation levels, and operational objectives, exercising complete control over strategic and tactical parameters.

The system's artificial intelligence algorithms then autonomously optimize all technical aspects of mission execution, automatically calculating optimal drone deployment patterns, implementing dynamic resource allocation strategies, managing power consumption and battery rotation schedules, configuring communication network topology and relay protocols, and establishing coordination procedures to achieve commander-specified objectives within the established parameters. This approach ensures that the same hardware and software systems can be effectively deployed across diverse operational scenarios ranging from intensive short-duration tactical support requiring concentrated force application to extensive long-duration strategic operations requiring sustained coverage across large geographic areas. Tactical operations provide immediate, short-duration support for frontline units and emergency response scenarios, typically lasting from fifteen minutes to two hours over two to five square kilometers. The tactical operational mode configures the drone swarm for high-intensity, localized missions requiring rapid deployment and immediate tactical impact. A "Convoy Guardian" mode implements a two-tier screening formation wherein subordinate drones establish overwatch positions three hundred meters ahead of friendly convoys and one hundred fifty meters to each flank. The convoy guardian mode employs automated threat detection algorithms that identify ambush indicators including, but not limited to, unusual terrain signatures, concealed positions, and electronic warfare emissions. Upon threat detection, the system automatically cues counter-fire micro-munitions or directs suppressive fires while maintaining continuous overwatch of the convoy route. A "Point-of-Breach Overwatch" mode establishes vertical racetrack patterns directly over breach points during urban operations or facility entries. The overwatch configuration utilizes any one of or combination of the various sensing systems which may be configured onto a drone platform including, but not limited to, LiDAR and photogrammetry and electro-optical/infrared feeds transmitted directly to squad heads-up displays, providing real-time tactical intelligence to ground forces. The system automatically marks muzzle flashes and other hostile indicators, enabling immediate suppressive fire coordination and tactical adaptation. A "Quick-Look ISR Bubble" mode deploys subordinate drones in a three-hundred-sixty-degree perimeter at five hundred meter radius around designated points of interest. The ISR bubble automatically classifies moving targets and hands off tracking information to integrated fire control systems including ATK-NET and advanced field artillery tactical data system (AFATDS). The configuration provides comprehensive situational awareness for tactical commanders while maintaining automated threat tracking and engagement coordination. A "HLZ/DZ & MEDEVAC Survey" mode utilizes six to twelve drone micro-swarms that fan out to evaluate potential helicopter landing zones (HLZ) and drop zones (DZ) for medical evacuation (MEDEVAC) operations. The survey mission employs LiDAR and photogrammetry and electro-optical/infrared sensors to build three-dimensional obstruction maps, analyze slope conditions, sample wind patterns, and assess dust hazard levels. The system automatically scores potential sites using (for example) green/amber/red classifications and instantly transmits georeferenced coordinates to ATAK systems. Approved zones receive automatic marker deployment using infrared and visible strobes, while escort drones remain on station to guide inbound aircraft and provide casualty pickup overwatch. An "Ad Hoc Relay" mode converts a subset (e.g., approximately twenty percent) of the swarm to mesh relay nodes, extending voice and data communication capabilities five kilometers or more through urban clutter and challenging terrain. The relay configuration activates on demand to provide immediate communication support when primary communication systems become degraded or unavailable. A "Precision Marker" mode employs designator drones that provide laser target designation while shooter platforms remain masked from enemy observation. The precision marker configuration may comprise real-time wind compensation algorithms that adjust targeting data based on current atmospheric conditions, ensuring accurate fires coordination and target engagement. The system typically operates for thirty minutes or less during active engagement periods, providing critical fire support coordination for ground forces.

Operational operations provide sustained mission support lasting, typically, six to twenty-four hours over 20 to 500 square kilometers, configured for extended coverage areas and persistent surveillance requirements. The operational mode optimizes power management, communication relay efficiency, and sensor coordination for prolonged autonomous operations. A "Wide-Area Sentinel" mode implements sector scanning across a geographic area (e.g., a ten by ten kilometer) using rolling handoff protocols between multiple drone formations. The sentinel configuration fuses moving target indicator data, electronic warfare signal collection, and pattern-of-life analytics to provide comprehensive area surveillance. The system maintains continuous coverage through coordinated drone rotation and autonomous charging procedures. An "Air-Corridor Clearance" mode establishes protective corridors for low-level unmanned aerial system and rotary-wing aircraft operations. The clearance mission combines radio frequency geolocation with electro-optical correlation to identify and suppress threat drones within designated flight corridors. The system provides real-time airspace deconfliction and threat neutralization throughout specified mission windows. A "Mobile Command Post Shadow" mode maintains orbiting protective layers above tactical and advance headquarters vehicles, providing redundant communications capabilities, counter-unmanned aerial system protection, and obscurant deployment. The shadow configuration enables twelve-hour-plus continuous operations through coordinated drone rotation and provides backup command and control capabilities for mobile headquarters elements. A "Deep Fires Mesh" mode extends swarm operations fifty to one hundred kilometers beyond the forward line of own troops, combining organic sensors with satellite and airborne intelligence cues to nominate high-payoff targets. The fires mesh automatically generates digital call-for-fire messages transmitted to rocket and cannon units, providing real-time battle damage assessment for rapid re-attack capabilities. The system operates on twenty-four-hour cycles with seamless takeover and handoff procedures. An "Integrated Fires Tip & Cue" mode fuses satellite and airborne intelligence, surveillance, and reconnaissance with swarm sensors to generate target nominations, pushing fire-mission data to corps fires cells and returning live battle damage assessment for rapid re-attack coordination. The system operates on-call or in twenty-four-hour cycles based on operational requirements. A "Dynamic Fires Mesh" mode assigns sub-swarms to artillery units for on-call battle damage assessment, splash spotting, and re-target suggestions during active fire missions. The dynamic fires configuration operates on twenty-four-hour cycles, providing continuous fire support coordination and assessment capabilities. An "Infrastructure Defense Net" mode establishes a geofenced lattice over bridges, fuel farms, logistics package routes, and other critical infrastructure, automatically launching counter-rocket, artillery, and mortar micro-interceptors upon detection of inbound threats. The defense net provides continuous protection for critical infrastructure and logistics operations.

Strategic operations enable long-term persistent missions lasting seven to thirty days or campaign-duration deployments over 200 to 500 square kilometers, optimized for theater-level objectives and sustained autonomous operations with minimal human oversight. A "Persistent Border Monitor" mode establishes autonomous surveillance lanes covering one hundred fifty kilometers of border areas, integrating national intelligence, surveillance, and reconnaissance assets with organic drone sensors. The border monitoring system automatically flags massing forces and suspicious activities, pushing real-time alerts to command and control systems and joint/combined coordination centers. The persistent monitoring capability operates continuously for seven to thirty-day periods with automated logistical support. A "Theater Fires Orchestrator" mode deploys long-endurance swarm layers across theater-wide areas of operations, fusing national intelligence, synthetic aperture radar, and Joint Surveillance Target Attack Radar System feeds with organic swarm intelligence to generate pre-planned and dynamic long-range precision fires target sets. The orchestrator system provides continuous target development, fire corridor deconfliction, and persistent kill-chain visibility for corps and combined-joint fires coordination cells throughout campaign-duration operations. A "Critical Node Resilience" mode pre-positions power-augmented relay drones over satellite communication gateways, ports, airfields, and other critical infrastructure nodes to guarantee communications continuity if primary infrastructure becomes disrupted. The resilience configuration activates automatically upon infrastructure damage or communications disruption, providing immediate backup capabilities essential for maintaining command and control during contingency operations. A "Maritime Chokepoint Watch" mode implements hybrid air and sea swarm deployments over strategic maritime passages and straits. The chokepoint monitoring combines Automatic Identification System spoof-checking, electro-optical/infrared vessel identification, and cueing of naval assets for comprehensive maritime domain awareness. The system can be configured to provide fourteen-day continuous monitoring with automated vessel tracking and classification. A "Strategic Deception Grid" mode coordinates multiple drone formations to emit tailored radio frequency, infrared, and radar signatures that simulate brigade-sized military movements designed to mislead adversary sensor systems. The deception operations coordinate with theater-level information operations and provide tactical deception capabilities lasting, for example, twenty-four to seventy-two hours based on operational requirements. A "Theater EW Umbrella" deploys high-altitude endurance drones that map the electromagnetic spectrum, jam hostile command and control links, and dynamically allocate quiet communication channels for friendly forces. The electronic warfare (EW) umbrella provides campaign-long electronic warfare capabilities, ensuring communication superiority and electromagnetic spectrum dominance throughout extended operations.

The operational framework described across tactical, operational, and strategic levels demonstrates the scalable autonomous capabilities enabled by the present drone swarm system, wherein identical hardware and software systems can be configured and deployed across mission profiles ranging from immediate tactical support to sustained strategic operations. The modular mission profile architecture enables rapid reconfiguration based on changing operational requirements while maintaining the core autonomous coordination and communication capabilities essential to effective swarm operations.

The Queen-Worker hierarchical architecture described herein demonstrates remarkable scalability and adaptability across tactical, operational, and strategic mission categories, with the core coordination structure remaining consistent while mission parameters, resource allocation, and coordination complexity adapt dynamically to operational requirements. At the tactical level, individual Queen drones typically coordinate between two to ten (but can coordinate with any number of) Worker drones in tight formations optimized for immediate response and high-intensity operations. The Queen's large language model processor focuses on rapid decision-making and real-time tactical adaptation, processing operator commands and environmental changes within seconds to minutes. Mission parameters emphasize speed, responsiveness, and concentrated effects, with Worker drones maintaining close proximity to the Queen for maximum coordination efficiency and immediate tactical impact. The communication architecture operates at high bandwidth with minimal latency requirements, enabling real-time coordination for missions such as convoy protection, breach overwatch, and emergency medical evacuation support.

As operations scale to the operational level, the Queen-Worker architecture expands to coordinate multiple Hive formations across larger geographic areas and extended time periods. Individual Queens may coordinate with peer Queens to establish overlapping coverage zones, with each Queen managing its full complement of Worker drones across areas measuring tens of square kilometers. The mission parameters shift toward sustained surveillance, persistent coverage, and coordinated handoff procedures that maintain operational continuity over six to twenty-four hour periods. The Queen's artificial intelligence systems adapt to emphasize mission persistence, resource optimization, and coordinated drone rotation schedules that ensure continuous coverage while managing power consumption and maintenance requirements. Communication protocols adjust to accommodate longer-range coordination requirements and increased network complexity, with federated learning algorithms enabling enhanced coordination between multiple Queens operating in the same operational area.

At the strategic level, the Queen-Worker architecture scales to coordinate multiple squadrons comprising dozens of Hives across theater-wide areas of operation, with mission durations extending from weeks to campaign-length deployments. Queens operate with increased autonomy and sophisticated mission planning capabilities, coordinating not only with their immediate Worker complement but also with multiple peer Queens across vast geographic areas.

The strategic operational parameters emphasize long-term mission planning, automated logistics coordination, and integration with theater-level intelligence and command systems. The artificial intelligence systems within Queens adapt to process strategic-level intelligence feeds, coordinate with national reconnaissance assets, and maintain persistent situational awareness across areas measuring hundreds of square kilometers. Mission parameters include automated resupply coordination, strategic deception operations, and integration with joint and coalition command structures, requiring enhanced communication security and sophisticated coordination algorithms that can operate effectively despite extended communication delays and contested electromagnetic environments.

The architectural adaptability extends to mission parameter optimization, where the same hardware and software systems automatically reconfigure based on operational category selection. Tactical missions prioritize rapid response algorithms, high-frequency position updates, and aggressive maneuvering protocols that maximize immediate tactical advantage. Operational missions balance responsiveness with endurance, implementing power management protocols, coordinated rotation schedules, and expanded sensor integration that supports sustained operations. Strategic missions emphasize long-term stability, predictive maintenance algorithms, and integration with external intelligence and logistics systems that enable persistent operations with minimal human oversight. The Queen's decision-making algorithms can automatically adjust planning horizons, risk assessment parameters, and resource allocation priorities based on the selected operational category, ensuring optimal performance across the full spectrum of mission requirements while maintaining the fundamental coordination principles that enable effective autonomous swarm operations.

In a convoy protection mission scenario, autonomous drone swarm system's agentic processing demonstrates its capabilities when mission parameters specify protecting a friendly convoy from Point A to Point B, maintaining 300-meter forward reconnaissance, identifying and alerting on potential threats according to rules of engagement, and reporting threats immediately to convoy commanders. When external stimuli are detected including electro-optical sensors detecting unusual heat signatures 400 meters ahead of the convoy, LiDAR and/or photogrammetry indicating metallic objects concealed behind vegetation, and radio frequency sensors detecting electronic emissions consistent with improvised explosive devices, the agentic processing system responds through autonomous threat assessment, mission parameter integration, autonomous action execution, and continuous adaptation.

The autonomous threat assessment process involves agents processing multiple sensor inputs simultaneously, correlating heat signature, metallic object detection, and RF emissions data, classifying threat probability as high based on pattern recognition algorithms, and determining that immediate response is required. Mission parameter integration enables agents to reference rules of engagement parameters, evaluate mission constraints including convoy protection and reconnaissance maintenance requirements, and select appropriate response levels including alert procedures and tactical positioning. Autonomous action execution follows with agents executing immediate threat alerts to convoy commanders, coordinating with other drones to establish overwatch positions, initiating detailed surveillance of suspected threat locations, and maintaining convoy protection formation while monitoring threats.

Continuous adaptation capabilities enable agents to monitor threat development and convoy movement, adjust surveillance patterns based on threat behavior, prepare escalation procedures if threat levels increase, and maintain communication with human commanders throughout operations. This agentic processing approach demonstrates real-time decision-making wherein agents independently classify threats and select responses without waiting for human authorization, multi-source integration that combines data from optical, LiDAR, and RF sensors to reach threat assessment conclusions, mission alignment that selects actions fulfilling protection missions while maintaining operational constraints, autonomous coordination that initiates coordination with other drones without external commands, and adaptive monitoring that continuously adjusts surveillance based on evolving situations.

Agentic processing differs significantly from conventional automated systems that rely on pre-programmed rules such as "IF heat signature detected, THEN send alert," single-input responses where each sensor triggers predetermined actions, limited contextual evaluation that cannot assess threat significance, restricted coordination requiring external coordination commands, and static responses that execute the same action regardless of situational context.

Agentic processing provides intelligent assessment that evaluates multiple inputs for comprehensive threat analysis, contextual responses with actions appropriate to specific threat levels and mission context, autonomous coordination that initiates appropriate multi-drone responses, adaptive behavior that modifies approaches based on threat development, and mission-aware actions that balance threat response with mission continuation requirements, enabling sophisticated autonomous operations that exceed conventional automation capabilities while maintaining alignment with human-defined mission objectives and operational constraints.

The autonomous drone swarm system's multi-tier operational framework provides comprehensive solutions for civilian and commercial applications, with tactical operations addressing emergency response scenarios, operational missions supporting infrastructure monitoring and maintenance, and strategic deployments enabling long-term environmental monitoring and resource management. The scalable Queen-Worker architecture adapts from immediate emergency response through sustained commercial operations to persistent environmental stewardship, providing civilian organizations with the same autonomous coordination capabilities developed for military applications.

According to an embodiment, tactical-level emergency response operations leverage the system's rapid deployment and immediate response capabilities for disaster relief, search and rescue, and emergency services coordination. During natural disasters such as earthquakes, hurricanes, or wildfires, the drone swarm can deploy within minutes to establish communication relays in affected areas, conduct rapid damage assessment, and coordinate emergency response activities. As an example, the convoy guardian configuration adapts to escort emergency vehicle convoys through disaster areas, providing real-time hazard detection and route clearance. The point-of-breach overwatch transforms into structural assessment missions, where drones establish overwatch positions above collapsed buildings or damaged infrastructure to provide real-time intelligence to search and rescue teams using building-penetrating sensors and thermal imaging capabilities.

Additionally, quick-look ISR bubble configurations provide immediate situational awareness for incident commanders during mass casualty events, chemical spills, or terrorist incidents, establishing perimeter surveillance while automatically tracking emergency personnel and civilian movements to ensure responder safety and operational coordination. The HLZ/DZ & MEDEVAC survey capability directly translates to civilian emergency medical services, where drone swarms rapidly assess potential helicopter landing zones for medical evacuation while providing continuous overwatch during patient extraction operations. Emergency response missions typically last from fifteen minutes to two hours, matching the tactical operational timeframe while providing critical immediate assistance during the most vulnerable phases of disaster response.

Operational-level infrastructure monitoring extends the system's capabilities to sustained commercial applications including utilities monitoring, transportation infrastructure assessment, and industrial facility surveillance over periods ranging from six hours to multiple days. Wide-area sentinel configurations adapt to monitor critical infrastructure such as power transmission lines, pipeline networks, and transportation corridors across areas measuring tens of square kilometers. The system provides continuous monitoring for equipment anomalies, unauthorized access, and environmental hazards while maintaining automated reporting to facility management systems and regulatory authorities.

Air-corridor clearance capabilities translate to commercial aviation support, where drone swarms maintain protective corridors around airports, ensuring airspace security and detecting unauthorized drone activity that could threaten commercial aircraft operations. The system provides real-time coordination with air traffic control systems and automated threat response capabilities. Mobile command post shadow configurations adapt to provide communication and surveillance support for mobile industrial operations such as mining, oil and gas exploration, and large-scale construction projects, maintaining persistent connectivity and security overwatch for remote operational sites.

Infrastructure defense net configurations protect critical commercial facilities including data centers, chemical plants, and logistics hubs by establishing automated perimeter security that detects and responds to intrusion attempts, equipment malfunctions, and environmental threats. The operational timeframe enables shift-based monitoring and maintenance schedules while providing continuous protection for high-value commercial assets. Dynamic monitoring systems can be configured to track equipment performance, predict maintenance requirements, and coordinate with facility management systems to optimize operational efficiency and prevent costly downtime.

Strategic-level environmental monitoring provides long-term autonomous surveillance and data collection for environmental research, conservation efforts, and resource management across vast geographic areas over periods ranging from weeks to years. Persistent border monitor configurations adapt to wildlife conservation applications, monitoring protected areas and migration corridors while detecting poaching activities, habitat encroachment, and environmental changes. The system integrates with satellite imagery and ground-based sensor networks to provide comprehensive ecosystem monitoring and automated threat detection for conservation organizations and government agencies.

Theater-wide environmental monitoring deploys long-endurance swarm layers across watersheds, forests, and agricultural areas to monitor air and water quality, track weather patterns, and assess environmental changes. The system fuses data from multiple sensor types including, but not limited to, chemical detectors, weather monitoring equipment, and biological sensors to provide real-time environmental assessments and early warning for pollution events, extreme weather, or ecological disruptions. Maritime environmental monitoring implements hybrid air and sea deployments to monitor ocean health, track marine life populations, and detect pollution events across large maritime areas.

Strategic environmental applications include climate research, where persistent drone deployments collect long-term atmospheric and surface data to support climate modeling and research initiatives. Agricultural monitoring provides season-long crop assessment, pest detection, and irrigation optimization across large farming operations, integrating with precision agriculture systems to optimize crop yields while minimizing environmental impact. Forest management applications provide continuous wildfire detection, timber assessment, and ecosystem health monitoring, supporting sustainable forestry practices and early warning systems for fire prevention.

Resource management applications include water resource monitoring across watersheds and groundwater systems, providing long-term data collection for water conservation and allocation decisions. Energy sector applications monitor renewable energy installations such as solar farms and wind installations, providing predictive maintenance, performance optimization, and security monitoring across distributed energy infrastructure. The strategic operational framework enables these applications to operate with minimal human oversight while providing continuous data collection and automated alerting for significant environmental changes or resource management requirements.

Commercial integration and scalability across all operational levels provides civilian organizations with flexible deployment options that scale from immediate emergency response through sustained commercial operations to long-term monitoring commitments. The modular architecture enables rapid reconfiguration between operational modes based on changing requirements, seasonal variations, or emergency conditions. Commercial customers can deploy the same hardware and software systems across multiple operational categories, maximizing investment value while maintaining consistent operational capabilities and reducing training requirements for personnel.

Integration with civilian command and control systems, regulatory reporting networks, and commercial communication infrastructure ensures seamless operation within existing organizational structures while providing enhanced capabilities that exceed traditional monitoring and response systems. The autonomous coordination capabilities reduce personnel requirements, minimize operational costs, and provide continuous coverage that exceeds human-operated alternatives while maintaining the flexibility and adaptability essential for diverse commercial applications across multiple industry sectors.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, the term "Hive" refers to a coordinated unit comprising one command drone and one or more subordinate drones operating under unified autonomous control through the hierarchical Queen-Worker architecture.

As used herein, the term "Squadron" refers to a networked formation of multiple Hives coordinated for large-scale operations through inter-Hive communication and distributed leadership protocols.

As used herein, the term "Federated Learning" refers to a distributed machine learning process wherein individual drones generate model parameter updates based on local operational experience and transmit compressed learning data to command drones for swarm-wide performance improvement without transmitting raw sensor data.

As used herein, the term "Self-Healing Mesh Network" refers to a communication network topology that automatically detects failed communication links and dynamically reconfigures routing pathways through alternative drones to maintain network connectivity.

As used herein, the term "Agentic Processing" refers to artificial intelligence-driven computational processes wherein autonomous software agents execute decision-making, task selection, and response generation based on external stimuli, mission parameters, and learned behaviors. Agentic processing differs from conventional automated systems by implementing intelligent decision-making capabilities that enable autonomous agents to evaluate environmental conditions, interpret mission requirements, and execute appropriate responses without predetermined programming for specific scenarios. Agentic processing systems continuously analyze incoming data streams, assess situational context, and autonomously select optimal actions based on mission objectives and operational constraints rather than following rigid programmed sequences.

Agentic processing is characterized by autonomous decision-making wherein agents independently evaluate multiple response options and select optimal actions based on current conditions and mission parameters, environmental responsiveness that continuously monitors external stimuli including sensor data, communication inputs, and environmental changes to trigger appropriate agent responses, and mission parameter integration that incorporates operator-defined mission objectives, rules of engagement, and operational constraints into decision-making processes. The processing systems implement adaptive learning capabilities that modify decision-making approaches based on operational experience and environmental feedback, while maintaining contextual awareness that evaluates situational context including threat levels, resource availability, and tactical conditions to inform decision-making processes. The system implements agentic processing capabilities wherein AI agents continuously monitor environmental conditions and autonomously execute tactical responses based on detected threats, mission parameters, and operational constraints, enabling intelligent decision-making that adapts to changing conditions without requiring predetermined programming for specific scenarios.

Conceptual Architecture

Figure 1:
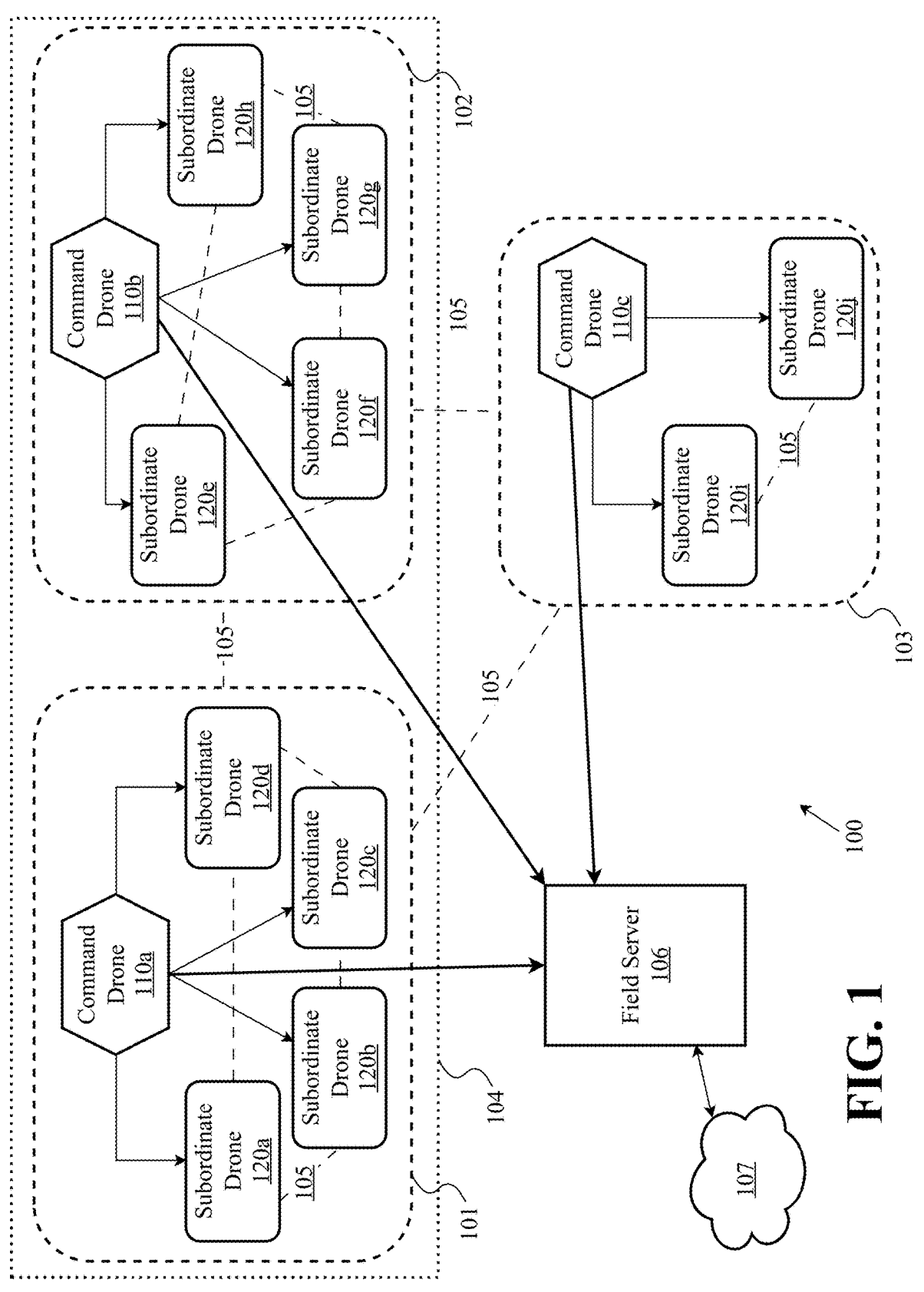
FIG. 1 is a block diagram illustrating an exemplary system architecture for an autonomous drone swarm system with AI-driven coordination, according to an embodiment.

FIG. 1 is a block diagram illustrating an exemplary system architecture for an autonomous drone swarm system with AI-driven coordination 100, according to an embodiment. The system comprises a plurality of autonomous operational units designated as Hives 101, 102, and 103, which may be networked together to form a larger coordinated unit designated as a Squadron 104. Each Hive represents a self-contained autonomous drone swarm unit capable of independent operation while maintaining coordination capabilities with other Hives within the Squadron.

Hive 101 comprises a command drone 110a functioning as the primary coordination node for the Hive, operatively connected to and coordinating a plurality of subordinate drones 120a, 120b, 120c, and 120d. Similarly, Hive 102 includes command drone 110b coordinating subordinate drones 120e, 120f, 120g, and 120h, while Hive 103 comprises command drone 110c coordinating subordinate drones 120i and 120j. This hierarchical architecture enables scalable deployment configurations wherein each command drone serves as a local coordination node for one or more subordinate drones. The amount of subordinate drones deployed in a hive can vary based on mission requirements and operational constraints.

The system further includes a mesh network infrastructure indicated by communication links 105, which establish redundant communication pathways between all drones within the Squadron. These communication links enable both intra-Hive communication between command drones and their respective subordinate drones, as well as inter-Hive communication between different command drones and between subordinate drones of different Hives. The mesh network topology provides fault-tolerant communication capabilities such that failure of any individual communication link or drone does not compromise the overall network connectivity of the Squadron.

Field server 106 is operatively connected to receive data transmissions from the plurality of command drones 110a, 110b, and 110c, serving as a fog computing layer for intermediate data processing and storage. Field server 106 can be configured to aggregate telemetry data, mission status information, and intelligence gathered by the distributed drone swarm, providing local processing capabilities that reduce bandwidth requirements for cloud connectivity while enabling continued operations in communication-constrained environments.

Cloud connectivity 107 extends the system architecture to enable comprehensive data analysis, long-term data storage, and integration with broader command and control systems. The cloud layer provides advanced analytical capabilities, mission planning support, and coordination with other military or civilian operational systems. This multi-layered architecture from edge computing on individual drones, through fog computing at the field server level, to cloud computing for comprehensive analysis, ensures robust and scalable data processing capabilities across varying operational environments and communication conditions.

As illustrated, autonomous drone swarm system 100 demonstrates scalability from small-scale single Hive operations involving one command drone and a few subordinate drones, to large-scale Squadron deployments involving multiple Hives with dozens of coordinated autonomous drones. This scalability enables deployment flexibility to match mission requirements, available resources, and operational constraints, while maintaining the autonomous coordination capabilities and fault-tolerant communication architecture throughout all deployment scales.

Figure 2:
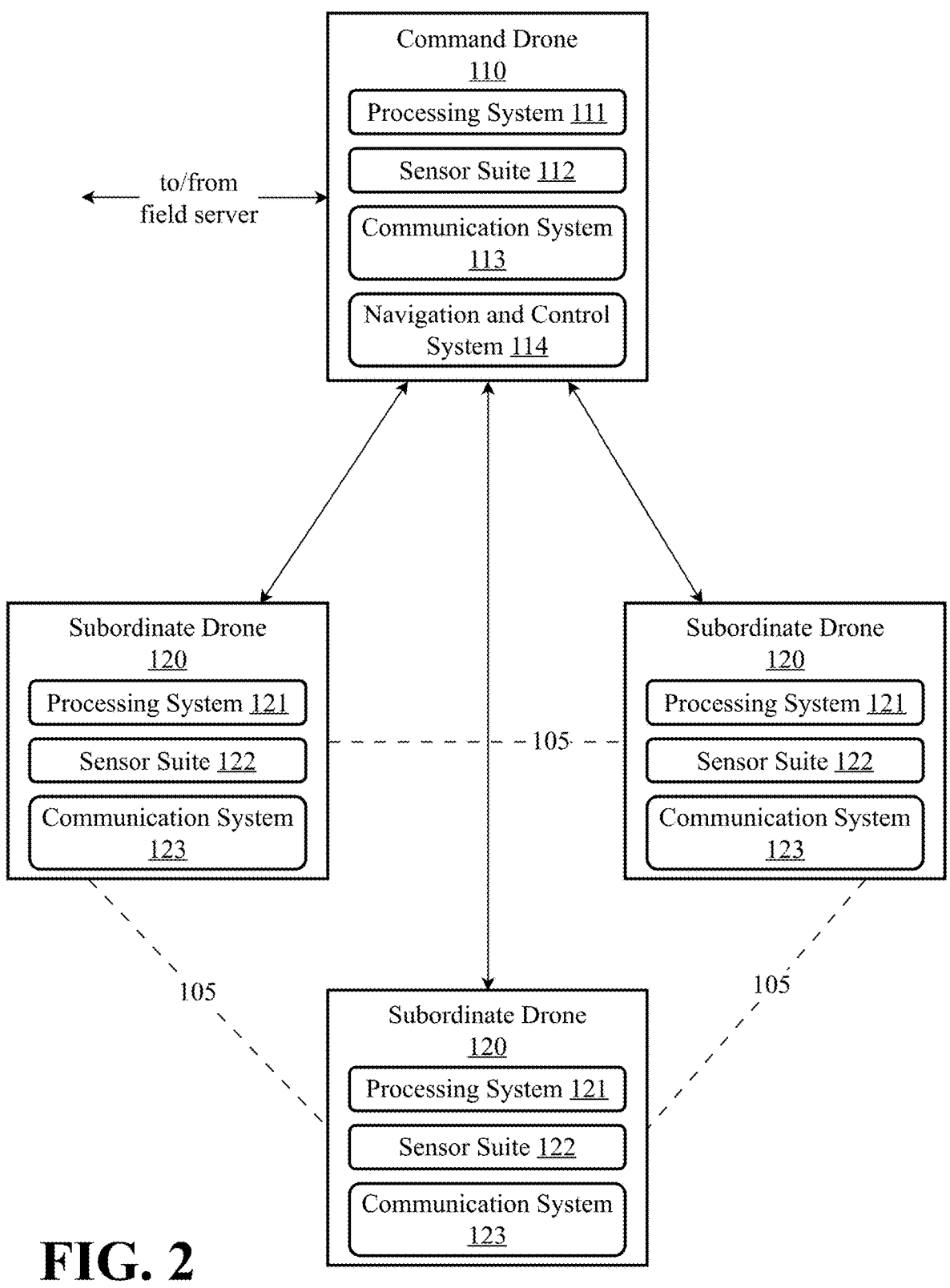
FIG. 2 is a block diagram illustrating the command drone and subordinate drones of autonomous drone swarm system in more detail, according to an embodiment.

FIG. 2 is a block diagram illustrating the command drone 110 and subordinate drones 120 of autonomous drone swarm system 100 in more detail, according to an embodiment. The figure provides an exemplary view of the modular component integration within ruggedized drone airframes, demonstrating configurable hardware and software systems that enable autonomous swarm coordination and operation.

According to an embodiment, command drone 110 incorporates various primary subsystems that collectively provide the computational, sensory, communication, and navigation capabilities necessary for swarm coordination and mission execution. Processing system 111 comprises a high-performance computing module configured for real-time edge processing, a large language model processor implementing, for example, a fine-tuned LLaMA-13B or equivalent neural network architecture, and a containerized orchestration system (e.g., Kubernetes or similar) enabling modular software deployment and management. The processing system 111 employs artificial intelligence integration including natural language processing for operator command interpretation, autonomous mission planning algorithms, and multi-agent coordination. Processing system 111 is specifically configured to handle these AI-driven computational demands while maintaining power consumption within acceptable limits for sustained aerial operations.

The autonomous drone swarm system leverages a comprehensive suite of advanced artificial intelligence technologies that enable coordination, agentic decision-making, and adaptive mission execution across diverse operational environments. The integrated AI architecture comprises multiple specialized artificial intelligence subsystems including multi-modal agentic computer vision processing, large language model natural language processing with agentic response capabilities, audio artificial intelligence with agentic environmental analysis, and adaptive AI frameworks designed for future agentic technology integration. These AI components are integrated into optimized processing systems configured for real-time, on-board computation while maintaining power efficiency requirements essential for sustained aerial operations.

The system implements multi-modal agentic computer vision artificial intelligence capabilities that power critical operational functionalities including object detection, obstacle avoidance, environmental mapping, target recognition systems, and communication systems. The agentic computer vision AI enables autonomous navigation through complex, dynamic environments with precision positioning and collision avoidance capabilities, where agents execute evasive maneuvers and tactical adjustments based on external visual stimuli and mission parameters that exceed human operator reaction times and environmental assessment capabilities.

Agentic object detection algorithms automatically identify and classify vehicles, personnel, equipment, and infrastructure elements within the operational environment, with AI agents executing immediate threat assessment protocols and tactical responses based on detected objects and mission parameters. Environmental mapping through multi-modal agentic computer vision creates detailed three-dimensional terrain models that integrate with navigation systems, where AI agents execute route optimization and tactical positioning decisions based on terrain analysis and mission requirements.

Agentic target recognition algorithms implement advanced pattern recognition and classification capabilities that automatically identify objects of interest, potential threats, and mission-relevant targets, with AI agents executing engagement protocols, tracking procedures, and alert notifications based on target identification and rules of engagement parameters. The multi-modal computer vision system integrates electro-optical, infrared, and other imaging modalities, enabling agentic responses that adapt sensor selection and processing algorithms based on environmental conditions and target characteristics.

Agentic obstacle avoidance algorithms process real-time visual data to detect and avoid static and dynamic obstacles, where AI agents execute immediate course corrections, formation adjustments, and tactical maneuvering based on obstacle detection and mission preservation requirements. The agentic computer vision AI enables autonomous operation in visually challenging environments including low-light conditions, adverse weather, and cluttered urban environments, with agents adapting visual processing algorithms and navigation strategies based on environmental stimuli and operational constraints.

The system incorporates large language model artificial intelligence, specifically implementing the LLaMA-13B model architecture in some embodiments, to drive agentic natural language processing capabilities that enable intuitive human-machine interaction and autonomous mission planning. The LLM integration with agentic response capabilities enables operators to provide mission commands and objectives using natural language inputs, where AI agents execute command interpretation, mission parameter extraction, and operational planning based on operator instructions and current mission context.

The agentic large language model processes operator inputs to interpret mission intent, analyze operational constraints, and generate structured mission parameters, with AI agents executing immediate mission plan generation and resource allocation based on interpreted commands and available operational resources. Agentic natural language understanding capabilities enable the system to process complex, multi-part instructions, where AI agents execute task prioritization, resource assignment, and tactical coordination based on extracted requirements and mission parameters.

Agentic mission planning algorithms within the LLM generate comprehensive operational plans that consider available resources, environmental conditions, threat assessments, and tactical objectives, with AI agents executing continuous plan optimization and adaptation based on changing external stimuli and operational feedback. The agentic LLM system implements contextual awareness algorithms that analyze current operational conditions, mission history, and environmental factors, enabling AI agents to execute contextually appropriate responses and mission adaptations based on situational changes and mission requirements.

Agentic decision support capabilities provide real-time analysis and recommendations for mission commanders, with AI agents executing automated assessment of tactical situations, resource allocation optimization, and tactical positioning recommendations based on current operational parameters, threat assessments, and mission objectives derived from external stimuli and operator guidance.

The system integrates multi-modal agentic audio artificial intelligence technologies including speech-to-text (STT) and text-to-speech (TTS) models that facilitate voice-based interaction and environmental audio analysis capabilities. Speech-to-text processing enables real-time conversion of operator voice commands into digital instructions, where AI agents execute immediate command interpretation and mission parameter extraction based on voice input and current operational context.

Text-to-speech capabilities enable the system to provide audio feedback, status updates, and alert notifications to operators using natural language audio output, with AI agents executing contextual response generation and priority-based notification delivery based on operational conditions and mission status. Multi-modal agentic environmental audio analysis capabilities monitor ambient sound signatures, where AI agents execute threat classification, equipment identification, and tactical response protocols based on acoustic stimuli and mission parameters.

The agentic audio AI system implements acoustic signature recognition algorithms that can identify specific audio patterns including vehicle engines, weapon systems, communication equipment, and human speech, with AI agents executing immediate threat assessment protocols and tactical responses based on acoustic detection and operational rules of engagement. Agentic noise filtering and signal processing algorithms enable effective audio analysis in high-noise operational environments, where AI agents adapt filtering parameters and processing algorithms based on environmental audio conditions and mission requirements.

Audio-based agentic coordination enables real-time communication analysis and response generation, where AI agents execute communication relay protocols, emergency alert generation, and tactical coordination messaging based on detected audio communications and mission parameters.

The artificial intelligence technologies are integrated into processing systems specifically optimized for real-time, on-board computation that balances AI processing capabilities with power efficiency requirements essential for sustained aerial operations. Edge computing architectures enable complex AI processing to occur locally on drone platforms without dependence on external computing resources or constant communication connectivity, ensuring autonomous operation capability in communications-denied environments.

Processing optimization algorithms dynamically allocate computational resources based on mission priorities, environmental conditions, and available power capacity to maximize AI performance while maintaining flight duration and operational effectiveness. The system implements distributed agentic AI processing across the swarm network, enabling complex AI tasks to be shared among multiple drone platforms when computational demands exceed individual platform capabilities, with AI agents executing load balancing and task distribution based on processing capacity and mission priorities.

Power management integration ensures that agentic AI processing adapts to available battery capacity and mission duration requirements, with AI agents automatically adjusting AI algorithm complexity, processing frequency, and computational intensity based on power status and mission parameters to optimize the balance between AI capability and operational endurance. Thermal management systems maintain optimal processing temperatures for AI hardware during sustained operations while managing power consumption and cooling requirements.

The system architecture is specifically engineered for adaptability to future artificial intelligence and sensor technology advancements, implementing modular agentic AI frameworks that can incorporate new AI models and processing capabilities as they become available. The adaptive architecture enables integration of emerging sensor technologies including Laser Fidelity (LiFi) and Light Fidelity communication systems by developing tailored agentic AI models to process their unique data streams and communication protocols, where AI agents execute communication optimization and data processing based on signal characteristics and mission requirements.

Future agentic AI development capabilities include bio-inspired processing systems such as radar-like echolocation algorithms modeled on biological systems like bat navigation, enabling enhanced obstacle detection and navigation in low-visibility environments where AI agents execute sonar-based navigation and obstacle avoidance based on acoustic return signals and mission parameters. The modular agentic AI architecture supports rapid integration of new AI models for emerging sensor types, communication methods, and operational capabilities without requiring fundamental system redesign or hardware replacement.

Agentic machine learning framework integration enables continuous AI model improvement through operational experience, allowing AI agents to adapt and optimize AI performance based on real-world operational data, mission outcomes, and environmental feedback. The system maintains backward compatibility with existing AI models while enabling upgrade paths for enhanced agentic AI capabilities as technology advances, with AI agents executing model validation and performance optimization based on operational testing and mission effectiveness metrics.

Software-defined AI processing enables remote AI model updates and capability enhancements through secure communication links, ensuring that deployed systems can benefit from AI advancement without physical system modification. Containerized AI model deployment supports multiple AI frameworks and enables rapid testing and deployment of new AI capabilities while maintaining system stability and operational reliability.

The comprehensive AI technology suite integrates with other system components including the hierarchical Queen-Worker coordination architecture, multi-modal communication systems, and fault-tolerant operation protocols. Queen drones implement enhanced AI processing capabilities that coordinate swarm-wide AI operations, manage distributed AI processing tasks, and provide AI-enhanced mission planning and coordination capabilities for subordinate drones.

Worker drones implement optimized AI processing for individual task execution, environmental monitoring, and coordination with Queen drone AI systems while maintaining autonomous AI capability for independent operation when communication with Queen drones is unavailable. The distributed AI architecture enables the swarm to maintain sophisticated AI capabilities despite individual drone failures through automatic AI task redistribution and dynamic AI processing allocation.

AI system integration with sensor fusion algorithms enhances environmental awareness and target detection by combining AI processing across multiple sensor modalities and data streams. The AI systems coordinate with navigation algorithms, communication protocols, and mission execution systems to provide comprehensive autonomous operation capabilities that exceed human operator processing capacity while maintaining human command authority over strategic and tactical decision-making.

External system integration enables AI capabilities to interface with military command systems, civilian emergency response networks, and commercial operational platforms through standardized AI interfaces and data formats. The AI architecture supports integration with cloud-based AI services for enhanced processing capability when communication connectivity permits while maintaining autonomous AI operation when external AI resources are unavailable.

According to an embodiment, sensor suite 112 of command drone 110 comprises a comprehensive, modular array of sensing modalities integrated to provide multi-spectral environmental awareness and target identification capabilities. In some embodiments, the sensor suite comprises one or more of electro-optical and infrared cameras providing high-resolution visual and thermal imaging, a LiDAR and photogrammetry system enabling three-dimensional environmental mapping and obstacle detection, radio frequency sensors configured for electronic warfare detection and communication signal analysis, thermal imaging systems optimized for night operations and heat signature identification, and chemical detection sensors capable of identifying nuclear, biological, and chemical threats. The sensor suite 112 further comprises modular payload bays with standardized interfaces enabling mission-specific sensor package integration and rapid reconfiguration for varying operational requirements.

According to an embodiment, communication system 113 of command drone 110 implements a multi-modal communication architecture providing redundant and resilient communication capabilities across multiple transmission mediums. The communication system may comprise self-pulsating laser diode arrays configured for high-bandwidth directional communication with automatic beam steering and atmospheric compensation capabilities, software-defined radio transceivers enabling flexible frequency allocation and anti-jamming protocols, and computer vision-based visual communication systems utilizing drone-mounted lighting arrays for pattern-based information transmission. All communication channels within system 113 implement AES-256 encryption protocols and support mesh networking topologies with self-healing capabilities to maintain network connectivity despite individual component failures or environmental interference.

According to an embodiment, navigation and control system 114 provides autonomous flight capabilities and precision positioning for command drone 110 and subordinate drones. In various embodiments, the system may incorporate one or more of global positioning system (GPS) and global navigation satellite system (GNSS) receivers with anti-jamming capabilities, inertial navigation systems enabling continued operation in GPS-denied environments, magnetometer and barometric altimeter systems for enhanced positioning accuracy, and autonomous flight control systems with integrated obstacle avoidance algorithms. Navigation system 114 may further comprise precision landing and takeoff capabilities enabling automated deployment and recovery operations, collaborative navigation protocols utilizing swarm positioning data, and emergency return-to-base procedures for fault conditions or mission termination scenarios.

In various embodiments, the autonomous drone swarm system incorporates a multi-layered navigation architecture that combines traditional positioning methods with novel on-board computation and collaborative positioning innovations specifically designed for the hierarchical Queen-Worker swarm architecture. While the system utilizes established positioning technologies including GPS/GNSS receivers with anti-jamming capabilities and inertial navigation systems (INS) for GPS-denied environments, the drone swarm system utilizes an integrated on-board computation and correction system that enables precise autonomous navigation without reliance on external positioning signals.

The system implements an on-board computation and correction methodology wherein each drone, both command and subordinate platforms, is preloaded with detailed local maps of the operational area prior to mission deployment. These local maps may comprise terrain elevation data, obstacle locations, landmark positions, and geographic reference points that serve as navigation anchors for autonomous position calculation. Upon mission initiation, each drone establishes a last known reliable position using available positioning systems, then continuously updates its location through real-time telemetry data processing without dependence on external navigation signals.

The on-board computation algorithms process comprehensive telemetry data including, but not limited to, altitude measurements from barometric and radar altimetry, speed and acceleration data from inertial measurement units, bearing and heading information from magnetometer and gyroscopic systems, and environmental factors such as wind speed and direction for drift correction calculations. Advanced algorithmic processing integrates this multi-source telemetry data with preloaded map information to calculate precise positioning coordinates, enabling accurate navigation even in GPS-unavailable environments such as underground facilities, urban canyons with satellite signal blockage, or electromagnetically contested operational areas where external positioning signals are jammed or unreliable.

In various embodiments, the navigation system implements collaborative positioning enhancement enabled through the multi-modal mesh communication network described herein. Drones continuously share computed position data and real-time telemetry measurements across the encrypted mesh network, enabling distributed data fusion and correction algorithms that enhance swarm-wide positioning accuracy beyond individual drone capabilities. When individual drones encounter positioning uncertainties or conflicting navigation data, the collaborative system provides position verification and correction through comparison with neighboring drone positions and collective telemetry analysis.

The collaborative navigation algorithms may implement distributed consensus protocols that weight position data based on confidence levels, recent calibration status, and cross-validation with multiple drone positions within the swarm network. This approach enables the swarm to maintain accurate relative positioning even when absolute positioning becomes unavailable, ensuring coordinated formation flying, collision avoidance, and tactical maneuvering without external navigation support. The mesh network collaboration particularly enhances navigation reliability during extended operations in signal-denied environments by providing continuous position cross-checking and drift correction across the entire swarm.

The navigation capabilities described herein are specifically tailored to support the hierarchical Queen-Worker swarm architecture, with differentiated navigation responsibilities and capabilities optimized for command and subordinate drone roles. Queen drones can implement enhanced navigation processing capabilities including, but not limited to, master position calculations, swarm-wide navigation coordination, and integration with mission planning algorithms that optimize drone positioning for tactical and operational objectives. Queen drones can serve as navigation reference nodes for subordinate drones, providing position verification, drift correction, and navigation guidance when individual Worker drones encounter navigation difficulties.

Worker drones implement streamlined navigation processing optimized for formation flying, tactical maneuvering, and coordination with Queen drone navigation commands while maintaining autonomous navigation capabilities for individual task execution. The hierarchical navigation architecture enables efficient resource utilization by concentrating advanced navigation processing at Queen drones while maintaining distributed navigation capability throughout the swarm. Navigation task distribution protocols automatically adjust navigation responsibilities based on drone availability, with Worker drones capable of assuming enhanced navigation roles when Quen drones become unavailable, ensuring navigation continuity despite individual drone failures.

The navigation system builds upon established principles of dead reckoning navigation, including position calculation based on last known reliable position combined with subsequent movement measurements. However, the present system extends this approach significantly through integration of preloaded local maps that provide geographic reference anchors, comprehensive multi-source telemetry processing that incorporates environmental correction factors, and collaborative mesh network positioning that enables swarm-wide navigation enhancement.

The combination of on-board map integration, comprehensive telemetry processing, and collaborative swarm navigation represents a novel approach specifically designed for autonomous swarm operations that exceeds existing capabilities in GPS-denied environments. The hierarchical Queen-Worker integration provides navigation optimization and fault tolerance not present in conventional navigation systems, while the multi-modal mesh network collaboration enables distributed navigation processing that enhances accuracy and reliability beyond individual platform capabilities. These innovations collectively enable the autonomous drone swarm system to maintain precise navigation and coordination capabilities in operational environments where conventional GPS-dependent navigation systems would fail.

The on-board computation system implements several algorithmic approaches for position calculation and correction. For example, map-referenced position calculation algorithms correlate real-time sensor data with preloaded map features to provide absolute position updates when geographic landmarks can be detected through one or more of electro-optical, infrared, or LiDAR and photogrammetry sensors. Telemetry fusion algorithms process multiple data streams including, but not limited to, barometric altitude, inertial acceleration, magnetic heading, and wind vector measurements to calculate position changes with compensation for environmental factors and measurement errors.

In some embodiments, collaborative positioning algorithms implement distributed Kalman filtering across the mesh network, enabling each drone to improve its position estimates through incorporation of neighboring drone telemetry and position data. The system maintains position confidence metrics that indicate navigation accuracy and reliability, enabling automatic switching between navigation methods based on environmental conditions and available reference sources. Emergency navigation protocols provide backup positioning methods including, but not limited to, visual landmark recognition, terrain matching algorithms, and manual position input capabilities that ensure navigation continuity under extreme operational conditions.

The navigation systems integrate with other system components including the artificial intelligence mission planning algorithms that optimize drone positioning for tactical objectives, the fault-tolerant operation protocols that maintain navigation capability despite individual drone failures, and the multi-modal communication system that enables collaborative navigation data sharing. The navigation system supports all operational modes from tactical short-duration missions requiring precise formation flying to strategic long-duration operations requiring sustained navigation accuracy across large geographic areas.

Navigation data integration with sensor fusion algorithms enhances environmental awareness and target detection capabilities by providing precise platform positioning for sensor correlation and target location calculation. The navigation system can coordinate with power management protocols to optimize navigation processing based on available battery capacity, adjusting navigation update rates and algorithm complexity to balance accuracy with power consumption requirements. Integration with external system connectivity enables navigation data sharing with military command systems, civilian emergency response networks, and commercial operational centers as mission requirements dictate.

In some implementations of an embodiment, the subordinate drone(s) 120 comprises similar subsystems optimized for distributed processing and specialized mission execution while maintaining compatibility with command drone coordination protocols. In some embodiments, processing system 121 comprises a lightweight processing unit specifically optimized for edge computing applications, computer vision processors dedicated to obstacle avoidance and environmental awareness functions, audio processing capabilities enabling environmental sound analysis and acoustic threat detection, and local artificial intelligence inference capabilities supporting autonomous decision-making within the constraints of subordinate drone operational parameters. Processing system 121 can employ AI algorithms for distributed coordination with the command drone's artificial intelligence systems, enabling intelligent swarm behavior.

The autonomous drone swarm system implements a hierarchical edge computing architecture that optimizes data processing efficiency and communication bandwidth utilization through intelligent data flow management between Worker drones, Queen drones, and field servers. Data streams flow directly from subordinate Worker drones to the command Queen drone, which employs advanced edge computing capabilities to analyze incoming data in real time and selectively transmit only operationally relevant information back to the field server and broader command networks.

This edge computing approach provides significant operational advantages by performing computationally intensive data analysis at the Queen drone level rather than transmitting raw data streams to remote processing systems. The Queen drone's edge computing capabilities enable immediate local processing of sensor data, video feeds, and intelligence information, reducing communication bandwidth requirements while providing faster response times for time-critical operational decisions. The system maintains the capability to transmit full raw data when specifically requested or when operational priorities dictate comprehensive data preservation.

Worker drones establish direct, high-bandwidth data connections to their coordinating Queen drone, streaming comprehensive sensor data including full motion video (FMV), electro-optical imagery, infrared thermal data, LiDAR and photogrammetry three-dimensional mapping information, audio recordings, chemical detection readings, and other multi-modal sensor outputs. This direct data streaming architecture enables the Queen drone to maintain complete situational awareness of Worker drone sensor collection while providing the computational resources necessary for real-time data analysis and intelligence extraction.

The direct streaming protocol implements prioritized data transmission algorithms that automatically adjust data stream quality, compression levels, and transmission frequency based on available communication bandwidth, operational priorities, and Queen drone processing capacity. Worker drones can dynamically modify their data streaming parameters based on Queen drone feedback and mission requirements, ensuring optimal balance between data completeness and communication efficiency throughout mission execution.

Worker drone data streams may comprise metadata and contextual information including precise geolocation data, timestamp information, sensor configuration parameters, and environmental conditions that enable the Queen drone's edge computing systems to correlate and analyze data across multiple Worker platforms simultaneously. This comprehensive data streaming approach enables multi-source intelligence fusion and collaborative analysis that exceeds the capabilities of individual drone platforms operating independently.

The Queen drone implements edge computing capabilities specifically optimized for real-time analysis of incoming Worker drone data streams, employing advanced artificial intelligence algorithms, multi-modal sensor fusion techniques, and intelligent data prioritization systems. Edge computing processing at the Queen drone level enables immediate analysis of full motion video feeds, automated target detection and tracking, pattern recognition across multiple sensor modalities, and real-time threat assessment without dependence on external computing resources or communication connectivity.

Real-time analysis capabilities include automated object detection and classification across video feeds from multiple Worker drones, enabling the Queen drone to identify and track targets of interest, potential threats, and mission-relevant objects across the entire swarm's sensor coverage area. Multi-source data correlation algorithms can combine sensor inputs from multiple Worker drones to provide enhanced target identification accuracy, environmental assessment capabilities, and situational awareness that exceeds individual platform limitations.

The Queen drone's edge computing systems may implement intelligent data filtering and relevance assessment algorithms that automatically identify operationally significant information within incoming data streams, including, but not limited to, threat detections, target identifications, environmental changes, and mission-critical observations. This automated relevance assessment enables the Queen drone to prioritize data transmission to field servers based on operational significance, time sensitivity, and mission objectives while maintaining local storage of comprehensive data for detailed analysis when communication bandwidth permits.

Following real-time edge computing analysis, the Queen drone selectively transmits operationally relevant information to field servers and/or command networks, significantly reducing communication bandwidth requirements while ensuring that mission-critical intelligence reaches decision-makers immediately. The selective transmission protocol can be configured to prioritize high-value intelligence including target coordinates, threat assessments, mission status updates, and time-sensitive operational information while maintaining the option to transmit full raw data streams when specifically requested or when operational conditions permit.

In some aspects, intelligent bandwidth optimization algorithms automatically adjust transmission parameters based on available communication capacity, operational priorities, and field server processing requirements. The Queen drone maintains awareness of field server capabilities and communication network status, enabling dynamic adjustment of data transmission formats, compression levels, and update frequencies to optimize information delivery without overwhelming communication systems or processing capabilities.

The selective transmission system may implement configurable priority matrices that enable operators to specify data types, intelligence categories, and information priorities that should receive preferential transmission treatment. Configurable emergency protocols ensure that critical threat information, immediate tactical intelligence, and safety-related alerts receive highest priority transmission regardless of communication limitations or bandwidth constraints.

The system provides operator control over data prioritization, enabling mission commanders to specify information types, data streams, and intelligence categories (among other possible parameters) that should receive preferential processing and transmission treatment based on current mission objectives and operational requirements. Operators can dynamically adjust prioritization parameters throughout mission execution, ensuring that data processing and transmission adapt to changing tactical conditions and evolving intelligence requirements.

In some implementations, raw full motion video (FMV) transmission capabilities enable operators to request complete, unprocessed video feeds from specific Worker drones or geographic areas when detailed analysis or real-time monitoring requires full-resolution imagery. The system maintains the flexibility to transmit raw FMV streams while continuing edge computing analysis and selective information transmission, ensuring that operators receive both immediate intelligence products and comprehensive raw data when mission requirements dictate.

Operator prioritization controls extend to all sensor data types including electro-optical imagery, infrared thermal feeds, LiDAR and photogrammetry mapping data, audio recordings, chemical detection readings, and environmental monitoring information. Priority settings can be configured based on, for example, geographic areas, time windows, threat conditions, or specific mission phases, enabling dynamic adaptation of data processing and transmission to match operational tempo and intelligence requirements.

The prioritization system implements user-friendly interfaces that enable operators to modify data priorities using natural language commands, graphical interfaces, or preconfigured priority profiles that match common operational scenarios. Real-time feedback provides operators with immediate awareness of data processing status, transmission queue management, and communication bandwidth utilization, enabling informed decisions about data prioritization and resource allocation.

One or more adaptive compression algorithms automatically optimize data transmission based on content type, operational priorities, and available bandwidth, ensuring maximum information density within communication constraints. The system may implement intelligent caching and buffering capabilities that enable continued operation during communication disruptions while automatically synchronizing with field servers when connectivity is restored.

Communication redundancy protocols ensure that critical information reaches field servers through multiple transmission pathways, including direct Queen-to-server communications, relay through other Queen drones, and emergency communication protocols that guarantee delivery of mission-critical intelligence even during communication system degradation.

Integration with artificial intelligence systems enables agentic analysis and decision-making at the edge computing level, supporting autonomous mission adaptation and tactical response without requiring external authorization or processing delays. The edge computing architecture supports all operational modes from tactical short-duration missions requiring immediate intelligence delivery to strategic long-duration operations requiring sustained autonomous analysis and selective information transmission.

Sensor suite 122 of subordinate drone 120 may comprise a plurality of sensing modalities and sensor hardware. In a preferred embodiment, sensor suite 122 comprises compact electro-optical camera systems providing visual surveillance and target identification capabilities, lightweight chemical detection sensors enabling distributed threat detection across the swarm, audio sensors configured for environmental monitoring and acoustic signature analysis, and mission-specific payload sensors that can be configured based on operational requirements.

Sensor suite 122 is designed with reduced size, weight, and power consumption compared to command drone sensor suite 112, while maintaining essential sensing capabilities necessary for subordinate drone mission execution and coordination with the broader swarm.

According to an embodiment, a communication system 123 of subordinate drone 120 implements communication protocols and hardware compatible with command drone communication system 113, enabling seamless integration within the mesh network topology. The system may comprise scaled versions of the multi-modal communication capabilities, supporting laser, radio frequency, and visual communication channels with appropriate encryption and networking protocols. In some aspects, communication system 123 further includes data relay capabilities enabling subordinate drones to serve as communication nodes for extended range operations and mesh network redundancy.

In various embodiments, the autonomous drone swarm system incorporates a multi-layered navigation architecture that combines traditional positioning methods with novel on-board computation and collaborative positioning innovations specifically designed for the hierarchical Queen-Worker swarm architecture. While the system utilizes established positioning technologies including GPS/GNSS receivers with anti-jamming capabilities and inertial navigation systems (INS) for GPS-denied environments, the system utilizes an integrated on-board computation and correction system that enables precise autonomous navigation without reliance on external positioning signals.

The system implements an on-board computation and correction methodology wherein each drone, both command and subordinate platforms, is preloaded with detailed local maps of the operational area prior to mission deployment. These local maps may comprise terrain elevation data, obstacle locations, landmark positions, and geographic reference points that serve as navigation anchors for autonomous position calculation. Upon mission initiation, each drone establishes a last known reliable position using available positioning systems, then continuously updates its location through real-time telemetry data processing without dependence on external navigation signals.

The on-board computation algorithms process telemetry data including, but not limited to, altitude measurements from barometric and radar altimetry, speed and acceleration data from inertial measurement units, bearing and heading information from magnetometer and gyroscopic systems, and environmental factors such as wind speed and direction for drift correction calculations. Advanced algorithmic processing integrates this multi-source telemetry data with preloaded map information to calculate precise positioning coordinates, enabling accurate navigation even in GPS-unavailable environments such as underground facilities, urban canyons with satellite signal blockage, or electromagnetically contested operational areas where external positioning signals are jammed or unreliable. In various embodiments, the navigation system implements collaborative positioning enhancement enabled through the multi-modal mesh communication network described herein. Drones continuously share computed position data and real-time telemetry measurements across the encrypted mesh network, enabling distributed data fusion and correction algorithms that enhance swarm-wide positioning accuracy beyond individual drone capabilities. When individual drones encounter positioning uncertainties or conflicting navigation data, the collaborative system provides position verification and correction through comparison with neighboring drone positions and collective telemetry analysis.

The collaborative navigation algorithms may implement distributed consensus protocols that weight position data based on confidence levels, recent calibration status, and cross-validation with multiple drone positions within the swarm network. This approach enables the swarm to maintain accurate relative positioning even when absolute positioning becomes unavailable, ensuring coordinated formation flying, collision avoidance, and tactical maneuvering without external navigation support. The mesh network collaboration particularly enhances navigation reliability during extended operations in signal-denied environments by providing continuous position cross-checking and drift correction across the entire swarm.

The navigation capabilities described herein are specifically tailored to support the hierarchical Queen-Worker swarm architecture, with differentiated navigation responsibilities and capabilities optimized for command and subordinate drone roles. Queen drones can implement enhanced navigation processing capabilities including, but not limited to, master position calculations, swarm-wide navigation coordination, and integration with mission planning algorithms that optimize drone positioning for tactical and operational objectives. Queen drones can serve as navigation reference nodes for subordinate drones, providing position verification, drift correction, and navigation guidance when individual Worker drones encounter navigation difficulties.

Worker drones implement streamlined navigation processing optimized for formation flying, tactical maneuvering, and coordination with Queen drone navigation commands while maintaining autonomous navigation capabilities for individual task execution. The hierarchical navigation architecture enables efficient resource utilization by concentrating advanced navigation processing at Queen drones while maintaining distributed navigation capability throughout the swarm. Navigation task distribution protocols automatically adjust navigation responsibilities based on drone availability, with Worker drones capable of assuming enhanced navigation roles when Queen drones become unavailable, ensuring navigation continuity despite individual drone failures.

The navigation system builds upon established principles of dead reckoning navigation, including position calculation based on last known reliable position combined with subsequent movement measurements. However, the present system extends this approach significantly through integration of preloaded local maps that provide geographic reference anchors, comprehensive multi-source telemetry processing that incorporates environmental correction factors, and collaborative mesh network positioning that enables swarm-wide navigation enhancement.

The combination of on-board map integration, comprehensive telemetry processing, and collaborative swarm navigation represents a novel approach specifically designed for autonomous swarm operations that exceeds existing capabilities in GPS-denied environments. The hierarchical Queen-Worker integration provides navigation optimization and fault tolerance not present in conventional navigation systems, while the multi-modal mesh network collaboration enables distributed navigation processing that enhances accuracy and reliability beyond individual platform capabilities. These innovations collectively enable the autonomous drone swarm system to maintain precise navigation and coordination capabilities in operational environments where conventional GPS-dependent navigation systems would fail.

The on-board computation system implements several algorithmic approaches for position calculation and correction. Map-referenced position calculation algorithms correlate real-time sensor data with preloaded map features to provide absolute position updates when geographic landmarks can be detected through one or more of electro-optical, infrared, or LiDAR and photogrammetry sensors. Telemetry fusion algorithms process multiple data streams including, but not limited to, barometric altitude, inertial acceleration, magnetic heading, and wind vector measurements to calculate position changes with compensation for environmental factors and measurement errors.

In some embodiments, collaborative positioning algorithms implement distributed Kalman filtering across the mesh network, enabling each drone to improve its position estimates through incorporation of neighboring drone telemetry and position data. The system maintains position confidence metrics that indicate navigation accuracy and reliability, enabling automatic switching between navigation methods based on environmental conditions and available reference sources. Emergency navigation protocols provide backup positioning methods including, but not limited to, visual landmark recognition, terrain matching algorithms, and manual position input capabilities that ensure navigation continuity under extreme operational conditions.

The navigation systems integrate seamlessly with other system components including the artificial intelligence mission planning algorithms that optimize drone positioning for tactical objectives, the fault-tolerant operation protocols that maintain navigation capability despite individual drone failures, and the multi-modal communication system that enables collaborative navigation data sharing. The navigation system supports all operational modes from tactical short-duration missions requiring precise formation flying to strategic long-duration operations requiring sustained navigation accuracy across large geographic areas.

Navigation data integration with sensor fusion algorithms enhances environmental awareness and target detection capabilities by providing precise platform positioning for sensor correlation and target location calculation. The navigation system coordinates with power management protocols to optimize navigation processing based on available battery capacity, adjusting navigation update rates and algorithm complexity to balance accuracy with power consumption requirements. Integration with external system connectivity enables navigation data sharing with military command systems, civilian emergency response networks, and commercial operational centers as mission requirements dictate.

The detailed component architecture illustrated in FIG. 2 demonstrates the modular integration approach utilized throughout the autonomous drone swarm system, wherein standardized interfaces between subsystems enable flexible configuration, simplified maintenance, and scalable manufacturing. The ruggedized airframe construction provides environmental protection rated to IP66 standards, shock and vibration resistance, and temperature operation ranges suitable for diverse operational environments. The modular payload bay design enables rapid reconfiguration of both command and subordinate drones for mission-specific requirements while maintaining the core autonomous coordination and communication capabilities essential to swarm operations.

FIG. 3 is a block diagram illustrating an artificial intelligence integration architecture, according to an embodiment. As shown, the AI framework comprises three interconnected subsystems (but may comprise more or less depending upon the mission parameters and use case) that collectively enable autonomous swarm coordination, natural language command processing, and intelligent environmental analysis. The drone AI integration processing system 300 implements various software and algorithmic systems that can operate within the processing systems 111 and 121, providing intelligent decision-making capabilities.

According to an embodiment, large language model processing 330 may be configured as the primary artificial intelligence component of command drone 110, implementing advanced natural language understanding and mission planning capabilities. LLM processing subsystem 330 incorporates a fine-tuned large language model (e.g., based on the LLaMA-13B architecture or equivalent neural network implementation) configured to interpret diverse forms of human operator input including, but not limited to, voice commands, text instructions, and gesture recognition signals. The natural language processing component converts high-level operator directives into structured mission parameters and specific task assignments suitable for autonomous execution by the drone swarm. LLM processing 330 may further comprise contextual awareness algorithms that analyze current environmental conditions, available swarm resources, and ongoing mission status to generate contextually appropriate mission plans and tactical adaptations.

According to an embodiment, LLM processing 330 implements a hybrid retrieval-augmented generation (RAG) and cache-augmented generation (CAG) architecture that enables both real-time processing in connected environments and offline functionality in contested or signal-denied operational areas. The RAG pipeline retrieves real-time intelligence data, mission updates, and environmental information from external sources and incorporates this dynamic information into mission planning and decision-making processes. The CAG pipeline maintains cached doctrinal knowledge, standard operating procedures, and mission templates stored locally on the drone platforms, enabling continued intelligent operation even when communication with external command systems is unavailable.

According to an aspect, LLM processing system 330 further includes contextual awareness algorithms that analyze current environmental conditions, available swarm resources, and ongoing mission status to generate contextually appropriate mission plans and tactical adaptations. Decision support algorithms within LLM processing 330 provide real-time analysis and recommendations for mission commanders, including, but not limited to, automated assessment of unit readiness, resource allocation optimization, and tactical positioning recommendations. For example, the system can generate insights such as "Third Platoon optimal for overwatch position at grid 36T FJ 1234 5678 based on current ammunition levels and terrain analysis" or "Recommend repositioning Second Squad to flanking position due to detected enemy movement pattern.

According to an implementation of an embodiment, the mission planning algorithms within LLM processing 330 employ hierarchical task decomposition methodologies to convert abstract mission objectives into specific, executable tasks suitable for delegation to subordinate drones 120. The system maintains dynamic mission models that can be updated in real-time based on changing environmental conditions, operator input modifications, or unexpected operational challenges. Integration with the container orchestration system (e.g., Kubernetes or similar) enables modular deployment and scaling of AI processing workloads across available computational resources within the swarm, optimizing processing efficiency while maintaining responsiveness to time-critical mission requirements.

In some embodiments, LLM processing 330 incorporates specialized fine-tuning on military doctrinal texts including Army Doctrine Publication (ADP) 7-0 for training operations and Field Manual (FM) 3-0 for operational guidance, ensuring that generated recommendations and mission plans align with established military doctrine and best practices. This doctrinal grounding enables the system to provide tactically sound recommendations that support commander decision-making while maintaining consistency with military training and operational standards.

According to an embodiment, multi-agent coordination subsystem 331 designed as a flexible, pluggable platform capable of integrating a comprehensive range of advanced swarm coordination algorithms based on mission requirements, operational environments, and performance optimization needs. Rather than relying on a single coordination methodology, subsystem 331 provides a modular algorithmic framework that enables dynamic selection and integration of multiple coordination approaches including, but not limited to, graph-based consensus methods, cross-entropy optimization techniques, centroid-based dynamic partitioning algorithms, federated learning coordination models, and reinforcement learning frameworks. In This pluggable integration architecture enables coordination subsystem 331 to adapt its algorithmic approach based on specific operational parameters including swarm size, mission complexity, environmental constraints, communication limitations, and performance requirements. The flexible platform supports integration of emerging coordination algorithms as they become available, ensuring that the system remains at the forefront of swarm coordination technology while maintaining backward compatibility with existing algorithmic implementations.

The modular coordination framework implements standardized interfaces and application programming interfaces that enable rapid integration of new coordination algorithms without requiring fundamental system redesign or hardware modification. Algorithm selection and switching can occur dynamically during mission execution based on real-time performance assessment, environmental changes, or operational requirements, providing unprecedented adaptability in autonomous swarm coordination capabilities.

According to an embodiment, the system is configured to support multi-agent deep deterministic policy gradient (MADDPG) integration. The MADDPG implementation within the pluggable framework enables each drone to make autonomous tactical decisions based on local observations and learned coordination policies while maintaining coordination with overall swarm objectives and mission parameters. The framework supports dynamic task redistribution, adaptive formation control, and collaborative decision-making that optimizes individual drone capabilities within collective mission requirements.

Integration of MADDPG within the pluggable coordination architecture enables seamless switching to alternative algorithms when operational conditions favor different coordination approaches, such as graph-based methods for communication-constrained environments or cross-entropy optimization for complex task assignment scenarios. The modular implementation ensures that MADDPG capabilities remain available while enabling exploration of enhanced coordination methods as mission requirements evolve.

According to an embodiment, the coordination subsystem integrates graph-based consensus algorithms that provide robust communication and coordination capabilities particularly suited for communication-constrained environments and large-scale swarm operations. Multi-layer graph-based consensus control algorithms enable scalable coordination across extensive drone networks by implementing hierarchical coordination structures that maintain efficiency and responsiveness despite increasing swarm complexity.

Connectivity-maintenance algorithms within the graph-based framework ensure robust communication pathways throughout the swarm network, automatically adapting network topology and communication protocols to maintain coordination effectiveness despite individual drone failures, communication disruptions, or environmental interference. The graph-based approach provides mathematical guarantees for consensus achievement and coordination stability that are particularly valuable for mission-critical operations requiring high reliability and predictable coordination behavior.

Graph-based consensus methods excel in scenarios requiring distributed decision-making across large drone formations, coordinated area coverage with minimal overlap, and formation control that must adapt to changing environmental constraints while maintaining specific geometric relationships. The integration enables automatic selection of graph-based coordination when mission parameters favor distributed consensus approaches over centralized coordination methods.

According to an embodiment, the pluggable coordination framework incorporates adaptive cross-entropy optimization methods specifically designed for complex task assignment and resource allocation scenarios where traditional optimization approaches may struggle with computational complexity or dynamic environmental conditions. Cross-entropy methods provide robust optimization capabilities for multi-objective task assignment problems that consider drone capabilities, mission priorities, environmental constraints, and resource limitations simultaneously.

Adaptive cross-entropy algorithms enable dynamic task reassignment based on changing mission conditions, drone availability, and performance feedback, ensuring optimal resource utilization throughout mission execution. The cross-entropy approach excels in scenarios involving complex mission planning with multiple competing objectives, resource-constrained operations requiring optimal allocation decisions, and dynamic environments where task priorities may change based on emerging threats or opportunities.

Integration of cross-entropy optimization within the coordination subsystem enables automatic algorithm selection when mission parameters involve complex optimization problems that benefit from probabilistic optimization approaches rather than deterministic coordination methods. The adaptive nature of cross-entropy methods provides robust performance across diverse operational scenarios while maintaining computational efficiency suitable for real-time coordination requirements.

According to an embodiment, the coordination subsystem integrates centroid-based area partitioning algorithms that provide spatial coordination capabilities for exploration missions, area coverage operations, and surveillance tasks requiring optimal geographic distribution of drone resources. Centroid-based dynamic partitioning enables automatic division of operational areas among available drones while maintaining optimal coverage patterns and minimizing coordination overhead.

Dynamic partitioning algorithms automatically adapt area assignments based on drone performance, environmental conditions, mission priority changes, and resource availability, ensuring optimal spatial coverage throughout mission execution. The centroid-based approach provides mathematical optimization of coverage efficiency while maintaining coordination simplicity that reduces communication requirements and computational overhead compared to more complex spatial coordination methods.

Centroid-based algorithms excel in scenarios requiring systematic area exploration, persistent surveillance with optimal coverage patterns, search and rescue operations across large geographic areas, and environmental monitoring requiring comprehensive spatial sampling. The integration enables automatic selection of centroid-based coordination when mission parameters favor spatial optimization over temporal coordination priorities.

According to an embodiment, the pluggable coordination framework incorporates advanced federated learning coordination models that enable distributed machine learning and coordination improvement across the drone swarm without requiring centralized training data or processing resources. Federated learning coordination enables each drone to contribute to collective intelligence improvement while maintaining data privacy and reducing communication bandwidth requirements for coordination enhancement.

Federated learning models enable continuous improvement of coordination algorithms based on operational experience, environmental adaptation, and mission outcome analysis, ensuring that coordination effectiveness improves over time through collective learning experiences. The distributed learning approach enables coordination algorithm optimization based on real-world operational data while maintaining individual drone autonomy and reducing dependence on external training resources.

Integration of federated learning within the coordination subsystem enables automatic coordination algorithm improvement through operational experience, adaptive coordination strategies that evolve based on environmental conditions and mission success metrics, and distributed intelligence development that enhances swarm coordination capabilities without compromising operational security or requiring external connectivity.

According to an embodiment, the coordination subsystem integrates reinforcement learning frameworks that enable joint optimization of communication protocols and coordination actions, providing enhanced coordination effectiveness through learned communication strategies and adaptive action selection. Reinforcement learning approaches enable the swarm to develop optimal communication patterns and coordination behaviors based on mission outcomes and environmental feedback.

Joint communication and action learning algorithms enable automatic optimization of communication protocols based on environmental conditions, mission requirements, and coordination effectiveness, ensuring that communication resources are utilized optimally while maintaining coordination performance. The reinforcement learning approach enables development of specialized coordination behaviors adapted to specific operational environments, mission types, and performance requirements.

Reinforcement learning integration provides capabilities for adaptive coordination strategy development based on mission success metrics, environmental adaptation through learned behaviors that optimize coordination effectiveness in specific operational conditions, and communication protocol optimization that balances coordination requirements with bandwidth limitations and security considerations.

The pluggable coordination architecture may implement algorithm selection and dynamic switching capabilities that enable automatic optimization of coordination approaches based on real-time operational conditions, mission requirements, and performance feedback. Algorithm selection algorithms automatically evaluate current operational parameters against coordination algorithm capabilities to select optimal coordination methods for specific operational scenarios.

Dynamic switching protocols enable transition between coordination algorithms during mission execution when operational conditions change, mission requirements evolve, or performance optimization opportunities arise. The switching protocols maintain coordination continuity and mission effectiveness throughout algorithmic transitions while enabling optimization of coordination approaches based on emerging operational requirements.

Performance monitoring and assessment algorithms continuously evaluate coordination effectiveness across available algorithmic options, enabling automatic algorithm selection based on empirical performance data rather than theoretical optimization criteria. This approach ensures that coordination algorithm selection adapts to real-world operational conditions and mission-specific requirements rather than relying solely on predetermined algorithmic preferences.

The pluggable coordination algorithm architecture integrates seamlessly with the hierarchical Queen-Worker coordination structure, multi-modal communication systems, and fault-tolerant operation protocols while providing enhanced flexibility and adaptability across diverse operational scenarios. The modular approach enables coordination algorithm optimization without compromising core system capabilities or requiring fundamental architectural modifications.

Integration with artificial intelligence systems enables coordination algorithm selection based on mission analysis, environmental assessment, and performance prediction, ensuring optimal coordination approaches for specific operational requirements. The pluggable framework supports coordination across all operational modes from tactical short-duration missions requiring rapid coordination response to strategic long-duration operations requiring sustained coordination efficiency and adaptability.

The flexible coordination architecture provides significant advantages for diverse mission profiles, varying operational environments, and evolving coordination requirements while maintaining the autonomous coordination and fault-tolerant operation capabilities that characterize the overall system design. This versatility ensures that the drone swarm system remains effective across the full spectrum of operational scenarios while providing a foundation for integration of future coordination algorithm developments.

In some embodiments, multi-agent coordination 331 includes dynamic task redistribution algorithms that continuously monitor individual drone performance, capability status, and environmental conditions to optimize task assignments across the swarm. When individual drones become unavailable due to equipment failure, communication loss, or other operational constraints, coordination system 331 automatically redistributes assigned tasks to available drones while maintaining mission continuity and effectiveness. The coordination algorithms can implement swarm behavior optimization protocols that balance individual drone capabilities with collective mission requirements, ensuring optimal sensor coverage, communication relay efficiency, and overall mission success probability.

Federated learning protocols within multi-agent coordination 331 enable distributed AI model training and coordination across the swarm network, allowing individual drones to contribute to collective intelligence while maintaining operational security and minimizing communication bandwidth requirements. For example, when multiple subordinate drones 120 encounter similar terrain features or target types during a mission, each drone's local AI inference system processes the encountered data and generates model weight updates based on its individual observations. Rather than transmitting raw sensor data or imagery, each drone transmits only the compressed model parameter updates to command drone 110, which aggregates these updates to improve the overall swarm's target recognition accuracy and environmental awareness capabilities. This federated approach enables the entire swarm to benefit from localized learning experiences while preserving bandwidth and maintaining operational security, as raw intelligence data never leaves individual drones. The federated learning implementation enables continued coordination and performance improvement even in communication-constrained or contested environments where traditional centralized coordination approaches would fail.

Sensor fusion and environmental analysis subsystem 332 integrates data streams from the comprehensive sensor suites 112 and 122, employing advanced AI algorithms to create comprehensive environmental awareness and actionable intelligence. The sensor fusion subsystem 332 implements multi-modal data integration algorithms that combine electro-optical imagery, infrared thermal data, LiDAR and photogrammetry three-dimensional mapping, radio frequency signal analysis, and chemical detection information into unified environmental models supporting tactical decision-making and mission execution.

According to an aspect, sensor fusion components 332 incorporates intelligent data prioritization algorithms that automatically identify and highlight critical information for relay to command centers and field operators/fog servers. The system processes multiple data streams simultaneously and determines information priority based on tactical significance, time sensitivity, and mission objectives. For example, the system automatically prioritizes detection of enemy vehicle movements over routine environmental monitoring data, ensuring that mission-critical intelligence receives immediate attention and transmission priority.

According to an embodiment, an environmental analysis component of subsystem 332 employs real-time three-dimensional environmental mapping algorithms utilizing one or more of LiDAR and photogrammetry point cloud data, photogrammetry mesh generation, and digital elevation model (DEM) processing to create detailed terrain models supporting navigation, positioning, and tactical analysis. Terrain analysis algorithms implement one or more terrain detection methodologies identifying optimal vantage points, overwatch positions, and tactical positioning opportunities based on elevation, line-of-sight characteristics, cover availability, and communication signal propagation properties. For example, a particular terrain analysis algorithm that can be implemented in some embodiments of subsystem 332 comprises a multi-candidate viewpoint filtering algorithm for terrain viewshed selection. The multi-candidate viewpoint filtering algorithm may comprise the steps of: using the Empty Circles based K-means algorithm to determine initial centers for candidate viewpoint clustering; using a viewpoint evaluation metric (e.g., Weighted Coverage Overlap Metric) to divide the viewshed of candidate points into coverage contribution points and overlap contribution points, computes WCOM based on this division, and stores the values in a min-heap; and adding and deleting the viewpoints from clusters by adjusting the sets of coverage contribution points and overlap contribution points.

According to an embodiment, target recognition and classification algorithms within sensor fusion 332 employ computer vision neural networks trained for identifying and classifying objects, personnel, vehicles, and potential threats within the operational environment. The target recognition system supports automated threat assessment protocols and provides real-time intelligence updates to mission commanders and integrated command and control systems. In some implementations, performance metrics for the target recognition algorithms target ROUGE-2 scores of 0.40 or higher for summary generation accuracy, ensuring reliable capture and communication of key mission elements and tactical intelligence. Nuclear, biological, and chemical (NBC) threat detection algorithms may be deployed on the drone platforms to analyze sensor data from specialized detection systems to identify and classify potential NBC threats, providing early warning capabilities and supporting force protection requirements. In some embodiments, the system maintains comprehensive threat libraries and can automatically correlate detected signatures with known threat patterns, providing rapid threat identification and recommended response procedures. Integration with mobile interfaces (e.g., tablets, mobile devices, computing systems, etc.) ensures that threat information and tactical intelligence can be accessed and utilized by field commanders through familiar and reliable interface systems. Computer vision supports not only obstacle avoidance and light-based communication, but also high-confidence target recognition, threat prioritization, and dynamic mission re-tasking based on real-time scene interpretation.

AI integration system 300 enables the distributed processing approach utilized throughout the autonomous drones swarm system, wherein AI processing workloads are distributed across available computational resources within the swarm based on current processing demands, communication connectivity, and individual drone capabilities. Edge computing capabilities enable critical AI functions to continue operating despite communication disruptions or network segmentation, ensuring continued autonomous operation and mission effectiveness. The modular AI architecture supports dynamic reconfiguration and scaling based on mission requirements, available resources, and operational constraints, providing flexibility and adaptability essential for diverse operational scenarios and evolving tactical requirements.

FIG. 4 is a block diagram illustrating an exemplary communication architecture for the multi-modal communication systems, encryption protocols, and mesh network topology that enable resilient coordination and data transmission throughout the autonomous drone swarm system, according to an embodiment. The communication architecture 400 provides redundant communication pathways utilizing multiple transmission modalities to ensure continued operation in contested, signal-denied, or environmentally challenging operational environments where conventional single-mode communication systems would fail.

The multi-modal communication framework comprises three distinct but integrated communication channels that collectively provide comprehensive connectivity across the drone swarm network. According to an aspect, a laser communication system 441 is present and configured to implement high-bandwidth directional communication utilizing self-pulsing laser diode arrays mounted on each drone platform. Laser communication system 441 may comprise automatic beam steering mechanisms that enable dynamic targeting and acquisition of communication partners based on relative positioning and communication requirements. Atmospheric compensation algorithms within laser communication system 441 adjust transmission parameters to account for varying weather conditions, atmospheric density variations, and environmental interference factors that could degrade optical communication performance. Laser communication system 441 provides the highest bandwidth communication channel within the multi-modal framework, enabling high-resolution imagery transmission, detailed mission data sharing, and real-time coordination information exchange between drones within line-of-sight ranges.

According to an embodiment, a radio frequency (RF) communication system 442 is present and configured as a multi-modal radio frequency communication architecture that integrates diverse communication technologies to provide comprehensive connectivity across varying mission requirements, operational environments, and spectrum conditions. The modular RF communication system 442 incorporates software-defined radio (SDR) capabilities, Low Power Wide Area Network (LPWAN) protocols, Long Range Wide Area Network (LoRaWAN) for extended telemetry, WiFi and Bluetooth for local high-throughput networking, and LaserFi/LiFi optical communication for secure line-of-sight operations in electromagnetically sensitive environments.

The integrated multi-modal approach ensures communication redundancy and resilience that exceeds single-mode communication systems, providing multiple independent communication pathways that maintain coordination effectiveness despite individual communication channel failures, jamming attempts, or environmental interference. Each communication modality contributes specific operational advantages while integrating seamlessly within the overall mesh network topology and fault-tolerant communication architecture.

A software-defined radio (SDR) implementation provides the foundation for adaptive communication capabilities, enabling flexible frequency allocation, dynamic protocol switching, and sophisticated anti-jamming measures across multiple frequency bands and communication standards. SDR capabilities include frequency-hopping spread spectrum protocols that provide resistance to jamming and interception attempts while maintaining reliable communication across extended ranges and challenging environmental conditions.

Dynamic protocol adaptation algorithms automatically select optimal communication protocols based on current spectrum conditions, interference levels, and mission security requirements, ensuring optimal communication performance despite changing operational environments. The SDR framework supports multiple simultaneous communication protocols, enabling the swarm to maintain connectivity across diverse frequency bands and communication standards while adapting to emerging threats and operational requirements.

Anti-jamming capabilities within the SDR implementation include adaptive frequency selection that automatically avoids contested or jammed frequency bands, power management protocols that optimize transmission power based on communication requirements and signature management needs, and protocol switching that transitions between communication methods when primary channels become unavailable or compromised.

LPWAN protocols provide extended range communication capabilities optimized for power-efficient operation during sustained missions where battery conservation is critical for operational endurance. The LPWAN implementation enables communication across distances exceeding conventional radio frequency ranges while maintaining minimal power consumption that supports extended operational periods without compromising communication effectiveness.

LPWAN integration supports low-data-rate telemetry and coordination messaging that maintains essential coordination capabilities during power-constrained operations, emergency communication protocols that provide backup connectivity when primary communication systems become unavailable, and long-range relay capabilities that enable communication beyond line-of-sight limitations through multi-hop networking protocols.

The LPWAN framework integrates seamlessly with power management systems to optimize communication scheduling based on available battery capacity, mission duration requirements, and communication priority levels, ensuring that essential coordination capabilities are maintained throughout extended operations while preserving power resources for mission-critical activities.

Long range wide area network capabilities provide specialized low-power, long-range telemetry communication that excels in scenarios requiring persistent status monitoring, environmental data collection, and coordination messaging across extensive geographic areas with minimal power consumption. LoRaWAN integration enables the drone swarm to maintain telemetry connectivity across ranges up to several kilometers while operating on minimal power budgets that support sustained surveillance and monitoring operations.

LoRaWAN protocols support adaptive data rate optimization that automatically adjusts transmission parameters based on signal quality, distance requirements, and power availability, ensuring optimal balance between communication range, data throughput, and battery conservation. The LoRaWAN implementation provides robust communication in challenging RF environments through spread spectrum techniques and error correction protocols that maintain connectivity despite interference and signal degradation.

Integration with mission planning algorithms enables automatic LoRaWAN activation for extended-duration operations requiring persistent telemetry, environmental monitoring missions where continuous data collection is essential, and strategic operations where long-range coordination must be maintained with minimal electromagnetic signature. LoRaWAN capabilities provide critical backup communication for scenarios where primary communication systems may be compromised or unavailable.

The communication architecture integrates WiFi and Bluetooth capabilities that provide high-throughput, short-range networking for scenarios requiring rapid data exchange, local coordination, and integration with external systems. WiFi implementation supports high-bandwidth data transmission for applications including real-time video streaming, comprehensive sensor data sharing, and rapid mission data upload during maintenance and operational transition periods.

Bluetooth integration provides secure, low-power local networking that enables device pairing for maintenance operations, sensor calibration procedures, and integration with operator control devices including tablets, smartphones, and specialized command interfaces. The Bluetooth implementation supports mesh networking protocols that enable multi-drone local coordination and data sharing within confined operational areas.

WiFi and Bluetooth capabilities enable rapid integration with existing network infrastructure during operations near friendly facilities, emergency communication with civilian networks during disaster response operations, and high-speed data transfer for mission briefing, sensor calibration, and operational coordination when high-bandwidth local connectivity is available.

Dynamic network selection algorithms automatically identify and connect to appropriate WiFi networks based on security protocols, operational authorization, and mission requirements, while Bluetooth discovery and pairing protocols enable automatic device recognition and secure connection establishment for authorized devices and systems.

In some embodiments, the communication system integrates advanced Laser Fidelity (LaserFi) and Light Fidelity (LiFi) optical communication technologies that provide secure, high-bandwidth communication capabilities specifically designed for electromagnetically sensitive environments where traditional RF communication may be restricted, detected, or compromised. LaserFi implementation utilizes modulated laser communication that provides extremely high bandwidth data transmission across line-of-sight distances while maintaining minimal electromagnetic signature.

LiFi capabilities employ visible and near-infrared light modulation for secure communication that is virtually undetectable to conventional electronic surveillance systems while providing substantial data transmission capabilities for coordination, sensor data sharing, and tactical communication requirements. The optical communication systems include atmospheric compensation algorithms that maintain communication effectiveness despite environmental factors including atmospheric turbulence, weather conditions, and visibility limitations.

Optical communication excels in scenarios requiring covert operations where electromagnetic signature management is critical, communications security operations where conventional RF communication may be compromised, and high-security environments where optical isolation provides enhanced protection against electronic warfare and interception attempts. The LaserFi/LiFi systems provide secure alternative communication pathways that supplement RF communication capabilities while offering unique operational advantages for specialized mission requirements.

Automatic beam steering and target acquisition algorithms enable dynamic optical communication link establishment between mobile drone platforms, while adaptive modulation protocols optimize data transmission based on atmospheric conditions, distance requirements, and communication quality assessment.

The multi-modal communication architecture implements one or more communication selection and adaptive switching algorithms that automatically optimize communication methods based on real-time operational conditions, mission requirements, and performance assessment. Communication selection algorithms evaluate available communication options against current operational parameters including range requirements, bandwidth needs, power constraints, security requirements, and electromagnetic signature management priorities.

Adaptive switching protocols enable seamless transition between communication modalities when operational conditions change, primary communication channels become unavailable, or mission requirements evolve during execution. The switching protocols maintain coordination continuity throughout communication transitions while optimizing communication effectiveness for current operational scenarios.

Mission-adaptive communication protocols automatically configure communication parameters based on operational mode selection, with tactical operations emphasizing rapid response and high-bandwidth coordination, operational missions balancing communication effectiveness with power conservation, and strategic deployments optimizing long-range connectivity and signature management for sustained operations.

Environmental adaptation algorithms continuously monitor communication channel performance, interference levels, and environmental conditions to proactively adjust communication strategies before degradation affects coordination effectiveness. The adaptive approach ensures optimal communication performance across diverse operational environments while maintaining resilience against environmental challenges and hostile interference.

The communication architecture provides robust capabilities for operation in contested spectrum environments where hostile jamming, interference, and electronic warfare may compromise conventional communication systems. Multi-modal redundancy ensures that jamming of individual communication channels does not eliminate coordination capabilities, while frequency diversity across multiple communication modalities provides resistance to broadband jamming attempts.

Automatic spectrum analysis and interference detection algorithms continuously monitor communication channels across all modalities to identify optimal communication opportunities and avoid contested frequency bands. Dynamic frequency selection enables rapid adaptation to changing spectrum conditions while maintaining coordination effectiveness and mission continuity.

Anti-jamming protocols may comprise automatic power adjustment to overcome interference, adaptive modulation that optimizes signal quality despite jamming attempts, and communication channel hopping that rapidly switches between available communication modalities to maintain connectivity despite hostile electronic warfare operations. The integrated approach provides comprehensive protection against sophisticated jamming techniques while maintaining operational effectiveness.

The multi-modal RF communication system integrates with the hierarchical Queen-Worker coordination architecture, distributed edge computing capabilities, and fault-tolerant operation protocols while providing enhanced communication flexibility and adaptability across diverse operational scenarios. Communication modality selection integrates with artificial intelligence systems to optimize communication strategies based on mission analysis, environmental assessment, and performance prediction.

Integration with power management systems enables communication optimization based on available battery capacity and mission duration requirements, while coordination with navigation systems provides location-aware communication optimization that considers geographic constraints and communication pathway limitations. The modular communication architecture supports all operational modes from tactical short-duration missions requiring rapid coordination to strategic long-duration operations requiring sustained communication effectiveness across extensive geographic areas.

The comprehensive communication capabilities enhance the autonomous coordination and fault-tolerant operation characteristics of the overall system while providing unprecedented communication flexibility that adapts to diverse mission requirements, operational environments, and technological constraints encountered across military, civilian, and commercial applications.

According to an embodiment, a visual communication system 443 is present and configured to implement computer vision-based optical communication utilizing drone-mounted lighting arrays and pattern recognition algorithms. In some implementations, visual communication system 443 employs structured light patterns and temporal modulation sequences that can be detected and decoded by computer vision systems on receiving drones, enabling communication in scenarios where radio frequency emissions must be minimized for operational security. In one embodiment, binary pattern recognition utilizes alternating LED flash sequences with predetermined timing intervals, where short flashes represent binary '0' values and long flashes represent binary '1' values, enabling transmission of digital data through temporal light modulation. In another embodiment, spatial pattern recognition employs geometric light patterns such as triangular, circular, or rectangular formations created by arrays of LEDs, where different geometric shapes correspond to specific command codes or status messages. In a further embodiment, color-based pattern recognition utilizes multi-spectral LED arrays capable of producing distinct color combinations, where specific color sequences or simultaneous color combinations encode different types of information such as drone identification, status updates, or coordination commands. The pattern recognition algorithms can distinguish communication signals from environmental lighting conditions and decode transmitted information despite varying atmospheric conditions and viewing angles. The visual communication system 443 provides a covert communication capability particularly valuable for operations requiring minimal electromagnetic signature while maintaining essential coordination capabilities.

According to an embodiment, a network topology system 444 implements a self-healing mesh network architecture that automatically adapts to changing network conditions, drone availability, and communication pathway disruptions. A mesh network topology 444 establishes redundant communication pathways between all drones within the swarm, ensuring that failure of any individual communication link or drone platform does not compromise overall network connectivity. Dynamic routing algorithms within network topology system 444 continuously evaluate available communication pathways and automatically redirect data transmission through optimal routes based on current bandwidth availability, signal quality, and operational priorities.

According to an aspect, mesh network topology 444 comprises various automatic failover mechanisms that seamlessly transition between communication modalities when individual channels become unavailable due to environmental conditions, equipment failure, or active interference. For example, when laser communication 441 becomes unavailable due to atmospheric conditions or line-of-sight obstructions, the network topology 444 automatically redirects communication traffic through radio frequency 442 or visual communication 443 channels without interrupting ongoing data transmission or coordination activities. The self-healing characteristics of the mesh network enable continued operation even when multiple communication channels or drone platforms become unavailable, providing resilience essential for mission-critical operations.

Network protocols 445 implement comprehensive security and coordination mechanisms that ensure secure, authenticated, and efficient communication across the drone swarm network. AES-256 encryption protocols are applied across all communication channels 441, 442, and 443, providing military-grade security for all data transmission within the swarm network. The encryption implementation may include dynamic key management systems that regularly update encryption keys and maintain secure key distribution across the network without requiring centralized key management infrastructure that could represent a single point of failure.

A zero-trust security architecture within network protocols 445 implements continuous authentication and authorization mechanisms that verify the identity and authorization status of all network participants for each communication transaction. Multi-factor authentication protocols require multiple forms of credential verification before granting access to network resources or sensitive mission data. In some aspects, behavioral analysis algorithms within the zero-trust architecture continuously monitor communication patterns and automatically detect anomalous behavior that could indicate compromised network participants or active cyber-attacks.

According to an embodiment, Reliable, Replicated, Redundant, and Fault-Tolerant (RAFT) consensus algorithms within network protocols 445 provide distributed coordination mechanisms for leader election and fault tolerance when command drones 110 become unavailable. The RAFT implementation enables subordinate drones 120 to automatically select replacement command authority from available drone platforms, ensuring continued mission coordination despite leadership failures. Consensus protocols ensure that all network participants agree on leadership changes and maintain consistent operational state information across the distributed swarm network.

Emergency communication protocols within network protocols 445 provide backup communication procedures for catastrophic network failures or extreme operational conditions. These protocols may comprise, but are not limited to, predetermined rally points, autonomous return-to-base procedures, and minimal-bandwidth emergency coordination mechanisms that enable basic swarm coordination even when primary communication systems are completely unavailable. The emergency protocols ensure that individual drones can continue mission-essential functions and maintain basic coordination capabilities under the most challenging operational conditions.

Integration capabilities within the communication architecture enable connectivity with external military and civilian command and control systems. In some implementations, ATAK (Android Team Awareness Kit) integration provides standardized interfaces for military command systems, enabling the drone swarm to share intelligence data and receive mission updates through existing military communication networks. Standardized communication protocols enable integration with civilian emergency response systems, air traffic control networks, and other operational coordination systems as mission requirements dictate.

According to an embodiment, the communication architecture integrates WiFi 446 and Bluetooth 447 capabilities that provide high-throughput, short-range networking for scenarios requiring rapid data exchange, local coordination, and integration with external systems. WiFi implementation supports high-bandwidth data transmission for applications including real-time video streaming, comprehensive sensor data sharing, and rapid mission data upload during maintenance and operational transition periods. Additionally, the architecture can be further configured to support Low Power Wide Area Network (LPWAN) integration 448. LPWAN protocols provide extended range communication capabilities optimized for power-efficient operation during sustained missions where battery conservation is critical for operational endurance. The LPWAN implementation enables communication across distances exceeding conventional radio frequency ranges while maintaining minimal power consumption that supports extended operational periods without compromising communication effectiveness. LPWAN integration supports low-data-rate telemetry and coordination messaging that maintains essential coordination capabilities during power-constrained operations, emergency communication protocols that provide backup connectivity when primary communication systems become unavailable, and long-range relay capabilities that enable communication beyond line-of-sight limitations through multi-hop networking protocols.

This exemplary communication architecture 400 demonstrates the comprehensive approach to resilient communication utilized throughout the autonomous drone swarm system, wherein multiple redundant communication modalities, advanced security protocols, and self-healing network topologies collectively ensure continued coordination and data transmission capabilities across diverse operational environments and challenging conditions. The modular communication architecture supports dynamic reconfiguration based on mission requirements, threat conditions, and available resources, providing the communication flexibility and resilience essential for autonomous swarm operations.

FIG. 8 is a block diagram illustrating exemplary external system connectivity and data exchange capabilities of the autonomous drone swarm system, according to an embodiment. The diagram demonstrates the system's ability to integrate with diverse external platforms across military, civilian, and commercial domains, providing seamless data exchange and coordination capabilities that enhance operational effectiveness while enabling deployment across multiple market segments and operational scenarios. According to an implementation of an embodiment, a central autonomous drone swarm system 800 serves as the primary coordination hub that manages all external system interfaces while maintaining autonomous operational capabilities. The system implements standardized communication protocols, secure authentication mechanisms, and adaptive data formatting that enables integration with diverse external systems without compromising operational security or autonomous coordination capabilities. Swarm system 800 comprises dedicated communication interfaces for satellite connectivity, military command system integration, civilian emergency response coordination, and commercial system interoperability.

A field server 801 functions as an intermediate fog computing layer that provides local processing capabilities and can be configured to serve as a communication gateway between the distributed drone swarm and external systems. Field servers can be configured to aggregate swarm telemetry and computer vision inferences to perform fog-layer optimization and model calibration, enabling closed-loop learning and swarm behavior refinement during extended operations. According to an aspect, field server 801 implements data aggregation, format conversion, and communication relay functions that optimize bandwidth utilization while providing backup communication capabilities when direct external system connectivity becomes unavailable. The field server architecture enables continued operation in communication-constrained environments while maintaining essential external system integration when connectivity permits. Cloud computing infrastructure 802 provides enhanced analytical capabilities, long-term data storage, and integration with enterprise-level command and control systems. The cloud integration 802 enables comprehensive mission analysis, predictive maintenance coordination, and integration with broader operational planning systems while supporting the hybrid RAG/CAG architecture described herein. Cloud connectivity enhances the system's decision-making capabilities while maintaining autonomous operation when cloud connectivity becomes unavailable.

Satellite system integration encompasses a plurality of satellite platforms that provide navigation, intelligence, communication, environmental data services, and/or the like. GPS/GNSS satellites 810 provide precision navigation and timing services that enable accurate positioning and coordination across the drone swarm network. The GPS integration may comprise anti-jamming capabilities and backup navigation systems that maintain positional accuracy despite electronic warfare interference or satellite signal degradation. ISR/intelligence satellites 811 provide theater-level intelligence feeds that enhance the swarm's situational awareness and mission planning capabilities. The intelligence satellite integration enables correlation of drone-collected intelligence with national-level intelligence assets, providing comprehensive threat assessment and target identification capabilities that exceed organic sensor limitations. Communication satellites 812 extend the swarm's communication range and provide backup communication capabilities that enable beyond-line-of-sight coordination and integration with global command networks. Weather/environmental satellites 813 can provide meteorological data and environmental monitoring information that supports mission planning, safety protocols, and environmental adaptation algorithms. The environmental satellite integration enables predictive weather analysis, atmospheric condition assessment, and environmental hazard detection that enhances mission safety and operational effectiveness.

Military command system integration provides seamless connectivity with existing military command and control infrastructure. Joint all-domain command and control (JADC2)/Joint command systems 820 integration enables the drone swarm to participate in joint all-domain operations while providing real-time intelligence and coordination support to joint force commanders. The JADC2 integration may comprise standardized data formats, secure communication protocols, and interoperability with existing military planning and execution systems. ATAK/military tactical systems 821 integration provides direct connectivity with tactical-level military communication systems, enabling real-time coordination with ground forces and tactical commanders. The ATAK integration supports mission planning, real-time intelligence sharing, and coordination with military operations while maintaining compatibility with existing military communication procedures and security protocols. Advanced filed artillery tactical data system (AFATDS)/fire control systems 822 integration enables direct coordination with artillery and fire support systems, providing target designation, battle damage assessment, and fire coordination capabilities. The fires integration may comprise automated target nomination, digital call-for-fire generation, and real-time battle damage assessment that enhances fires effectiveness while reducing coordination time and minimizing collateral damage risks.

Civilian emergency response system integration enables deployment in disaster response, emergency management, and public safety scenarios. Emergency operations centers (EOC) 830 integration provides coordination with federal, state, and local emergency management agencies while supporting comprehensive disaster response coordination. The EOC integration includes standardized emergency management protocols, interoperability with existing emergency communication systems, and compliance with civilian emergency response procedures. Incident command systems (ICS) 831 integration enables direct support to incident commanders during emergency response operations including natural disasters, terrorist incidents, and mass casualty events. The ICS integration provides real-time intelligence, communication relay support, and situational awareness enhancement for emergency response personnel while maintaining compatibility with established incident command procedures. First responder networks 832 integration provides direct coordination with police, fire, and emergency medical services through existing first responder communication systems. The first responder integration may comprise emergency communication protocols, real-time intelligence sharing, and coordination support that enhances first responder safety and operational effectiveness during emergency response operations.

Commercial system integration enables deployment across diverse commercial applications while providing integration with existing commercial infrastructure and management systems. Air traffic control (ATC) 840 integration ensures safe operation within controlled airspace while providing coordination with commercial aviation systems and compliance with federal aviation regulations. The ATC integration may comprise automatic identification and reporting, airspace deconfliction, and emergency coordination procedures. Infrastructure monitoring 841 systems integration enables coordination with utility companies, transportation agencies, and infrastructure management organizations for comprehensive infrastructure protection and monitoring. The infrastructure integration includes automated reporting, predictive maintenance coordination, and emergency response support for critical infrastructure protection. Environmental monitoring 842 systems integration provides coordination with environmental agencies, research organizations, and conservation groups for comprehensive environmental data collection and analysis. The environmental integration may comprise automated data sharing, research coordination, and environmental protection support that enhances environmental stewardship and conservation efforts. Utility grid management 843 integration enables coordination with electrical power systems, natural gas networks, and other utility infrastructure for utility protection and monitoring. The utility integration includes automated threat detection, infrastructure assessment, and emergency response coordination that enhances utility system resilience and public safety.

The external system integration architecture implements multiple connection pathways that optimize data flow, processing efficiency, and operational resilience based on the specific requirements and capabilities of each external system category. The connection architecture provides both direct and indirect integration pathways that ensure optimal performance while maintaining security and operational flexibility. Satellite system connections utilize multiple integration pathways based on data type and processing requirements. For instance, GPS/GNSS satellites 810 establish direct connections to individual drone platforms within swarm system 800 for real-time navigation and timing services, while also providing positioning data to the field server 801 for mission planning and coordination support.

ISR/intelligence satellites 811 primarily connect through cloud computing infrastructure 802 for comprehensive data processing and correlation with other intelligence sources, while also providing direct feeds to the field server 801 for immediate tactical intelligence processing. Communication satellites 812 may provide direct connectivity to drone swarm system 800 for extended range communications and also connect through field server 801 for communication relay and bandwidth management.

Weather/environmental satellites 813 may connect primarily through cloud infrastructure 802 for comprehensive meteorological analysis while providing direct feeds to the field server 801 for immediate weather updates that affect ongoing operations.

Military command system integration implements secure, standardized military communication protocols with multiple redundant pathways. JADC2/joint command systems 820 can connect primarily through the cloud computing infrastructure 802 for strategic planning and comprehensive operational coordination, while maintaining direct connections to the field server 801 for tactical coordination and mission updates. ATAK/military tactical systems 821 can establish direct connections to drone swarm system 800 for real-time tactical communication and also connect through the field server 801 for mission coordination and intelligence sharing. AFATDS/fire control systems 822 connect directly to drone swarm system 800 for immediate fire coordination and target designation, while also interfacing through field server 801 for comprehensive fires planning and battle damage assessment coordination.

Civilian emergency response system connections prioritize rapid information sharing and coordination support for emergency operations. Emergency operations centers 830 may connect primarily through field server 801 for comprehensive emergency coordination while maintaining cloud infrastructure 802 connectivity for long-term planning and resource coordination. Incident command systems 831 may establish direct connections to drone swarm system 800 for immediate tactical support during emergency incidents, supplemented by field server 801 connectivity for broader coordination and resource management. First responder networks 832 maintain direct connections to drone swarm system 800 for real-time intelligence and communication support, while also connecting through field server 801 for coordination with broader emergency response efforts.

Commercial system integration provides flexible connectivity options that accommodate diverse commercial operational requirements and existing infrastructure. Air traffic control 840 systems can maintain direct connections to drone swarm system 800 for real-time airspace coordination and safety monitoring, while also connecting through field server 801 for flight planning and airspace management coordination. Infrastructure monitoring 841 systems can connect through field server 801 for data aggregation and analysis, with cloud infrastructure 802 connectivity for long-term trend analysis and predictive maintenance planning. Environmental monitoring 842 systems utilize field server 801 connections for real-time environmental data collection and cloud infrastructure 802 connectivity for comprehensive environmental analysis and research coordination. Utility grid management 843 systems can connect through field server 801 for operational coordination and monitoring, supplemented by cloud infrastructure 802 connectivity for grid analysis and optimization planning.

According to some embodiments, field server 801 serves as the primary integration hub for most external systems, providing data format conversion, security protocol translation, and bandwidth optimization that enables seamless integration despite diverse external system architectures and communication protocols. The field server implements standardized application programming interfaces (APIs) that accommodate different external system requirements while maintaining consistent data exchange protocols with drone swarm system 800. Direct connections between external systems and the drone swarm system 800 may be reserved for time-critical communications that require minimal latency, such as tactical military communications, emergency response coordination, and air traffic control safety functions.

Cloud computing infrastructure 802 connections provide enhanced analytical capabilities and long-term data storage for external systems that benefit from comprehensive data processing and historical analysis. The cloud integration enables correlation of drone-collected data with external system databases, predictive analysis based on historical trends, and comprehensive reporting that supports strategic planning and operational optimization. Cloud connections also provide backup communication pathways and data redundancy that enhance overall system resilience. Security protocols are implemented consistently across all external system connections, with encryption standards and authentication requirements adapted to the specific security requirements of each external system category. Military system connections implement the highest security standards including, but not limited to, classified data handling and secure communication protocols, while civilian and commercial connections utilize appropriate security measures that balance operational security with functional requirements and regulatory compliance. The multi-pathway connection architecture provides operational resilience by ensuring that external system integration can continue despite individual connection failures or communication disruptions. Automatic failover protocols may be implemented that redirect data flows through alternative pathways when primary connections become unavailable, while priority-based routing ensures that mission-critical communications maintain connectivity during high-traffic or degraded communication conditions. This exemplary connection architecture enables the autonomous drone swarm system to operate effectively within diverse operational ecosystems while maintaining the flexibility and adaptability essential for successful deployment across military, civilian, and commercial applications.

This exemplary external system integration enables the autonomous drone swarm system to operate effectively across military, civilian, and commercial domains while providing seamless integration with existing operational infrastructure. The standardized integration approach ensures compatibility with diverse external systems while maintaining the autonomous coordination capabilities and operational flexibility essential for effective swarm operations across multiple operational scenarios and market applications.

Detailed Description of Exemplary Aspects

The methods and processes described herein are illustrative examples and should not be construed as limiting the scope or applicability of the autonomous drone swarm platform. These exemplary implementations serve to demonstrate the versatility and adaptability of the platform. It is important to note that the described methods may be executed with varying numbers of steps, potentially including additional steps not explicitly outlined or omitting certain described steps, while still maintaining core functionality. The modular and flexible nature of the autonomous drone swarm platform allows for numerous alternative implementations and variations tailored to specific use cases or technological environments. As the field evolves, it is anticipated that novel methods and applications will emerge, leveraging the fundamental principles and components of the platform in innovative ways. Therefore, the examples provided should be viewed as a foundation upon which further innovations can be built, rather than an exhaustive representation of the platform's capabilities.

FIGS. 5A, 5B, and 5C illustrate a flow diagram of an exemplary method for autonomous mission planning and deployment implemented by the drone swarm, according to an embodiment. The method demonstrates a complete process from initial operator command input through mission execution and completion, showcasing the integration of artificial intelligence processing, environmental analysis, and autonomous coordination capabilities that enable sophisticated mission planning with minimal human oversight.

According to the embodiment, the process begins at step 500 by obtaining operator input in the form of natural language commands, which can be received through multiple input modalities including, but not limited to, voice commands, text instructions, or gesture recognition. At step 501 the system employs input type detection algorithms to identify the specific input modality and route the command to appropriate processing subsystems. Voice commands undergo speech recognition processing at step 502 utilizing advanced natural language processing algorithms, while text inputs receive direct text analysis processing at step 503, and gesture inputs are processed through computer vision recognition 504 systems that interpret hand signals and physical gestures into structured command data. All processed inputs converge at the large language model processing step 505 stage, where a fine-tuned LLM (e.g., LLaMA-13B or equivalent neural network architecture) interprets the operator's intent and converts high-level directives into structured mission parameters.

At step 506 the LLM processing implements command interpretation and validation algorithms that analyze the feasibility and completeness of the received instructions. If the system determines that mission parameters are incomplete or invalid, it automatically requests clarification at step 507 from the operator. Upon successful command validation, the system waits to receive (or requests) confirmation from the operator, the confirmation representing the operator's acknowledgement that the command has been successfully received, interpreted, and is ready for execution before autonomous planning begins. If the operator does not confirm the command, then the system can prompt the operator to clarify their intent/command at step 507. planning.

Upon successful command validation, the system initiates concurrent mission planning processes that execute in parallel and asynchronously based on system state and data availability. Mission context analysis at step 508 operates concurrently with environmental data collection at step 509, enabling simultaneous evaluation of current operational conditions, available drone resources, and environmental factors while real-time sensor data gathering occurs across multiple data streams and intelligence sources.

Terrain analysis and digital elevation model (DEM) processing at step 510 executes asynchronously as geographic data becomes available, enabling vantage point identification algorithms at step 511 to begin processing preliminary terrain features while comprehensive terrain analysis continues in parallel. The system implements data pipeline architecture that processes partial datasets to enable real-time planning optimization and reduce overall mission planning latency through concurrent processing of interdependent planning components.

Position ranking utilizing, for instance, neutrosophic analytical hierarchy process algorithms at step 512 operates on streaming data from vantage point identification, enabling dynamic position evaluation as new geographic information becomes available rather than waiting for complete terrain analysis completion. This parallel processing approach enables the system to generate preliminary mission plans based on available data while continuously refining planning parameters as additional environmental information and analysis results become available.

The mission planning system implements data flow management that enables concurrent execution of planning processes based on data dependencies and system resource availability. Environmental data collection processes stream real-time information to multiple concurrent analysis pipelines, enabling terrain processing, threat assessment, and resource evaluation to execute simultaneously while sharing relevant data updates across planning components.

Partial dataset processing enables the system to begin mission plan generation using available information while continuing data collection and analysis processes in background operations. This approach significantly reduces mission planning latency compared to sequential processing while maintaining planning accuracy through continuous plan refinement as additional data becomes available.

The asynchronous architecture enables the system to adapt processing priorities based on data availability, mission urgency, and computational resource constraints, ensuring optimal utilization of available processing capacity while maintaining real-time planning capabilities essential for dynamic operational environments.

Concurrent processing capabilities enable real-time mission plan optimization as environmental conditions change, new intelligence becomes available, or operational requirements evolve during mission planning phases. The parallel processing architecture supports continuous plan refinement that adapts to emerging information without requiring complete mission planning restart or sequential process repetition.

Stream processing algorithms enable the system to incorporate real-time updates from ongoing environmental monitoring, intelligence collection, and resource status assessment into active mission planning processes, ensuring that generated mission plans reflect current operational conditions rather than static planning assumptions established at mission initiation.

The real-time optimization approach provides significant operational advantages in dynamic environments where environmental conditions, threat assessments, or resource availability may change during mission planning periods, enabling the system to maintain planning accuracy and operational effectiveness despite changing operational parameters.

Environmental data collection and mission context analysis initiate concurrently at steps 508 and 509, wherein the system simultaneously evaluates current environmental conditions, available drone resources, operational constraints, and mission requirements while gathering terrain information, weather conditions, threat assessments, and other relevant environmental factors through parallel data collection processes. Terrain analysis and DEM processing at step 510 operates asynchronously as geographic data becomes available, enabling the system to pipeline partial datasets and reduce mission planning latency through concurrent processing of interdependent planning components.

Vantage point identification algorithms at step 511 execute in parallel with ongoing terrain analysis, processing preliminary terrain features while comprehensive environmental assessment continues across multiple concurrent data streams. Position ranking utilizing neutrosophic analytical hierarchy process algorithms at step 512 operates on streaming data from vantage point identification and terrain analysis, enabling dynamic position evaluation and mission plan optimization based on continuously updated geographic information and environmental analysis results rather than sequential completion of individual planning components.

Environmental data collection may comprise gathering terrain information, weather conditions, threat assessments, and other relevant environmental factors that will influence mission planning and execution decisions. The terrain analysis and DEM process may use advanced algorithms to analyze the operational environment and identify potential positioning opportunities for drone deployment. This analysis may comprise evaluation of elevation profiles, line-of-sight calculations, cover and concealment opportunities, and communication propagation characteristics. One or more vantage point identification algorithms automatically detect optimal positioning locations based on mission requirements and environmental constraints, while position ranking utilizing neutrosophic analytical hierarchy process algorithms prioritizes identified locations based on configurable mission profiles such as Eyes-On, Covert, or Overt operational requirements.

Referring now to FIG. 5B, operational level determination at step 513 automatically categorizes the mission based on duration requirements, geographic scope, and operational objectives, leading to various distinct configuration pathways, wherein the operational levels correlate to levels of war. Tactical mission configuration at step 514 configures the system for fifteen minutes to two hours and/or for an operational space of two to five square kilometers (for example) of operation with emphasis on rapid response and immediate tactical impact.

Operational mission configuration at step 515 configures for six to twenty-four hours and/or for an operational space of twenty to fifty square kilometers (for example) of sustained operations with optimized power management and persistent coverage capabilities. Strategic mission configuration at step 516 configures for seven to thirty or more days of long-term autonomous operations and/or for an operational space of 200 to 500 square kilometers, with integration to theater-level command and logistics systems.

At step 517 resource allocation and drone assignment algorithms determine the optimal distribution of available command (i.e., Queen) and subordinate (i.e., Worker) drones based on mission requirements, operational level, and available resources. The system automatically calculates the number of drones required, their specific role assignments, and geographic positioning to achieve mission objectives while maintaining communication connectivity and operational redundancy. Task decomposition and delegation processes at step 518 convert the overall mission plan into specific, executable tasks suitable for individual drone platforms. The hierarchical task structure ensures that each drone receives clear objectives, operational parameters, and coordination requirements that enable autonomous execution while maintaining swarm coordination. Communication network establishment at step 519 implements a multimodal mesh network architecture, configuring laser, radio frequency, and visual communication channels with appropriate encryption and networking protocols to support mission requirements. Drone deployment coordination at step 520 manages the physical positioning and movement of all swarm elements to their assigned locations and operational configurations. This may comprise coordination of takeoff sequences, flight path planning, collision avoidance, and synchronized arrival at designated positions to ensure optimal mission coverage and coordination efficiency. Mission execution initiation at step 521 activates all autonomous systems and begins active mission operations according to the established plan.

Referring now to FIG. 5C, at step 522 real-time monitoring and adaptation algorithms continuously evaluate mission progress, environmental changes, and operational effectiveness to ensure mission objectives are achieved despite changing conditions. The system maintains continuous assessment of mission status at 523, determining whether operations should continue as planned, require adaptation to changing conditions, or proceed to mission completion and recovery procedures. Environmental monitoring during mission execution at step 524 provides continuous situational awareness and enables dynamic mission adaptation when environmental conditions, threat levels, or operational requirements change significantly. When adaptation is required at step 525, the system implements dynamic mission replanning algorithms that update mission parameters at step 526, and returns to step 517 to redistribute tasks among available drones, and modify operational procedures while maintaining mission continuity and effectiveness.

Upon mission completion, the system executes mission termination and recovery procedures at step 527 that safely return all drone assets to designated recovery areas while maintaining operational security and asset protection. Data collection and analysis at step 528 processes all gathered intelligence, sensor data, and operational information to extract actionable insights and mission-relevant intelligence products. Mission report generation at step 529 automatically creates comprehensive mission summaries, intelligence reports, and operational assessments that support commander decision-making and provide documentation for future mission planning and system improvement efforts (e.g., model/system training and continuous learning). At step 530, the system implements reset procedures that prepare all hardware and software systems for subsequent mission deployment, including, but not limited to, equipment status verification, data archival, maintenance scheduling, and readiness confirmation.

This exemplary method demonstrates the sophisticated autonomous capabilities enabled by the drone swarm system, wherein complex mission planning and execution procedures traditionally requiring extensive human oversight can be accomplished autonomously while maintaining the flexibility and adaptability essential for diverse operational requirements and challenging environmental conditions.

FIGS. 6A, 6B, and 6C illustrate a flow diagram of an exemplary method for multi-agent coordination and decision-making in an autonomous drone swarm system, according to an embodiment. The method demonstrates the sophisticated artificial intelligence coordination processes that enable distributed decision-making, adaptive task allocation, and continuous learning across the hierarchical Queen-Worker (i.e., Command-Subordinate) architecture while maintaining swarm cohesion and mission effectiveness.

According to the embodiment, the process begins at step 600 with environmental data collection from the distributed swarm network, wherein individual drones gather sensor information from their respective operational positions and transmit collected data through the established mesh communication network. This distributed data collection approach ensures comprehensive environmental coverage while providing multiple perspectives and sensor modalities for enhanced situational awareness. At step 601 multi-modal sensor data fusion processes the diverse data streams including, but not limited to, electro-optical imagery, infrared thermal signatures, LiDAR and photogrammetry three-dimensional mapping, radio frequency signals, and chemical detection readings to create unified environmental models that support coordinated decision-making across the swarm. At step 602 one or more data prioritization and filtering algorithms automatically evaluate incoming sensor data based on, for example, tactical significance, time sensitivity, and mission relevance to ensure that critical information receives immediate processing attention while routine environmental data is processed according to available computational resources. This intelligent prioritization ensures that mission-critical intelligence such as threat detections, target identifications, and emergency conditions receive priority processing and immediate distribution to relevant decision-making systems.

Threat assessment and classification at step 603 employs advanced artificial intelligence algorithms to analyze processed sensor data and identify potential threats, targets of interest, and environmental hazards that require tactical response or mission adaptation. The threat assessment process may comprise automated classification of detected objects, evaluation of threat levels based on mission parameters and rules of engagement, and generation of tactical recommendations for appropriate response measures. Command drone (Queen) AI processing occurs at step 604 utilizing the Multi-Agent Deep Deterministic Policy Gradient framework implements sophisticated decision-making algorithms that coordinate individual drone actions while optimizing overall swarm performance. The MADDPG implementation enables the command drone to process complex tactical scenarios, evaluate multiple course of action alternatives, and select optimal coordination strategies that maximize mission effectiveness while maintaining individual drone safety and operational efficiency. Decision-making analysis at step 605 processes the output from the MADDPG framework to generate specific tactical decisions, mission adaptations, and coordination directives based on current environmental conditions, threat assessments, and mission objectives. This analysis may comprise evaluation of resource allocation options, risk assessment calculations, and tactical timing considerations that ensure coordinated swarm actions achieve maximum operational impact while minimizing exposure to threats and operational risks.

Task assignment optimization at step 606 converts high-level tactical decisions into specific, executable tasks suitable for delegation to individual drones within the swarm. The optimization process can consider individual drone capabilities, current positions, equipment status, and communication connectivity to ensure that assigned tasks can be successfully executed while maintaining overall mission coordination and effectiveness. In some aspects, the coordination framework branches into three distinct coordination pathways based on the scope and complexity of required coordination. Intra-Hive coordination 607 implements Queen-Worker (i.e., Command-Subordinate) task delegation within individual Hive formations, where a single command drone coordinates with a plurality of subordinate drones for localized mission execution. Inter-Hive coordination 608 enables Queen-Queen (i.e., Command-Command) collaboration between multiple command drones operating in the same general area, providing enhanced coverage and coordination for larger operational areas. Squadron-level coordination 609 implements multi-Hive coordination across multiple Hive formations for theater-wide operations requiring coordination across dozens of autonomous drone platforms. Steps 600-612 can be considered an implementation of an observe, orient, decide, and act (OODA) loop, which is continuously processing sensor data, evaluating incoming data, classifying and assessing threats, and coordinating drones for specific actions based on the observed and processed data.

Worker AI processing at step 610 implements local inference capabilities that enable subordinate drones to execute assigned tasks autonomously while maintaining coordination with the broader swarm network. The local inference processing may comprise, but is not limited to, obstacle avoidance algorithms, environmental adaptation capabilities, and emergency response protocols that ensure continued mission execution despite communication disruptions or unexpected environmental challenges. Distributed leadership coordination at step 611 enables multiple command drones to share leadership responsibilities and coordinate complex missions that exceed the capability of individual Queens. This coordination may comprise, but is not limited to, workload distribution, communication relay responsibilities, and backup leadership protocols that ensure mission continuity despite individual Queen failures or communication limitations. Squadron-level task distribution at step 612 coordinates mission execution across multiple Hive formations, implementing theater-wide coordination protocols that enable large-scale autonomous operations while maintaining individual Hive autonomy and tactical flexibility. This coordination level may comprise integration with external command and control systems, logistics coordination, and strategic mission adaptation capabilities.

Referring now to FIG. 6B, at step 613 individual drone task execution implements the autonomous execution of assigned tasks by individual drone platforms, including, but not limited to, navigation to designated positions, sensor data collection, communication relay operations, and mission-specific activities such as target tracking, area surveillance, or threat response. The task execution may comprise continuous coordination with other swarm elements and adaptation to changing tactical conditions. Performance monitoring at step 614 continuously evaluates individual drone performance, mission progress, and coordination effectiveness to ensure optimal swarm operations and identify opportunities for improvement or adaptation. This monitoring may comprise assessment of task completion rates, communication network performance, sensor data quality, and overall mission effectiveness metrics.

At step 615 local learning data generation processes operational experience and performance data to generate machine learning training data that can improve future coordination and decision-making capabilities. This learning process may capture successful coordination patterns, effective tactical responses, and environmental adaptation strategies that enhance swarm intelligence over time. Federated learning weight updates at step 616 implement the distributed machine learning process described herein, where individual drones generate model parameter updates based on local operational experience and transmit compressed learning data to command drones for swarm-wide performance improvement. For example, when multiple drones encounter similar terrain features or target types, each drone's local AI system processes the encountered data and generates model weight updates based on its individual observations, transmitting only the compressed model parameter updates rather than raw sensor data. At step 617 model aggregation at Queen level combines federated learning updates from multiple subordinate drones to improve the overall swarm's artificial intelligence capabilities. The aggregation process may comprise validation of learning data, integration of multiple learning experiences, and optimization of model parameters to enhance target recognition accuracy, environmental awareness capabilities, and coordination effectiveness. Improved model distribution at step 618 transmits updated AI models back to subordinate drones and peer Queens, ensuring that learning experiences are shared across the entire swarm network. This distribution process can include, but is not limited to, model validation, secure transmission protocols, and version control mechanisms that ensure consistent AI capabilities across all swarm elements. Swarm intelligence enhancement at step 619 represents the cumulative improvement in coordination capabilities, decision-making effectiveness, and mission performance that results from the continuous federated learning process. This enhancement enables the swarm to adapt to new operational environments, improve response to previously encountered scenarios, and develop increasingly sophisticated coordination strategies over time.

Dynamic task redistribution at step 620 continuously evaluates and adjusts task assignments based on changing conditions, performance monitoring results, and mission adaptation requirements. This redistribution capability ensures optimal resource utilization and mission effectiveness despite equipment failures, environmental changes, or evolving tactical requirements. Performance status assessment 621-623 evaluates overall coordination effectiveness and determines appropriate system responses. Optimal performance at step 621 indicates that current operations should continue as planned. Suboptimal performance at step 622 triggers coordination adjustment and parameter optimization processes at step 625 that modify coordination algorithms and task assignments to improve effectiveness. Failure detection 623 activates fault recovery protocols including leader election using, for example, RAFT consensus algorithms at step 626 when command drones become unavailable.

Referring now to FIG. 6C, the method further comprises adaptive capabilities for mission continuation, completion, and environmental adaptation. Mission progress assessment at step 624 determines whether operations should continue, while coordination termination at step 628 manages the conclusion of successful missions. Environmental changes trigger adaptive replanning at step 629 and updated environmental assessment at step 630 that enable the swarm to maintain effectiveness despite changing operational conditions. Mission completion procedures include final performance analysis at step 631, learning data archive at step 632, and system state reset at step 633 that prepare the swarm for subsequent mission deployment while preserving operational experience and performance improvements for future operations. This coordination method demonstrates the various artificial intelligence capabilities that enable autonomous swarm operations while maintaining the flexibility and adaptability essential for diverse operational requirements and challenging environmental conditions.

FIGS. 7A, 7B, and 7C illustrate a flow diagram of an exemplary method for multi-modal communication and network healing, according to an embodiment. The method demonstrates the robust communication architecture that enables resilient coordination and data transmission throughout the swarm network while providing automatic recovery capabilities that maintain operational effectiveness despite communication channel failures, environmental interference, or hostile jamming attempts.

According to the embodiment, the process begins at step 700 with communication initialization, which establishes the foundational parameters for swarm network operation including identification of available drone platforms, assessment of communication hardware capabilities, and determination of mission-specific communication requirements. Multi-modal channel configuration at step 701 configures the primary communication modalities including, but not limited to, laser communication systems with beam steering capabilities, radio frequency systems with software-defined radio flexibility, and visual communication systems with computer vision pattern recognition, ensuring that all available communication channels are properly configured and tested before mission commencement. Mesh network topology establishment at step 702 creates the self-healing network architecture that provides redundant communication pathways between all drone platforms within the swarm. The mesh topology may comprise determination of optimal routing paths, establishment of backup communication routes, and configuration of relay node responsibilities that ensure network connectivity despite individual node failures or communication channel disruptions. Encryption key distribution and management at step 703 implements AES-256 encryption across all communication channels while establishing secure key management protocols that enable dynamic key rotation and secure authentication without requiring centralized key management infrastructure that could represent operational vulnerability.

Communication channel priority assessment at step 704 evaluates current operational conditions, mission requirements, and environmental factors to determine optimal communication channel selection for different types of data transmission. The priority assessment considers factors including, but not limited to, required bandwidth, communication range, environmental conditions, operational security requirements, and power consumption constraints to select the most appropriate communication modality for each transmission requirement. The channel selection process branches into a variety of communication pathways based on, at least, operational requirements and environmental conditions.

According to an embodiment, communication channel priority assessment at step 704 implements a PACE (Primary, Alternate, Contingency, Emergency) protocol hierarchy that provides structured communication channel selection logic designed to ensure mission continuity across contested and austere operational environments. The PACE framework establishes clear communication channel prioritization with conditional fallback logic that automatically adapts to changing operational conditions, terrain constraints, threat environments, and communication degradation scenarios.

The protocol selection algorithms can implement terrain-aware and threat-aware dynamic reassignment capabilities that continuously evaluate communication channel effectiveness against current operational parameters including, but not limited to, bandwidth requirements, signal integrity measurements, electromagnetic signature constraints, and mission continuity requirements. This structured approach ensures optimal communication channel selection while maintaining robust fallback capabilities that preserve coordination effectiveness despite individual channel failures, environmental interference, or hostile jamming attempts.

According to an aspect of an embodiment, WiFi serves as the Primary communication channel within the PACE hierarchy, providing high-bandwidth, short-range communication capabilities optimized for scenarios requiring rapid data exchange, comprehensive sensor data sharing, and high-throughput coordination messaging. The Primary channel selection prioritizes WiFi connectivity when operational conditions support reliable short-range networking including operations near friendly infrastructure, maintenance and logistics coordination, and tactical scenarios requiring maximum data throughput for real-time intelligence sharing.

Primary channel assessment algorithms continuously monitor WiFi signal strength, interference levels, network security status, and bandwidth availability to ensure optimal Primary channel performance. When WiFi connectivity provides adequate coverage for mission requirements and operational security constraints permit its use, the system maintains Primary channel operation while monitoring Alternate channel status for potential transition requirements.

WiFi Primary channel advantages include maximum data transmission rates for comprehensive sensor data sharing, real-time full motion video streaming capabilities, rapid mission data upload and download for operational coordination, and integration with existing network infrastructure when available. The Primary channel enables high-resolution intelligence sharing and comprehensive coordination messaging that supports complex tactical operations requiring detailed situational awareness and coordinated decision-making.

According to an aspect of an embodiment, RF communication utilizing SDR and LPWAN protocols serves as the Alternate communication channel, providing extended range communication capabilities with anti-jamming features and adaptive protocol selection. The Alternate channel activates when Primary WiFi connectivity becomes unavailable, insufficient for mission requirements, or when operational security considerations require extended range communication with reduced electromagnetic signature.

Alternate channel selection implements frequency management and protocol adaptation that automatically optimizes RF communication based on current spectrum conditions, interference levels, and mission requirements. SDR capabilities enable dynamic frequency selection and protocol switching that maintains communication effectiveness despite changing operational environments, while LPWAN integration provides power-efficient extended range connectivity suitable for sustained operations.

RF Alternate channel capabilities include frequency-hopping spread spectrum anti-jamming protocols, adaptive power management for signature control and battery conservation, multi-band operation spanning HF, VHF, and UHF frequency ranges, and mesh networking protocols that enable communication relay through multiple drone platforms for extended range coverage beyond individual platform limitations.

According to an aspect of an embodiment, Laser Fidelity optical communication serves as the Contingency channel within the PACE hierarchy, providing secure, high-bandwidth communication capabilities specifically designed for electromagnetically sensitive environments where RF communication may be compromised, restricted, or detected by hostile forces. The Contingency channel activates when both Primary and Alternate channels become unavailable or when operational security requirements demand communication methods with minimal electromagnetic signature.

Laser Fidelity Contingency channel implementation includes automatic beam steering and target acquisition algorithms that enable dynamic optical communication link establishment between mobile drone platforms despite platform movement and positioning changes. Atmospheric compensation algorithms maintain communication effectiveness despite environmental factors including atmospheric turbulence, weather conditions, and visibility limitations that may affect optical communication quality.

Contingency channel advantages include virtually undetectable communication signatures that provide operational security in contested environments, high bandwidth data transmission capabilities that support comprehensive intelligence sharing despite line-of-sight limitations, and immunity to RF jamming and electronic warfare attacks that may compromise conventional communication systems. Laser Fidelity provides critical communication capability for covert operations and high-security environments where conventional communication methods may be compromised.

According to an aspect of an embodiment, Light Fidelity (LiFi) communication serves as the Emergency channel within the PACE hierarchy, providing covert, low-signature communication capabilities that enable essential coordination messaging when all other communication channels become unavailable or compromised. The Emergency channel represents the final communication fallback that maintains minimum essential coordination capability using visible and near-infrared light modulation that is virtually undetectable to conventional electronic surveillance systems.

LiFi Emergency channel implementation utilizes LED arrays and photodetector systems that enable low-bandwidth but reliable communication for essential coordination messaging including status updates, emergency procedures, and basic tactical coordination. The Emergency channel operates with minimal power requirements and provides communication capability that is immune to RF jamming, electromagnetic interference, and electronic warfare attacks.

Emergency channel capabilities include covert communication that maintains operational security in high-threat environments, minimal power consumption that supports extended emergency operations, basic coordination messaging sufficient for essential mission coordination and safety procedures, and backup communication that ensures coordination continuity when all other communication methods fail or become compromised.

The PACE implementation includes conditional fallback logic that automatically transitions between communication channels based on real-time assessment of communication channel performance, operational requirements, and environmental conditions. Fallback assessment algorithms continuously monitor Primary channel status while maintaining readiness to activate Alternate, Contingency, or Emergency channels when operational conditions require communication channel transition.

Primary to Alternate Transition occurs when WiFi connectivity becomes insufficient for mission bandwidth requirements, signal degradation reduces communication reliability below acceptable thresholds, operational security considerations require extended range communication, or tactical maneuvering moves the swarm beyond WiFi coverage areas. The transition maintains communication continuity while optimizing for extended range and anti-jamming capabilities.

Alternate to Contingency Transition activates when RF communication becomes jammed or compromised by hostile electronic warfare, spectrum congestion prevents reliable RF communication, operational security requirements demand minimal electromagnetic signature, or environmental factors severely degrade RF communication quality. Laser Fidelity Contingency channel provides secure high-bandwidth alternative despite line-of-sight limitations.

Contingency to Emergency Transition occurs when optical communication becomes impossible due to weather conditions, terrain obstruction, or platform positioning constraints that prevent line-of-sight establishment. LiFi Emergency channel ensures minimum communication capability for essential coordination despite severe communication degradation.

According to an embodiment, the PACE protocol implementation incorporates terrain-aware channel selection algorithms that evaluate geographic factors including elevation profiles, line-of-sight characteristics, urban canyon effects, and vegetation coverage to optimize communication channel selection based on environmental constraints. Terrain analysis enables proactive channel selection that anticipates communication challenges and optimizes channel transitions before communication degradation affects mission coordination.

Threat-aware dynamic reassignment algorithms continuously assess electromagnetic threat environment including jamming attempts, electronic warfare activities, signal interception risks, and hostile communication detection capabilities. Threat assessment enables automatic channel selection that minimizes communication signature and maximizes communication security based on current threat conditions and operational security requirements.

Urban environment adaptation prioritizes WiFi Primary and RF Alternate channels while maintaining LaserFi Contingency readiness for building-to-building line-of-sight communication and LiFi Emergency capability for covert operations in electronically contested urban environments.

Rural and open terrain operations emphasize RF Alternate channel capabilities for extended range communication while utilizing LaserFi Contingency for secure long-range coordination and maintaining LiFi Emergency as backup for operations requiring minimal signature in open terrain environments.

Mountainous and complex terrain requires dynamic channel adaptation based on line-of-sight availability, with automatic transitions between RF mesh networking for extended range coordination and optical communication when terrain permits line-of-sight establishment between platforms.

PACE protocol selection may integrate with mission planning algorithms to establish communication channel priorities based on operational mode selection, mission duration requirements, geographic coverage areas, and threat assessment parameters. Tactical operations emphasize Primary and Alternate channels for maximum coordination effectiveness, while strategic operations may prioritize Contingency and Emergency channels for sustained covert communication capability.

Mission-specific channel prioritization enables automatic PACE configuration based on operational requirements including convoy protection emphasizing RF Alternate for extended mobile coverage, urban breach operations utilizing WiFi Primary for high-bandwidth tactical coordination, covert surveillance prioritizing Laser Fidelity and LiFi for minimal signature operations, and strategic reconnaissance balancing channel capabilities based on mission duration and signature requirements.

Dynamic protocol adaptation ensures that PACE channel selection adapts to changing mission requirements, environmental conditions, and threat assessments throughout mission execution, maintaining optimal communication effectiveness while preserving mission security and operational flexibility across diverse operational scenarios and environmental challenges.

In addition to the modalities illustrated, the system incorporates LoRaWAN (low-power telemetry), WiFi (high-throughput short-range), Bluetooth (low-SWAP device-to-device), and LiFi (secure line-of-sight optical). These protocols are selectable based on mission configuration, environmental constraints, and emission control (EMCON) posture. High bandwidth requirements can trigger laser communication activation at step 705, which provides the highest data transmission rates for applications such as real-time video streaming, detailed sensor data sharing, and comprehensive mission coordination information. Anti-jamming requirements may activate RF communication with frequency hopping at step 706, which provides resistance to electronic warfare interference and hostile jamming attempts while maintaining reliable communication across extended ranges. Covert operations requirements may activate visual communication pattern recognition at step 707, which minimizes electromagnetic signature detection while maintaining essential coordination capabilities through optical signaling methods.

Laser communication processing can comprise beam steering and atmospheric compensation at step 708, which automatically adjusts transmission parameters to account for atmospheric conditions, relative drone movement, and environmental factors that could degrade optical communication performance. The beam steering system maintains communication links despite drone movement and positional changes while atmospheric compensation algorithms adjust for weather conditions, atmospheric density variations, and other environmental factors. RF communication processing implements SDR configuration and LPWAN protocols at step 709, which provide flexible frequency allocation, adaptive power management, and extended range communication capabilities. The software-defined radio implementation enables dynamic protocol adaptation based on communication conditions, interference levels, and operational security requirements, while LPWAN protocols optimize power consumption and communication range for extended operations. Visual communication processing implements LED pattern generation and computer vision recognition at step 710, which creates structured light patterns that can be detected and decoded by receiving drones despite varying atmospheric conditions and viewing angles. The platform comprises a plurality of CV recognition algorithms specifically configured to support both object detection and visual-based communication tasks as performed by the drone swarm system, such as described herein with respect to step 710. The pattern generation system can be configured to create temporal and spatial light sequences that encode communication data, while computer vision recognition algorithms distinguish communication signals from environmental lighting and decode transmitted information with high reliability. In some embodiments, a human-to-machine computer vision model may be implemented to enable drone operators to communicate with drone platforms using hand and/or arm signals.

All communication channels converge at data transmission with AES-256 encryption at step 711, which ensures that all transmitted data receives military-grade encryption protection regardless of the selected communication modality. The encryption implementation can comprise authentication protocols, data integrity verification, and secure transmission methods that protect mission data from interception or manipulation by hostile forces. Network performance monitoring at step 712 continuously evaluates communication system effectiveness, including assessment of data transmission rates, error rates, signal quality, and overall network connectivity across the distributed swarm network.

Referring now to FIG. 7B, link quality assessment at step 713 analyzes individual communication links to determine their current performance status and reliability for continued operation. Link status evaluation determines appropriate system responses based on current communication performance. Optimal link performance indicates that current communication operations should continue as planned at step 714 with routine network maintenance 717 procedures that ensure continued optimal performance, before returning to step 712. Degraded link performance triggers communication optimization procedures at step 715 that adjust channel parameters, modify transmission protocols, or reallocate communication resources to restore optimal performance at step 718. Failed link detection 716 initiates automatic failover procedures that seamlessly transition to backup communication channels without interrupting ongoing mission coordination. The automatic failover system implements intelligent backup channel selection at step 719 based on available alternatives and current operational requirements.

When laser communication fails, the system switches to RF communication at step 720 with appropriate network reconfiguration at step 723. When RF communication fails, the system switches to visual communication at step 721 with visual network reconfiguration at step 724. When visual communication also fails, emergency protocol activation at step 722 implements minimal bandwidth emergency mode at step 725 that maintains basic coordination capabilities using the most reliable available communication method. Network topology adaptation at step 726 automatically adjusts the mesh network structure to accommodate failed communication channels and maintain connectivity across the swarm network.

Referring now to FIG. 7C, self-healing mesh adjustment at step 727 implements dynamic routing changes that bypass failed communication links and optimize data transmission paths through available network nodes. New route discovery at step 728 identifies alternative communication pathways that can maintain network connectivity despite multiple communication failures. Relay node optimization at step 729 automatically reassigns communication relay responsibilities to optimize network performance and ensure that critical communication links are maintained through strategic positioning of relay-capable drones. Communication restoration testing at step 730 continuously attempts to restore failed communication channels and evaluate the effectiveness of implemented workaround procedures.

Network health assessment evaluates overall communication system status and determines appropriate operational responses. Restored network performance at step 731 enables resumption of normal operations with comprehensive network performance logging at step 734 that documents network failures, recovery procedures, and performance metrics for future system improvement. Partial network restoration at step 732 enables continued operations with reduced capacity while implementing continuous healing attempts at step 735 that work to restore full communication capabilities. Critical network failure at step 733 activates emergency return protocols that coordinate safe recovery of all drone assets at step 736 when communication failures compromise mission safety or effectiveness.

Continuous healing attempts may comprise, but are not limited to, periodic network health assessment that regularly evaluates communication system status and implements additional recovery procedures when opportunities arise. Emergency return procedures may comprise mission data emergency transmission that attempts to transmit critical mission data despite communication limitations, followed by network shutdown and asset recovery that safely recovers all drone platforms while preserving mission data and operational security.

FIGS. 9A, 9B, and 9C illustrate a flow diagram of an exemplary method for drone failure detection and recovery, according to an embodiment. The method demonstrates sophisticated fault tolerance capabilities that enable continued mission execution despite individual drone failures, communication losses, or equipment malfunctions while maintaining swarm coordination and operational effectiveness through automated recovery procedures and intelligent task redistribution protocols.

According to the embodiment, the process begins at step 900 with continuous health monitoring initialization, which establishes comprehensive monitoring protocols for all drone platforms within the swarm network. The monitoring system tracks multiple operational parameters including, but not limited to, communication status, hardware performance, navigation accuracy, power consumption, sensor functionality, and overall system responsiveness to detect potential failures before they compromise mission effectiveness. Multi-parameter status collection at step 901 continuously gathers operational data from all drone platforms including, but not limited to, telemetry information, sensor readings, communication quality metrics, power consumption rates, navigation accuracy measurements, and task execution performance indicators. The status collection system implements real-time data transmission through the established mesh communication network while maintaining local data logging capabilities that preserve operational information despite communication disruptions. Health data analysis and correlation at step 902 processes collected status information using advanced algorithms that identify patterns, trends, and anomalies that may indicate developing equipment failures or operational problems. The analysis system correlates data across multiple parameters to distinguish between temporary operational variations and genuine failure conditions while providing predictive failure detection that enables proactive maintenance and operational adaptation. Anomaly detection and classification at step 903 employs artificial intelligence algorithms that automatically identify deviations from normal operational parameters and classify detected anomalies based on severity, type, and potential impact on mission execution. The classification system distinguishes between minor operational variations that require monitoring, moderate problems that may require operational adaptation, and critical failures that demand immediate intervention and recovery procedures.

Failure type assessment at step 904 categorizes detected failures into specific categories that determine appropriate recovery procedures and response protocols. Communication loss 905 indicates disruption of communication links between individual drones and the broader swarm network, requiring communication recovery procedures and potential communication pathway reconfiguration. Hardware malfunction 906 indicates equipment failures including sensor malfunctions, processing system errors, or mechanical problems that may require diagnostic procedures and operational adaptation. Navigation error 907 indicates problems with positioning systems, flight control, or autonomous navigation that require navigation system intervention and potential manual override procedures. Power/battery issues 908 indicate energy system problems including battery degradation, power consumption anomalies, or charging system failures that require emergency power management and potential drone replacement procedures. Communication failure analysis at step 905 implements systematic diagnosis of communication system problems including evaluation of individual communication channels, mesh network connectivity assessment, and interference detection procedures. Communication recovery attempts at step 909 may comprise automatic channel switching, transmission power adjustment, antenna repositioning, and alternative communication pathway establishment through relay drones or backup communication systems. Hardware failure analysis at step 906 implements comprehensive diagnostic procedures that evaluate processing system performance, sensor functionality, mechanical system integrity, and overall equipment status. Hardware diagnostic procedures are implemented at step 910 and can include automated system tests, component isolation procedures, and functionality verification protocols that determine the extent of hardware damage and available operational capabilities. Navigation failure analysis at step 907 evaluates positioning system accuracy, flight control responsiveness, and autonomous navigation performance to determine the cause and extent of navigation problems. Navigation system reset at step 911 implements automatic recalibration procedures, backup navigation system activation, and manual control override capabilities that restore navigation functionality or enable continued operation with degraded navigation capabilities. Power system failure analysis at step 908 monitors battery performance, power consumption rates, charging system functionality, and overall energy management effectiveness to identify power-related problems. Emergency power management at step 912 implements power conservation protocols, non-essential system shutdown procedures, and emergency landing protocols that maximize operational time and ensure safe recovery of drone assets.

Recovery success assessment at 913 evaluates the effectiveness of implemented recovery procedures and determines appropriate operational responses based on recovery outcomes. Successful recovery at step 914 enables resumption of normal operations with enhanced monitoring procedures at step 917 that provide increased surveillance of recovered systems to detect potential recurring problems. Partial recovery at step 915 enables continued operation with degraded capabilities, requiring limited capability task assignment at step 918 that adapts mission requirements to available operational capabilities while maintaining continuous monitoring of degraded systems. Failed recovery attempts at step 916 result in declaration of drone non-operational status, triggering task redistribution initiation at step 919 that reallocates assigned tasks to operational drone platforms while maintaining mission continuity and effectiveness.

Referring now to FIG. 9B, available drone assessment 922 evaluates remaining operational drones to determine optimal task redistribution strategies and identify potential capability gaps that may require mission adaptation. The task redistribution process differentiates between Worker drone failures 924 and Queen drone failures 925 due to their different roles and impact on swarm coordination. Worker task redistribution implements load balancing algorithms at step 926 that distribute failed Worker tasks across remaining operational Workers while optimizing task assignments based on individual drone capabilities and current operational status. Task assignment verification at step 928 confirms successful task transfer and validates that redistributed tasks can be successfully executed by assigned drones.

Queen drone failures trigger leader election initiation at step 925 that implements RAFT consensus algorithm procedures at step 927 for selecting replacement command authority from available drone platforms. The RAFT consensus process ensures that all operational drones agree on new leadership selection while maintaining network consistency and operational coordination during leadership transitions. New leader selection at step 929 identifies the most suitable replacement Queen based on, for example, processing capabilities, communication status, operational position, and mission requirements. Leadership transfer protocol at step 931 implements secure transfer of command authority, mission data, coordination responsibilities, and communication network management to the newly selected Queen drone. Swarm reconfiguration at step 932 adapts network topology, communication protocols, and coordination procedures to accommodate the new leadership structure while maintaining operational effectiveness. Authority establishment at step 933 confirms successful leadership transfer and validates that the new Queen has full operational control and coordination capabilities. Mission parameter update at step 934 adapts mission plans, task assignments, and operational procedures based on changed swarm composition and capabilities while maintaining mission objectives and operational effectiveness. Coordination resume at step 935 reestablishes normal swarm coordination protocols under new leadership while ensuring seamless mission continuation.

Referring now to FIG. 9C, performance optimization at step 936 evaluates overall swarm performance following failure recovery and task redistribution procedures, implementing additional optimizations that maximize operational effectiveness with available resources. System status assessment at 937 determines overall swarm health and operational capability following recovery procedures. Stable system status at step 938 enables continued mission execution with new configuration while maintaining enhanced monitoring of recovery procedures and operational effectiveness. Unstable system status at step 939 triggers additional failure assessment and secondary recovery procedures at step 941 that address continuing operational problems or cascading failure effects. Critical system status at step 940 activates emergency return-to-base protocols 942 that coordinate safe recovery of all remaining drone assets while preserving mission data and operational security.

FIG. 10 is a flow diagram illustrating an exemplary method for implementing a "Convoy Guardian" operational mode implemented by the autonomous drone swarm, according to an embodiment. The method demonstrates a tactical-level operational mode designed to provide automated convoy protection through coordinated drone surveillance and threat response capabilities, typically executed within two-hour operational windows to provide immediate tactical security for mobile ground forces.

The Convoy Guardian method initiates with convoy guardian mission initialization at step 1000, which configures the drone swarm for convoy protection operations based on mission parameters including, but not limited to, convoy composition, route analysis, threat assessment, and available drone resources. The initialization process includes analysis of the planned convoy route to identify potential ambush locations, chokepoints, and areas of tactical concern that require enhanced surveillance coverage. Mission parameters are configured to optimize drone positioning, sensor coverage, and threat response capabilities based on the specific convoy protection requirements and available tactical intelligence. Drone assignment and capability verification ensures that assigned drones possess appropriate sensor packages, communication capabilities, and operational endurance necessary for successful convoy protection mission execution.

Two-tier screening formation deployment at step 1001 establishes the tactical positioning configuration that provides comprehensive convoy protection through coordinated drone positioning and movement. Forward scout drones deploy to positions (e.g., three hundred meters ahead of the convoy formation), providing early warning capabilities and route reconnaissance that identifies potential threats before the convoy reaches areas of tactical concern. Flank guard drones establish overwatch positions (e.g., one hundred fifty meters to each side of the convoy route), providing lateral security coverage that detects flanking movements and prevents side-based ambush attacks. Communication network establishment creates secure, encrypted communication links between all guardian drones and convoy command elements, enabling real-time intelligence sharing and coordination. Coordinated movement synchronization ensures that all guardian drones maintain appropriate positioning relative to convoy movement while adapting to route changes, speed variations, and tactical requirements throughout the mission.

Continuous threat detection and monitoring at step 1002 implements active surveillance protocols that provide comprehensive security coverage throughout convoy movement. Multi-sensor surveillance activation may employ electro-optical cameras, infrared thermal imaging, LiDAR and photogrammetry environmental mapping, and radio frequency detection capabilities to monitor the operational environment for potential threats and suspicious activities. Pattern recognition algorithms analyze sensor data to identify ambush indicators including, but not limited to, concealed positions, unusual terrain signatures, electronic warfare emissions, and movement patterns that suggest hostile intent. Real-time threat classification automatically categorizes detected activities based on threat level, tactical significance, and required response measures while providing immediate alerts to convoy commanders and guardian drone coordination systems. Continuous convoy overwatch maintains persistent surveillance coverage that adapts to changing tactical conditions, environmental factors, and convoy operational requirements throughout the protection mission.

Ambush indicator assessment and response at step 1003 implements automated threat response protocols that provide immediate protection against detected hostile activities. Ambush indicator detection employs artificial intelligence algorithms that identify tactical signatures associated with hostile ambush preparations including weapon signatures, coordinated movement patterns, communication intercepts, and environmental anomalies that suggest hostile presence. Automatic counter-fire cueing provides immediate target designation and engagement coordination when hostile activities are detected, including laser designation of threat positions and coordination with available fire support assets. Suppressive fire coordination enables immediate response to hostile contact through coordination with convoy escort vehicles, supporting artillery, or other available fire support capabilities that can provide immediate protection for the convoy formation. Threat neutralization protocols implement coordinated response measures that eliminate or suppress identified threats while maintaining convoy movement and minimizing exposure to additional tactical risks.

Mission completion and recovery at step 1004 concludes convoy protection operations upon successful arrival at the destination or completion of the designated protection mission. Safe convoy arrival confirmation validates successful mission completion through verification that the protected convoy has reached its intended destination without hostile interference or tactical compromise. Drone recovery coordination manages the safe return of all guardian drones to designated recovery locations while maintaining operational security and asset protection throughout the recovery process. Mission data compilation processes all collected intelligence, sensor data, and operational information to generate comprehensive mission reports that support tactical intelligence requirements and future convoy protection planning. Performance assessment and logging evaluates mission effectiveness, identifies lessons learned, and documents operational procedures that enhance future convoy protection capabilities and tactical effectiveness.

The "Convoy Guardian" operational mode demonstrates practical application of the autonomous drone swarm system for tactical convoy protection operations that enhance force protection capabilities while reducing human operator workload and improving tactical response times. The method provides scalable protection capabilities that can adapt to different convoy sizes, threat levels, and operational environments while maintaining the autonomous coordination and adaptive response capabilities essential for effective tactical operations.

FIG. 11 is a flow diagram illustrating an exemplary method for implementing a "Point-of-Breach Overwatch" operational mode implemented by the autonomous drone swarm system, according to an embodiment. The method demonstrates a tactical-level operational mode designed to provide real-time intelligence and fire support coordination during urban breach operations, to support ground force entry operations in confined urban environments.

According to the embodiment, the "Point-of-Breach Overwatch" process beings with breach overwatch mission configuration at step 1100, which establishes mission parameters specifically optimized for urban breach operations and close-quarters tactical support. Breach point coordinates analysis evaluates the designated entry location to determine optimal drone positioning, sensor coverage requirements, and tactical considerations including building layout, surrounding terrain, and potential threat positions. Urban terrain assessment analyzes the operational environment to identify line-of-sight limitations, communication challenges, and environmental factors that may affect drone operations and sensor effectiveness. Squad heads-up display integration setup establishes secure communication links and data transmission protocols that enable real-time intelligence sharing between overwatch drones and ground force personnel through compatible display systems. Drone positioning optimization determines the most effective positioning and movement patterns that provide comprehensive overwatch coverage while minimizing exposure to ground-based threats and maintaining communication connectivity with ground forces.

Vertical racetrack pattern establishment at step 1101 implements the tactical flight configuration that provides persistent overwatch coverage directly above the breach point and surrounding area. Overhead racetrack pattern initiation establishes circular or oval flight patterns positioned directly over the breach location at optimal altitude and speed settings that provide continuous surveillance coverage while maintaining tactical mobility and threat avoidance capabilities. LiDAR and photogrammetry and electro-optical/infrared sensor activation employs three-dimensional mapping capabilities and multi-spectral imaging to provide comprehensive situational awareness including building interior detection, personnel identification, and threat assessment capabilities. Optimal altitude and speed configuration balances surveillance effectiveness with threat avoidance, maintaining sufficient elevation to avoid small arms fire while providing detailed sensor coverage of the breach area and surrounding tactical environment. Communication link establishment creates secure, encrypted data transmission pathways that enable real-time intelligence sharing between overwatch drones and ground force command elements without compromising operational security or tactical communications.

Real-time intelligence feed to ground forces at step 1102 provides continuous tactical intelligence support that enhances ground force situational awareness and operational effectiveness during breach operations. Live video feed transmission delivers high-resolution electro-optical and infrared imagery directly to squad heads-up displays, providing ground personnel with comprehensive visual intelligence of the breach area and surrounding environment. Tactical intelligence overlay integrates sensor data analysis with visual feeds to provide enhanced information including building layout mapping, personnel detection, weapon identification, and movement pattern analysis that supports tactical decision-making. Real-time threat identification employs artificial intelligence algorithms that automatically detect and classify potential threats including hostile personnel, weapon signatures, explosive devices, and other tactical hazards that may compromise ground force safety or mission success. Squad coordination support provides continuous communication relay and intelligence sharing that enhances coordination between ground force elements while maintaining tactical awareness of changing conditions and emerging threats.

Muzzle flash detection and fire coordination at step 1103 implements automated threat response capabilities that provide immediate fire support coordination when hostile contact occurs during breach operations. Automatic muzzle flash marking employs advanced sensor algorithms that detect weapon discharge signatures and automatically mark hostile firing positions on tactical displays and communication systems. Hostile position identification correlates muzzle flash detections with personnel tracking and building layout analysis to provide precise location information for identified threats and enable effective tactical response. Suppressive fire coordination provides immediate target designation and engagement support through coordination with available fire support assets including squad-level weapons, supporting artillery, or other available tactical response capabilities. Target designation for ground forces includes laser designation of threat positions and real-time tactical information sharing that enables ground personnel to effectively engage identified threats while minimizing exposure and maximizing tactical effectiveness.

Breach completion and extraction at step 1104 concludes overwatch operations upon successful completion of breach objectives or termination of ground force operations. Breach objective confirmation validates successful completion of tactical objectives through coordination with ground force commanders and verification that designated mission goals have been achieved without ongoing tactical threats or operational complications. Overwatch mission termination implements safe cessation of overwatch operations while maintaining tactical awareness and security coverage during ground force extraction or transition to subsequent operations. Drone recovery coordination manages the safe return of overwatch drones to designated recovery locations while maintaining operational security and asset protection throughout the recovery process. Mission intelligence compilation processes all collected tactical intelligence, sensor data, and operational information to generate comprehensive mission reports that support tactical assessment, lessons learned analysis, and future breach operation planning.

The "Point-of-Breach Overwatch" operational mode demonstrates practical application of the autonomous drone swarm system for urban tactical operations that enhance ground force effectiveness while providing real-time intelligence and fire support coordination capabilities. The method enables ground forces to conduct breach operations with enhanced situational awareness and tactical support while reducing risk exposure and improving operational success rates.

FIG. 12 is a flow diagram illustrating an exemplary method for implementing a "HLZ/DZ Survey" operational mode implemented by the autonomous drone swarm, according to an embodiment. The method demonstrates a tactical-level operational mode designed to provide automated assessment and preparation of helicopter landing zones and drop zones for medical evacuation operations, to support emergency medical response and personnel extraction requirements.

According to the embodiment, the "HLZ/DZ Survey" process beings with landing zone survey mission initialization at step 1200, which configures the drone swarm for comprehensive landing zone assessment and preparation operations. Potential landing zone and drop zone area identification analyzes the operational environment to locate suitable areas for helicopter operations based on terrain characteristics, accessibility requirements, and tactical considerations including proximity to casualty locations and security factors. Mission parameters configuration establishes assessment criteria, safety requirements, and operational procedures based on aircraft specifications, medical evacuation requirements, and environmental conditions that may affect landing operations. Six to twelve drone microswarm assignment allocates appropriate drone resources for comprehensive area assessment while optimizing coverage efficiency and operational effectiveness based on available assets and mission requirements. Medical evacuation requirements analysis evaluates specific operational needs including casualty severity, time constraints, aircraft capabilities, and operational security requirements that influence landing zone selection and preparation procedures.

Multi-drone swarm deployment and assessment at step 1201 implements coordinated drone positioning and systematic area evaluation that provides comprehensive landing zone analysis across multiple potential sites. Fan-out deployment pattern distributes assigned drones across identified potential landing areas to conduct simultaneous assessment of multiple sites while maximizing coverage efficiency and reducing assessment time. Three-dimensional obstruction mapping utilizing LiDAR and photogrammetry sensors creates detailed terrain models that identify obstacles, elevation changes, and physical impediments that may compromise aircraft safety or landing operations. Slope and surface condition analysis evaluates terrain characteristics including surface composition, stability, drainage, and gradient measurements that affect aircraft landing safety and operational feasibility. Wind and dust hazard sampling monitors environmental conditions including wind speed, direction, turbulence, and dust concentration levels that may create hazardous conditions for aircraft operations or compromise visibility during landing and takeoff procedures.

Automated site scoring and classification at step 1202 processes collected assessment data to generate standardized landing zone suitability ratings that support operational decision-making and aircraft safety. A green/amber/red scoring algorithm automatically evaluates each assessed site against established safety criteria and operational requirements to generate standardized suitability classifications that indicate recommended usage levels and operational limitations. Safety criteria evaluation includes assessment of obstruction clearance, surface conditions, environmental hazards, tactical security, and accessibility factors that determine overall site suitability for helicopter operations. ATAK system coordinate transmission provides immediate delivery of georeferenced landing zone coordinates and assessment data to military tactical communication systems, enabling rapid dissemination of landing zone information to aircraft crews and ground commanders. Site suitability ranking prioritizes approved landing zones based on safety scores, operational advantages, and mission-specific requirements to provide optimal site selection for aircraft operations.

Approved zone marking and guidance at step 1203 establishes physical and electronic markers that provide navigation assistance and operational guidance for incoming aircraft while maintaining continuous monitoring of landing zone conditions. Infrared and visible strobe deployment creates visual navigation aids that enable aircraft crews to identify approved landing zones during both day and night operations while providing standardized military aviation lighting protocols. In some aspects, two escort drones maintain on-station positioning at selected landing zones to provide continuous overwatch, communication relay, and real-time condition monitoring throughout aircraft approach and landing operations. Approach guidance coordination provides communication relay between aircraft crews and ground personnel while monitoring environmental conditions and potential hazards that may affect landing safety. Real-time hazard monitoring continues environmental assessment throughout aircraft operations to detect changing conditions, emerging threats, or safety hazards that require immediate notification to aircraft crews or operational modification.

Aircraft support and mission completion at step 1204 provides continuous operational support throughout aircraft landing, medical evacuation, and departure operations while ensuring mission safety and operational effectiveness. Aircraft arrival and landing support includes approach monitoring, communication relay, and real-time hazard assessment that ensures safe aircraft operations and landing zone security throughout medical evacuation procedures. Casualty pickup overwatch maintains continuous surveillance and security monitoring during patient loading operations while providing communication support and threat detection capabilities that enhance operational safety and medical personnel protection. Safe departure confirmation validates successful completion of medical evacuation operations through monitoring of aircraft departure procedures and verification that landing zones are clear and secure following mission completion. Mission data archival processes all collected assessment data, operational information, and mission outcomes to generate comprehensive reports that support future landing zone operations, tactical intelligence requirements, and operational improvement analysis.

The "HLZ/DZ Survey" method demonstrates practical application of the autonomous drone swarm system for critical medical evacuation support operations that enhance casualty care capabilities while reducing risk exposure for medical personnel and aircraft crews. The method provides rapid, comprehensive landing zone assessment and preparation that significantly reduces response time and improves operational safety for emergency medical operations.

FIG. 13 is a flow diagram illustrating an exemplary method for implementing a "Wide-Area Sentinel" operational mode implemented by the autonomous drone swarm system, according to an embodiment. The method demonstrates an operational-level mission mode designed to provide persistent surveillance and intelligence collection across large geographic areas, typically executed within six to twelve hour operational windows to support sustained area monitoring and comprehensive situational awareness requirements.

According to the embodiment, the "Wide-Area Sentinel" process begins at step 1300 with a wide-area surveillance mission configuration, which establishes mission parameters optimized for extended area monitoring and persistent intelligence collection operations. Operational area definition establishes the geographic boundaries and surveillance priorities for the designated surveillance sector (e.g., ten by ten kilometer), including identification of key terrain features, critical infrastructure, population centers, and areas of tactical or strategic significance that require enhanced monitoring coverage. Six to twelve hour mission planning develops comprehensive operational timelines that balance surveillance effectiveness with resource management requirements, including drone deployment schedules, coverage priorities, and contingency procedures for extended operations. Drone formation optimization determines the most effective distribution of available drone assets across the surveillance area to ensure complete coverage while maximizing operational efficiency and minimizing resource consumption. Power management protocols establish automated charging schedules, drone rotation procedures, and energy conservation measures that enable sustained operations throughout the extended mission duration without compromising surveillance effectiveness or operational continuity.

A sector scanning deployment at step 1301 implements systematic surveillance patterns that provide coverage across the designated operational area through coordinated drone positioning and movement. Systematic sector scanning patterns establish methodical surveillance routes and coverage areas that ensure complete area monitoring while optimizing drone positioning and movement efficiency to minimize operational gaps and maximize intelligence collection effectiveness. In some implementations, overlapping coverage zones create redundant surveillance areas that provide enhanced threat detection capabilities and ensure continuous monitoring despite individual drone movement or temporary positioning adjustments. Multi-drone formation coordination synchronizes drone operations across the surveillance area to maintain optimal coverage distribution while adapting to changing operational requirements, environmental conditions, and priority shifts throughout the mission duration. Initial surveillance establishment activates all sensor systems and begins systematic intelligence collection operations across the designated area while implementing communication protocols and coordination procedures that support sustained operational effectiveness.

Multi-modal intelligence fusion and analysis at step 1302 processes collected surveillance data through advanced algorithms that provide comprehensive situational awareness and threat assessment capabilities. For instance, moving target indicator data processing analyzes sensor feeds to automatically detect, track, and classify mobile objects including, but not limited to, vehicles, personnel, and equipment movement patterns that may indicate tactical significance or potential threats. Electronic warfare signal collection and analysis monitors radio frequency emissions, communication patterns, and electronic signatures that provide intelligence on adversary activities, communication networks, and operational capabilities within the surveillance area. Pattern-of-life analytics evaluate behavioral patterns, routine activities, and baseline conditions across the surveillance area to identify anomalies, unusual activities, and deviations from normal operational patterns that may indicate hostile activities or emerging threats. One or more threat classification algorithms automatically categorize detected activities based on, for example, threat level, tactical significance, and required response measures while providing immediate alerts for high-priority threats that require immediate attention or operational response.

Rolling handoff and continuous coverage at step 1303 implements operational transitions that maintain persistent surveillance coverage throughout the extended mission duration despite individual drone limitations and maintenance requirements. In some embodiments, coordinated drone rotation manages systematic replacement of individual drones that require battery charging, maintenance, or equipment servicing while ensuring that surveillance coverage remains uninterrupted throughout operational transitions. Seamless coverage transitions coordinate handoff procedures between rotating drones to maintain continuous monitoring of critical areas and preserve tracking of ongoing activities or threats throughout personnel and equipment changes. Autonomous charging cycles may be configured which implement automated battery management procedures that enable individual drones to return to charging stations, complete power restoration, and return to operational status without human intervention or mission interruption. Mission continuity protocols ensure that intelligence collection, threat monitoring, and surveillance operations continue effectively despite equipment maintenance, environmental challenges, or unexpected operational complications throughout the extended mission duration.

Intelligence product generation and reporting at step 1304 compiles collected surveillance data and analysis results into intelligence products that support operational decision-making and strategic planning requirements. For example, a comprehensive area assessment may be produced which evaluates overall surveillance results to provide strategic-level situational awareness including, but not limited to, threat assessments, activity patterns, infrastructure status, and operational conditions across the monitored area. Intelligence report compilation processes all collected data, analysis results, and tactical observations into standardized intelligence reports that support command decision-making and operational planning requirements. Threat summary generation provides focused analysis of identified threats, hostile activities, and security concerns that require immediate attention or operational response from command authorities. Operational recommendations develop tactical and strategic suggestions based on surveillance results and threat analysis that support future operational planning, resource allocation, and tactical decision-making requirements.

The "Wide-Area Sentinel" method demonstrates practical application of the autonomous drone swarm system for sustained area surveillance operations that provide comprehensive situational awareness and intelligence collection capabilities across large geographic areas. The method enables persistent monitoring and threat detection that significantly exceeds human surveillance capabilities while providing continuous operational coverage and detailed intelligence analysis.

FIG. 14 is a flow diagram illustrating an exemplary method for implementing a "Deep Fires Mesh" operational mode implemented by the autonomous drone swarm system, according to an embodiment. The method demonstrates an operational-level mission mode designed to provide extended-range target acquisition and fire coordination capabilities beyond the forward line of own troops, typically executed within twenty-four hour operational cycles to support deep strike operations and long-range precision fires coordination.

According to the embodiment, the "Deep Fires Mesh" process begins at step 1400 with deep fires mission initialization and deployment, which establishes comprehensive fire support coordination capabilities at extended ranges beyond friendly force positions. For example, fifty to one hundred kilometer forward line of own troops deployment positions drone swarms at maximum operational range to provide target acquisition and fire coordination capabilities in areas inaccessible to ground-based reconnaissance and fire support systems. Organic sensor integration activates all available drone-mounted sensors including electro-optical cameras, infrared thermal imaging, LiDAR and photogrammetry mapping systems, and radio frequency detection capabilities to provide comprehensive target acquisition and battlefield assessment capabilities. Satellite and airborne intelligence cue coordination establishes data sharing protocols with national intelligence assets, strategic reconnaissance platforms, and theater-level intelligence systems to enhance target identification and reduce acquisition timelines. Fire support asset identification catalogs available rocket artillery, cannon systems, and precision strike capabilities that can engage targets identified by the deep fires mesh while ensuring coordination compatibility and engagement effectiveness.

Extended range target acquisition at step 1401 implements systematic reconnaissance and target identification operations across the extended operational area to identify high-value targets suitable for long-range engagement. Extended range reconnaissance conducts comprehensive surveillance operations across areas beyond the range of conventional ground-based reconnaissance systems while maintaining communication connectivity with fire support coordination centers through extended-range communication protocols. Multi-intelligence source fusion combines organic drone sensor data with satellite imagery, signals intelligence, and other available intelligence sources to provide comprehensive target assessment and identification capabilities that exceed individual platform limitations. Target search and identification employs artificial intelligence algorithms that automatically detect, classify, and prioritize potential targets based on tactical significance, engagement feasibility, and operational priority criteria established by fire support coordination authorities. Threat assessment and prioritization evaluates identified targets based on threat level, time sensitivity, engagement difficulty, and operational impact to provide optimized target selection that maximizes fire support effectiveness and operational impact.

High-payoff target nomination and validation at step 1402 processes identified targets through redundant assessment and authorization procedures that ensure appropriate target engagement and minimize collateral damage risks. High-payoff target selection may identify targets that provide maximum operational impact when engaged, including command and control facilities, logistics nodes, communication centers, and military equipment concentrations that significantly degrade adversary operational capabilities. In some embodiments, coordinate precision verification employs multiple sensor systems and positioning technologies to ensure accurate target location data that enables precision engagement and minimizes collateral damage risks through precise coordinate determination and verification procedures. Target validation protocols implement assessment procedures that verify target identification, assess collateral damage potential, and confirm engagement authorization based on rules of engagement and operational directives. Engagement authorization coordinates with appropriate command authorities to obtain necessary approvals for target engagement while ensuring compliance with operational directives and legal requirements for fire support operations.

Digital fire mission coordination and battle damage assessment at step 1403 provides fire support coordination that enables immediate target engagement and effectiveness assessment through automated fire mission procedures. Digital call-for-fire generation may be implemented to automatically create standardized fire mission requests that include precise target coordinates, target descriptions, recommended munition types, and engagement priorities formatted for immediate transmission to fire support systems. Rocket and cannon unit coordination provides direct communication with artillery units, rocket systems, and other available fire support assets to coordinate target engagement timing, ammunition allocation, and firing procedures that optimize engagement effectiveness. Real-time battle damage assessment employs drone sensors to monitor target engagement results and assess damage effectiveness immediately following fire missions while providing feedback for additional engagement requirements. Rapid re-attack capability enables immediate follow-up engagements based on battle damage assessment results while coordinating with fire support assets to provide sustained target engagement and maximum operational impact.

Twenty-four hour cycle handoff and continuity at step 1404 implements operational transitions that maintain persistent deep fires capability throughout extended operational periods despite individual drone limitations and maintenance requirements. Seamless takeover procedures coordinate replacement of deep fires mesh formations with fresh drone assets while maintaining continuous target acquisition and fire coordination capabilities throughout operational transitions. Mission handoff protocols ensure smooth transfer of target tracking responsibilities, ongoing fire missions, and operational awareness between rotating deep fires formations without interrupting operational effectiveness or target engagement capabilities. Continuous operation maintenance may comprise automated logistics coordination, equipment maintenance, and operational sustainment procedures that enable persistent deep fires operations throughout extended campaign periods. Performance optimization continuously evaluates operational effectiveness and implements procedural improvements that enhance target acquisition speed, engagement accuracy, and overall fire support coordination effectiveness throughout sustained operations.

The "Deep Fires Mesh" method demonstrates practical application of the autonomous drone swarm system for extended-range fire support operations that significantly enhance deep strike capabilities while providing persistent target acquisition and engagement coordination at ranges beyond conventional fire support systems. The method enables sustained deep fires operations that provide continuous pressure on adversary rear-area operations while supporting broader operational objectives through persistent long-range strike capabilities.

FIG. 15 is a flow diagram illustrating an exemplary method for implementing an "Infrastructure Defense Net" operational mode implemented by the autonomous drone swarm system, according to an embodiment. The method demonstrates an operational-level mission mode designed to provide continuous automated protection for critical infrastructure against incoming threats, typically executed as persistent defensive operations to safeguard essential facilities and logistics operations from rocket, artillery, and mortar attacks.

According to the embodiment, the "Infrastructure Defense Net" method begins at step 1500 with infrastructure defense network establishment, which configures the drone swarm for protection of designated critical facilities and logistics operations. Critical infrastructure identification catalogs protected assets including bridges, fuel storage facilities, logistics package routes, command centers, communication nodes, and other essential infrastructure that requires continuous protection from indirect fire threats and aerial attacks. Threat vector analysis evaluates potential attack approaches, likely threat types, and engagement parameters to optimize defensive positioning and response capabilities based on terrain characteristics, threat capabilities, and infrastructure vulnerability assessments. Defense parameter configuration establishes engagement criteria, response protocols, and coordination procedures that define automated defense responses while ensuring appropriate rules of engagement and collateral damage minimization. Micro-interceptor system preparation activates counter-rocket, artillery, and mortar defense capabilities while verifying interceptor availability, engagement readiness, and system functionality necessary for effective threat neutralization.

Geofenced protective lattice deployment at step 1501 establishes comprehensive defensive coverage across designated infrastructure areas through coordinated drone positioning and overlapping defensive zones. Bridge, fuel farm, and logistics protection creates specialized defensive configurations tailored to specific infrastructure types and vulnerability characteristics while providing comprehensive coverage that addresses multiple threat vectors and attack scenarios. Overlapping coverage zones ensure redundant defensive capabilities that maintain protection effectiveness despite individual system failures or simultaneous multiple threat engagements while providing enhanced detection and engagement capabilities through coordinated sensor coverage. Defensive position optimization determines optimal drone positioning that maximizes engagement effectiveness while minimizing interference between defensive systems and ensuring comprehensive threat coverage across all protected infrastructure areas. Communication network integration establishes secure coordination protocols between defensive drones and protected facility management systems while maintaining connectivity with broader command and control networks for coordination and reporting requirements.

Continuous threat detection and monitoring at step 1502 implements persistent surveillance capabilities that provide immediate identification and tracking of incoming threats throughout the protected area. Inbound threat detection algorithms employ advanced sensor fusion and artificial intelligence capabilities to automatically identify incoming projectiles, aerial vehicles, and other potential threats while distinguishing between legitimate air traffic and hostile incoming threats. Rocket, artillery, and mortar identification utilizes specialized algorithms that classify threat types based on (but not limited to) trajectory characteristics, velocity profiles, and signature analysis to determine appropriate defensive responses and engagement priorities. Trajectory analysis and impact prediction calculate threat flight paths and projected impact points to determine threat priority and optimal interceptor engagement timing while providing early warning to protected facilities and personnel. Real-time threat classification automatically categorizes detected threats based on danger level, target priority, and engagement feasibility while triggering appropriate defensive responses and alert procedures.

Automated counter-rocket, artillery, and mortar (RAM) interceptor launch at step 1503 provides immediate defensive response against confirmed threats through coordinated interceptor deployment and precision engagement capabilities. Automatic interceptor deployment launches appropriate defensive munitions based on threat characteristics and engagement parameters while coordinating multiple interceptor systems to ensure effective threat neutralization and optimal resource utilization. Precision engagement coordination calculates optimal interceptor launch timing, trajectory, and engagement parameters to maximize neutralization probability while minimizing interceptor consumption and collateral damage risks. Multi-layer defense activation coordinates multiple defensive systems and engagement methods to provide redundant threat neutralization capabilities that ensure protection effectiveness despite individual system limitations or engagement challenges. Threat neutralization confirmation verifies successful threat interception through sensor monitoring and impact assessment while providing immediate damage assessment and alert procedures for any threats that penetrate defensive coverage.

Defense assessment and network optimization at step 1504 continuously evaluates defensive effectiveness and implements improvements that enhance protection capabilities and operational efficiency throughout sustained defensive operations. Defense effectiveness evaluation analyzes engagement results, threat neutralization rates, and system performance to identify optimization opportunities and procedural improvements that enhance overall defensive capabilities. Network performance optimization adjusts defensive positioning, engagement parameters, and coordination procedures based on operational experience and threat patterns to maximize protection effectiveness while minimizing resource consumption and operational costs. Continuous protection maintenance implements automated system checks, equipment servicing, and readiness verification procedures that ensure sustained defensive capabilities throughout extended operational periods without degradation of protection effectiveness. System readiness verification confirms that all defensive systems remain operational and capable of effective threat response while maintaining communication connectivity and coordination capabilities necessary for successful infrastructure protection.

The "Infrastructure Defense Net" method demonstrates practical application of the autonomous drone swarm system for critical infrastructure protection that provides continuous automated defense against indirect fire threats and aerial attacks. The method enables persistent protection of essential facilities and logistics operations while reducing human operator workload and providing immediate threat response capabilities that exceed conventional defensive systems.

FIG. 16 is a flow diagram illustrating an exemplary method for implementing a "Persistent Border Monitor" operational mode implemented by the autonomous drone swarm system, according to the embodiment. The method demonstrates a strategic-level mission mode designed to provide long-term autonomous surveillance of border areas and strategic boundaries, typically executed within seven to thirty day operational cycles to support national security monitoring and border protection requirements through sustained autonomous operations.

According to the embodiment, a "Persistent Border Monitor" method begins at step 1600 with border surveillance system initialization, which establishes comprehensive long-term monitoring capabilities across designated border sectors and strategic boundary areas. Border sector assignment defines specific geographic areas of responsibility including international boundaries, strategic corridors, and areas of national security significance that require sustained monitoring and intelligence collection capabilities. National intelligence, surveillance, and reconnaissance integration setup establishes secure communication protocols and data sharing agreements with national-level intelligence assets including satellite systems, strategic reconnaissance platforms, and intelligence analysis centers to enhance detection capabilities and provide comprehensive situational awareness. Seven to thirty day mission planning develops extended operational timelines that balance surveillance effectiveness with resource sustainability requirements while establishing logistics support, maintenance schedules, and operational procedures necessary for sustained autonomous operations. Automated logistics coordination implements supply chain management, equipment maintenance, and resource allocation procedures that enable persistent operations without continuous human oversight or manual intervention throughout extended operational periods.

Autonomous lane establishment (e.g., one hundred fifty kilometer) at step 1601 creates systematic surveillance coverage across extensive border areas through coordinated drone deployment and strategic positioning optimization. Autonomous surveillance lanes establish methodical coverage patterns that provide comprehensive monitoring across designated border sectors while optimizing resource utilization and ensuring complete area coverage without surveillance gaps or operational vulnerabilities. Overlapping coverage patterns may be implemented to create redundant monitoring capabilities that enhance detection reliability and provide backup surveillance coverage when individual drones require maintenance, charging, or equipment servicing throughout extended operational periods. Strategic positioning optimization determines optimal drone placement that maximizes surveillance effectiveness while considering terrain characteristics, communication requirements, threat patterns, and logistical constraints that affect sustained operations across extensive geographic areas. Communication relay establishment creates robust communication networks that maintain connectivity across extended ranges while providing backup communication pathways and integration with national command and control systems throughout sustained operations.

Multi-source intelligence integration and analysis at step 1602 combines organic drone sensor data with national-level intelligence assets to provide enhanced border monitoring and threat assessment capabilities. National intelligence fusion can correlate drone-collected surveillance data with satellite imagery, signals intelligence, human intelligence, and other national-level intelligence sources to provide enhanced situational awareness and threat detection capabilities that exceed individual platform limitations. Organic sensor data correlation processes information from multiple drone sensors including, but not limited to, electro-optical cameras, infrared imaging, radio frequency detection, and environmental monitoring systems to create comprehensive operational pictures and detect activities that may indicate security threats. Pattern analysis and baseline establishment evaluates normal border activity patterns, routine traffic flows, and typical operational conditions to create baseline references that enable detection of unusual activities or deviations from normal patterns that may indicate security concerns. Anomaly detection algorithms automatically identify activities, movements, or conditions that deviate from established baseline patterns while classifying detected anomalies based on threat level and operational significance.

Threat detection and alert generation at step 1603 processes surveillance data and intelligence analysis to identify potential security threats and provide immediate notification to appropriate authorities and command systems. For example, a massing force identification process detects military unit movements, equipment concentrations, or personnel buildups that may indicate hostile intent or preparation for border violations while providing detailed assessment of force composition, capabilities, and potential threat levels. Suspicious activity flagging automatically identifies unusual behavior patterns, unauthorized border crossings, smuggling activities, or other activities that may compromise border security or national security interests while prioritizing alerts based on threat assessment and operational significance. Real-time alert transmission provides immediate notification of detected threats or suspicious activities to appropriate command authorities while ensuring secure communication and proper alert formatting for rapid response coordination. Command and control and joint coordination center notification ensures that threat information reaches appropriate decision-making authorities while maintaining coordination with other border security agencies and response organizations throughout alert and response procedures.

Seven to thirty day continuous operations and sustainment at step 1604 implements operational procedures that maintain persistent border monitoring capabilities throughout extended operational periods while ensuring system effectiveness and operational readiness. Persistent monitoring maintenance may comprise, but is not limited to, automated system checks, equipment servicing, and performance verification procedures that ensure continued surveillance effectiveness throughout extended operations without degradation of detection capabilities or operational coverage. Automated logistical support implements supply chain coordination, equipment replacement, and maintenance scheduling that sustains operations without continuous human oversight while ensuring resource availability and system readiness throughout extended operational periods. Performance optimization cycles continuously evaluate surveillance effectiveness and implement procedural improvements that enhance detection capabilities, reduce resource consumption, and improve overall operational efficiency based on operational experience and changing threat patterns. Mission continuity protocols ensure seamless operational transitions during equipment maintenance, personnel changes, or operational adjustments while maintaining continuous surveillance coverage and threat detection capabilities throughout sustained operations.

The "Persistent Border Monitor" method demonstrates practical application of the autonomous drone swarm system for strategic-level border security operations that provide sustained surveillance capabilities across extensive geographic areas while reducing human operator requirements and providing enhanced threat detection and intelligence collection. The method enables long-term border monitoring that significantly exceeds conventional surveillance capabilities while providing continuous operational coverage and detailed intelligence analysis throughout strategic operational timeframes. threat detection throughout strategic-level operational periods and extensive geographic scales.

FIG. 17 is a flow diagram illustrating an exemplary method for implementing a "Theater Fires Orchestrator" operational mode implemented by the autonomous drone swarm system, according to an embodiment. The method demonstrates a strategic-level mission mode designed to provide comprehensive fire coordination and target development across theater-wide areas of operation, typically executed throughout campaign-duration deployments to support long-range precision fires coordination and strategic target engagement at the highest operational levels.

According to the embodiment, the "Theater Fires Orchestrator" process begins at step 1700 with theater-wide orchestration initialization, which establishes various fire coordination capabilities across entire theater areas of operation for strategic-level fires coordination and target development. A theater area of operations definition establishes geographic boundaries and operational parameters for comprehensive fires coordination including identification of strategic targets, critical infrastructure, enemy force concentrations, and operational objectives that require coordinated engagement through theater-level fires assets. Corps and combined-joint integration creates secure communication protocols and coordination procedures with corps-level fires cells, joint service fire coordination centers, and combined coalition fires coordination authorities to ensure unified fires planning and execution across all participating forces and organizations. Campaign duration planning develops comprehensive operational timelines that support sustained fires coordination throughout extended military campaigns while establishing logistics support, target development priorities, and coordination procedures necessary for persistent strategic fires operations. Strategic fires coordination setup configures communication systems, target development protocols, and engagement coordination procedures that enable fires orchestration across multiple services, coalition partners, and strategic fires capabilities throughout extended operational periods.

Long-endurance swarm layer deployment at step 1701 establishes persistent theater-wide surveillance and target development capabilities through coordinated deployment of multiple drone formations across strategic operational areas. Theater-wide swarm positioning distributes multiple drone formations across extensive geographic areas to provide surveillance coverage and target development capabilities that support strategic fires planning and execution across entire theater areas of operation. Long-endurance formation establishment creates persistent surveillance capabilities that maintain continuous operational coverage throughout extended campaign periods while implementing automated logistics coordination and maintenance procedures that sustain operations without continuous human oversight. Persistent coverage optimization determines optimal drone positioning and coverage patterns that maximize target development effectiveness while ensuring comprehensive area surveillance and strategic intelligence collection across all areas of operational significance. Strategic communication networks establish robust, secure communication capabilities that maintain connectivity across theater-wide operational areas while providing integration with national-level intelligence systems and strategic command and control networks throughout sustained operations.

Multi-source target development and fusion at step 1702 combines organic drone intelligence with national-level intelligence assets to provide comprehensive target identification and development capabilities that support strategic fires planning and execution. For example, in some implementations national, synthetic aperture radar, and Joint Surveillance Target Attack Radar System feed fusion integrates drone-collected intelligence with national-level reconnaissance assets to provide enhanced target identification capabilities and comprehensive battlefield assessment that exceeds individual platform limitations. Pre-planned target set generation develops comprehensive target lists based on strategic objectives, operational priorities, and intelligence assessments while coordinating with theater-level planning authorities to ensure target development supports broader campaign objectives and strategic goals. Dynamic target development identifies emerging targets, time-sensitive targets, and high-payoff targets that require immediate engagement while providing rapid target development and engagement coordination that supports tactical flexibility and operational responsiveness. High-payoff target identification prioritizes targets based on strategic value, operational impact, and engagement feasibility while ensuring optimal resource allocation and maximum operational effectiveness throughout strategic fires operations.

Dynamic long-range precision fires coordination and deconfliction at step 1703 provides fires coordination that enables simultaneous engagement of multiple strategic targets while preventing fratricide and optimizing engagement effectiveness across theater-wide operations. Long-range precision fires target set coordination manages target assignment and engagement timing across multiple fires systems including strategic missiles, long-range artillery, and precision strike capabilities while ensuring optimal target coverage and resource utilization throughout coordinated engagement operations. Fire corridor deconfliction coordinates engagement timing and flight paths to prevent interference between simultaneous fires missions while ensuring airspace safety and preventing fratricide during complex multi-target engagement operations. Timing synchronization coordinates engagement schedules across multiple fires systems and target sets to maximize operational impact while supporting broader tactical and strategic objectives throughout coordinated fires operations. Engagement optimization analyzes target characteristics, fires capabilities, and operational constraints to determine optimal engagement methods and timing that maximize target neutralization probability while minimizing resource consumption and collateral damage throughout strategic fires operations.

Campaign-long kill-chain visibility at step 1704 provides persistent monitoring and assessment of strategic fires effectiveness throughout extended campaign operations while supporting continuous improvement and operational optimization. Persistent kill-chain monitoring maintains continuous surveillance of target areas and engagement results to provide thorough assessment of fires effectiveness while tracking target status and operational impact throughout extended campaign periods. Corps and combined-joint visibility provides real-time fires coordination information and engagement results to appropriate command authorities while ensuring strategic-level situational awareness and coordination support throughout complex multi-service and coalition operations. Campaign effectiveness assessment evaluates the overall fires program effectiveness based on, for example, target neutralization results, operational impact assessments, and strategic objective achievement while providing feedback for continuous improvement and operational optimization throughout extended campaign operations. Strategic fires optimization continuously improves fires coordination procedures, target development processes, and engagement effectiveness based on operational experience and changing strategic requirements while adapting to evolving threat conditions and operational priorities throughout sustained campaign operations.

The "Theater Fires Orchestrator" method demonstrates practical application of the autonomous drone swarm system for strategic-level fires coordination that provides enhanced target development and engagement coordination across theater-wide operational areas while supporting complex multi-service and coalition operations. The method enables strategic fires coordination that significantly exceeds conventional coordination capabilities while providing persistent target development and engagement coordination throughout campaign-duration operations.

FIG. 18 is a flow diagram illustrating an exemplary method for implementing a "Maritime Chokepoint Watch" operational mode implemented by the autonomous drone swarm system, according to an embodiment. The method demonstrates a strategic-level mission mode designed to provide persistent surveillance and maritime domain awareness over strategic maritime passages and waterways, typically executed within fourteen-day operational cycles to support naval operations and maritime security through vessel monitoring and threat detection capabilities.

According to the embodiment, the "Maritime Chokepoint Watch" process begins at step 1800 with maritime surveillance mission establishment, which configures the drone swarm for comprehensive monitoring of strategic maritime passages, straits, and critical waterways that affect naval operations and maritime security. Strategic chokepoint identification catalogs critical maritime passages including, but not limited to, international straits, shipping lanes, harbor approaches, and strategic waterways that require persistent monitoring due to their operational significance for naval operations, commercial shipping, or national security interests. Maritime corridor analysis evaluates geographic characteristics, traffic patterns, threat assessments, and operational requirements for designated waterways while identifying optimal surveillance positions and coverage requirements necessary for comprehensive maritime domain awareness.

Mission configuration establishes extended operational parameters that balance surveillance effectiveness with resource sustainability while implementing logistics support, maintenance schedules, and operational procedures necessary for sustained autonomous maritime operations. Naval coordination protocols create secure communication links and information sharing agreements with naval command centers, maritime operations centers, and fleet coordination authorities to ensure effective integration with broader naval operations and maritime security efforts.

Hybrid air and sea swarm deployment at step 1801 establishes surveillance coverage across designated maritime areas through coordinated positioning of aerial and surface drone platforms optimized for maritime operations. Air and sea hybrid formation creates integrated surveillance capabilities that combine aerial overwatch with surface-level monitoring to provide comprehensive coverage of maritime activities while optimizing detection capabilities and operational effectiveness across different maritime operational environments. Strategic passage positioning deploys drone formations at optimal locations that maximize surveillance coverage of critical maritime chokepoints while ensuring comprehensive monitoring of vessel traffic and potential threat activities throughout designated waterways. Overlapping surveillance zones create redundant monitoring capabilities that enhance detection reliability and provide backup surveillance coverage when individual platforms require maintenance, charging, or repositioning throughout extended maritime operations. Maritime communication networks establish robust communication capabilities that maintain connectivity across extended maritime ranges while providing integration with naval command systems and maritime coordination centers throughout sustained operations in challenging maritime environments.

Vessel identification and classification at step 1802 processes maritime surveillance data to provide vessel tracking and threat assessment capabilities that support maritime domain awareness and naval operational requirements. Automatic Identification System (AIS) spoof-check verification correlates drone sensor data with AIS transponder information to detect potential vessel identity spoofing, AIS manipulation, or other deceptive practices that may indicate hostile intent or illicit maritime activities. Electro-optical and infrared vessel identification employs advanced imaging systems to visually identify and classify vessels based on physical characteristics, configuration details, and operational behavior while providing detailed vessel assessment that supplements or verifies electronic identification systems.

Automated vessel tracking maintains continuous monitoring of identified vessels throughout their transit of monitored waterways while correlating movement patterns, speed changes, and route deviations that may indicate suspicious activities or operational significance. Maritime traffic analysis evaluates overall vessel movement patterns, traffic density, and operational trends to identify anomalies, unusual activities, or patterns that may indicate strategic significance or potential security concerns requiring additional assessment or response.

Naval asset cueing and coordination at step 1803 provides comprehensive information sharing and coordination support that enables effective naval response to identified maritime threats or activities of interest. Naval asset alert procedures can implement standardized notification protocols that provide immediate alerts to appropriate naval commands when suspicious vessels, potential threats, or activities of interest are detected within monitored maritime areas. Real-time intelligence sharing transmits detailed vessel information, tracking data, and threat assessments to naval operations centers while ensuring secure communication and proper intelligence formatting for tactical and strategic decision-making. Threat classification coordination correlates drone-collected intelligence with naval intelligence databases and threat assessments to provide comprehensive threat evaluation and recommended response measures based on vessel characteristics and operational behavior. Response asset cueing provides targeting information and coordination support for naval vessels, aircraft, or other response assets that may be tasked to intercept, investigate, or engage identified maritime threats or vessels of interest.

Fourteen-day continuous maritime domain awareness at step 1804 implements sustained monitoring capabilities that maintain situational awareness across designated maritime areas throughout extended operational periods while supporting strategic maritime security objectives. Persistent maritime monitoring maintains continuous surveillance coverage across strategic waterways while implementing automated logistics coordination and maintenance procedures that sustain operations without degradation of surveillance effectiveness throughout extended maritime operations.

Automated vessel classification continuously improves vessel identification capabilities through machine learning algorithms that enhance recognition accuracy and reduce false positives while building comprehensive databases of vessel characteristics and operational patterns. Domain awareness maintenance ensures comprehensive maritime situational awareness through continuous monitoring, intelligence analysis, and coordination with broader maritime security networks while adapting to changing operational requirements and threat conditions throughout sustained operations. Strategic intelligence reporting provides comprehensive maritime intelligence products that support naval planning, strategic assessment, and operational decision-making while documenting maritime activities and trends that affect broader strategic objectives and maritime security interests.

The "Maritime Chokepoint Watch" method demonstrates practical application of the autonomous drone swarm system for strategic maritime surveillance operations that provide comprehensive vessel monitoring and maritime domain awareness across critical waterways while supporting naval operations and maritime security objectives. The method enables persistent maritime monitoring that significantly exceeds conventional surveillance capabilities while providing continuous operational coverage and detailed maritime intelligence throughout strategic operational timeframes.

FIG. 19 is a flow diagram illustrating an exemplary method for implementing a "Disaster Response Coordination" operational mode implemented by the autonomous drone swarm system, according to an embodiment. The method demonstrates a tactical-level commercial application designed to provide immediate emergency response support during natural disasters, mass casualty events, and emergency situations, typically executed within fifteen minutes to several hours to support first responders and emergency management agencies through rapid deployment and comprehensive coordination capabilities.

According to the embodiment, the "Disaster Response Coordination" process begins at step 1900 with emergency response system activation, which rapidly configures the drone swarm for immediate deployment to disaster areas and emergency response operations. In some implementations, a disaster event notification triggers automatic system activation upon receipt of emergency alerts from emergency operations centers, emergency management agencies, or first responder dispatch systems while implementing rapid response protocols that minimize deployment time and maximize operational effectiveness. Emergency response configuration adapts mission parameters, sensor priorities, and coordination procedures based on disaster type, severity, and operational requirements including natural disasters such as earthquakes, hurricanes, wildfires, or human-caused emergencies including terrorist attacks, industrial accidents, or mass casualty events. First responder coordination establishes secure communication links with police, fire, emergency medical services, and emergency management agencies while implementing standardized incident command system protocols that ensure effective integration with existing emergency response procedures. Tactical-level deployment preparation configures drone assignments, sensor packages, and operational procedures optimized for immediate emergency response while ensuring equipment readiness and communication connectivity necessary for effective disaster response operations.

Rapid damage assessment and mapping at step 1901 provides immediate situational awareness and comprehensive damage evaluation that supports emergency response planning and resource allocation decisions. An aerial damage survey deployment rapidly positions drones over affected areas to conduct comprehensive damage assessment while providing real-time imagery and intelligence to emergency commanders and incident management teams. Infrastructure assessment processes evaluate critical infrastructure damage including roads, bridges, buildings, utilities, and communication systems while identifying passable routes, structural hazards, and infrastructure failures that affect emergency response operations and public safety. Hazard identification and mapping detects immediate dangers including, but not limited to, fires, chemical spills, structural collapses, flooding, or other hazards that threaten first responder safety or civilian populations while providing real-time hazard mapping that supports tactical decision-making and resource deployment. Real-time situational awareness transmits damage assessment information to emergency operations centers and incident command posts while providing continuous updates that support dynamic emergency response planning and tactical adaptation based on changing conditions and operational requirements.

Search and rescue coordination support at step 1902 provides assistance to search and rescue teams through advanced detection capabilities and tactical coordination that enhances survivor location and rescue effectiveness. Thermal signature detection capabilities on a drone employs infrared imaging systems to identify human heat signatures in collapsed buildings, debris fields, or other disaster areas where survivors may be trapped or injured while providing precise location information that guides rescue team deployment and tactical operations. Survivor location identification correlates thermal detections with structural analysis and accessibility assessments to provide rescue teams with optimal approach routes and tactical recommendations that maximize rescue effectiveness while minimizing responder risk exposure. Rescue team guidance provides real-time navigation assistance, hazard warnings, and tactical intelligence that supports rescue operations while maintaining continuous communication with rescue personnel throughout search and rescue operations. Medical evacuation support implements helicopter landing zone assessment and preparation capabilities that enable rapid medical evacuation while providing approach guidance and hazard monitoring that ensures safe medical helicopter operations in challenging disaster environments.

Emergency communication relay and coordination at step 1903 establishes critical communication capabilities that support emergency response coordination when normal communication infrastructure becomes damaged or overloaded during disaster operations. Communication network restoration provides immediate communication relay capabilities that connect isolated emergency response teams with command centers while establishing backup communication networks that maintain coordination despite infrastructure damage or communication system failures. Emergency services coordination enables communication between police, fire, emergency medical services, and other response agencies while providing information sharing capabilities that support unified command and coordinated emergency response operations. Public safety messaging provides emergency alert capabilities and public information dissemination that warns civilian populations of immediate dangers while providing evacuation instructions, shelter information, and safety guidance that protects public welfare during emergency situations. Multi-agency information sharing facilitates coordination between federal, state, and local emergency response agencies while providing standardized information formats and secure communication protocols that support comprehensive emergency management and response coordination.

Resource allocation and recovery operations at step 1904 optimizes emergency response effectiveness through intelligent resource management and coordination support that maximizes operational impact while supporting transition to recovery operations. Resource distribution optimization analyzes emergency response requirements, available resources, and operational priorities to provide recommendations for optimal resource allocation while ensuring that critical needs receive priority attention and resource deployment supports maximum operational effectiveness. Recovery operation support provides intelligence and coordination assistance that supports transition from emergency response to recovery operations while maintaining situational awareness and operational coordination throughout extended disaster response and recovery periods. Logistics coordination manages supply distribution, equipment deployment, and personnel coordination that supports sustained emergency response operations while ensuring that logistical requirements do not compromise operational effectiveness or emergency response capabilities. Mission effectiveness assessment evaluates emergency response operations and coordination effectiveness while identifying lessons learned and operational improvements that enhance future emergency response capabilities and operational preparedness.

The "Disaster Response Coordination" method demonstrates practical application of the autonomous drone swarm system for commercial emergency response operations that provide immediate assistance to first responders and emergency management agencies while enhancing operational effectiveness and public safety during disaster response operations. The method enables rapid emergency response deployment that significantly exceeds conventional emergency response capabilities while providing comprehensive coordination support and operational intelligence throughout emergency response and recovery operations.

FIG. 20 is a flow diagram illustrating an exemplary method for implementing a "Pipeline Integrity Monitoring" operational mode implemented by the autonomous drone swarm system, according to an embodiment. The method demonstrates an operational-level commercial application designed to provide comprehensive monitoring and protection of oil, gas, and utility pipeline infrastructure, typically executed within six to twenty-four hour operational cycles to support continuous pipeline integrity assessment and security monitoring through persistent autonomous surveillance capabilities.

According to the embodiment, the "Pipeline Integrity Monitoring" process begins at step 2000 with pipeline monitoring system initialization, which configures the drone swarm for comprehensive pipeline infrastructure monitoring and protection operations across extended pipeline corridors and distribution networks. Pipeline route configuration establishes monitoring parameters for designated pipeline segments including natural gas transmission lines, crude oil pipelines, refined product distribution systems, and utility infrastructure while defining surveillance priorities, inspection intervals, and monitoring requirements based on pipeline criticality and operational significance. Multi-sensor system setup activates specialized sensor packages including chemical detection systems for hydrocarbon leak detection, thermal imaging for temperature anomaly identification, electro-optical cameras for visual inspection, and radio frequency sensors for detecting unauthorized electronic devices or communication systems near pipeline infrastructure. Operational-level mission planning develops comprehensive monitoring schedules that balance surveillance effectiveness with resource sustainability while establishing patrol routes, inspection priorities, and maintenance procedures necessary for sustained pipeline monitoring operations. Utility company integration creates secure communication protocols and data sharing agreements with pipeline operators, utility companies, and regulatory agencies to ensure effective coordination and compliance with industry standards and regulatory requirements.

Automated corridor inspection and mapping at step 2001 implements systematic monitoring of pipeline rights-of-way and surrounding areas through coordinated drone surveillance that provides comprehensive infrastructure assessment and environmental monitoring capabilities. Systematic corridor surveillance establishes methodical inspection patterns along pipeline routes that ensure complete coverage of pipeline infrastructure while monitoring adjacent areas for activities that may affect pipeline safety or operational integrity. Infrastructure condition assessment evaluates visible pipeline components including, but not limited to, above-ground facilities, valve stations, compressor stations, and support infrastructure while identifying maintenance requirements, structural concerns, and operational anomalies that may indicate developing problems or safety hazards. Right-of-way monitoring ensures compliance with pipeline casement requirements while detecting unauthorized construction, vegetation encroachment, or other activities that may compromise pipeline safety or violate operational agreements. Environmental baseline establishment creates comprehensive environmental monitoring that tracks normal conditions, seasonal variations, and environmental patterns that enable detection of unusual conditions or environmental changes that may indicate pipeline leaks or operational problems.

Leak detection and threat assessment at step 2002 provides immediate identification of pipeline integrity failures and environmental hazards through advanced sensor capabilities and automated analysis algorithms that enable rapid response to pipeline emergencies. Chemical sensor detection employs specialized hydrocarbon detection systems that automatically identify natural gas, crude oil, refined products, or other pipeline contents that may indicate leak conditions while providing immediate alerts to pipeline operators and emergency response personnel. Thermal anomaly identification utilizes infrared imaging to detect temperature variations that may indicate pipeline leaks, equipment malfunctions, or operational problems while providing precise location information that supports immediate investigation and response efforts. Pressure variance analysis correlates sensor data with pipeline operational parameters to identify pressure anomalies, flow irregularities, or other operational indicators that may suggest integrity failures or developing problems requiring immediate attention. Emergency alert protocols implement immediate notification procedures that provide real-time alerts to pipeline control centers, emergency response agencies, and regulatory authorities while ensuring rapid response coordination and appropriate emergency procedures activation.

Security monitoring and intrusion response at step 2003 provides comprehensive protection against unauthorized access, vandalism, and security threats that may compromise pipeline safety or operational continuity through persistent surveillance and automated threat detection capabilities. Perimeter security monitoring maintains continuous surveillance of pipeline facilities, valve stations, and critical infrastructure while detecting unauthorized personnel, vehicles, or activities that may indicate security threats or criminal activity. Unauthorized access detection employs motion detection algorithms and behavioral analysis to identify individuals or vehicles approaching pipeline infrastructure while distinguishing between authorized maintenance personnel and potential security threats based on access patterns and operational procedures. Vandalism and sabotage prevention provides immediate detection of suspicious activities including equipment tampering, unauthorized digging, or other activities that may damage pipeline infrastructure while enabling rapid response that prevents or minimizes security incidents. Law enforcement coordination establishes communication protocols with local law enforcement agencies while providing real-time threat information and coordination support that enables effective security response and criminal investigation procedures.

Maintenance coordination and operational optimization at step 2004 supports comprehensive pipeline management through predictive maintenance capabilities and operational intelligence that enhances pipeline efficiency while ensuring regulatory compliance and operational safety. Predictive maintenance alerts may be configured to analyze infrastructure condition data and operational trends to identify maintenance requirements before equipment failures occur while providing maintenance scheduling recommendations that optimize operational continuity and minimize maintenance costs. Operational efficiency reporting provides analysis of pipeline performance, operational trends, and efficiency metrics that support operational optimization and cost reduction while identifying opportunities for performance improvement and operational enhancement. Regulatory compliance support ensures adherence to federal and state pipeline safety regulations while providing documentation and reporting capabilities that support regulatory inspections and compliance verification procedures. System performance optimization continuously evaluates monitoring effectiveness and operational procedures while implementing improvements that enhance detection capabilities, reduce operational costs, and improve overall pipeline monitoring effectiveness based on operational experience and changing operational requirements.

The "Pipeline Integrity Monitoring" method demonstrates practical application of the autonomous drone swarm system for critical infrastructure protection that provides comprehensive pipeline monitoring and security capabilities while supporting operational efficiency and regulatory compliance for pipeline operators and utility companies. The method enables persistent pipeline monitoring that significantly exceeds conventional inspection capabilities while providing continuous operational coverage and immediate threat detection throughout operational-level timeframes and extensive pipeline networks.

FIG. 21 is a flow diagram illustrating an exemplary method for implementing an "Agricultural Crop Management" operational mode implemented by the autonomous drone swarm system, according to an embodiment. The method demonstrates a strategic-level commercial application designed to provide comprehensive precision agriculture support throughout growing seasons, typically executed over season-long operational cycles ranging from several weeks to months to support modern farming operations through advanced crop monitoring, pest management, and yield optimization capabilities.

According to the embodiment, the "Agricultural Crop Management" process begins at step 2100 with precision agriculture system configuration, which establishes comprehensive monitoring and management capabilities for large-scale farming operations and precision agriculture requirements. Farm boundary and crop definition establishes geographic parameters for designated agricultural areas including field boundaries, crop types, planting schedules, and management zones while defining monitoring priorities and operational requirements based on crop characteristics and farming objectives. Season-long monitoring setup develops comprehensive operational timelines that support continuous crop assessment throughout growing seasons while establishing surveillance schedules, data collection priorities, and coordination procedures necessary for sustained agricultural monitoring operations. Precision agriculture integration creates communication protocols and data sharing agreements with farm management systems, precision agriculture equipment, and agricultural decision support systems to ensure effective coordination with existing farming operations and technology platforms. Strategic-level planning coordination aligns drone monitoring capabilities with overall farm management strategies including planting schedules, harvest timing, market considerations, and operational efficiency objectives that support comprehensive agricultural planning and execution.

Multi-spectral crop assessment and mapping at step 2101 implements advanced imaging and analysis capabilities that provide comprehensive crop health monitoring and agricultural intelligence throughout growing seasons. Multi-spectral imaging deployment activates specialized sensor systems including visible light, near-infrared, and thermal imaging capabilities that enable detailed crop health assessment while providing robust vegetation analysis and agricultural monitoring capabilities that exceed conventional farming assessment methods. Crop health index calculation processes multi-spectral imagery through advanced algorithms that automatically calculate vegetation indices including Normalized Difference Vegetation Index, Enhanced Vegetation Index, and other agricultural metrics that quantify crop health, stress levels, and growth characteristics. Growth stage monitoring tracks crop development throughout growing seasons while identifying growth variations, development delays, and maturity patterns that support tactical farming decisions and harvest planning requirements. Field condition mapping creates comprehensive spatial analysis of crop conditions across entire farm operations while identifying management zones, productivity variations, and areas requiring specialized attention or intervention throughout the growing season.

Pest and disease detection and analysis at step 2102 provides early identification of agricultural threats and crop health problems through automated detection algorithms and pattern recognition capabilities that enable rapid intervention and treatment optimization. Automated pest identification can employ computer vision algorithms trained on agricultural pest databases to automatically detect insect infestations, pest damage patterns, and pest population levels while providing immediate alerts that enable rapid response and targeted treatment procedures. Disease pattern recognition analyzes crop imagery and spectral signatures to identify plant diseases, fungal infections, and other crop health problems while providing early detection capabilities that enable intervention before significant crop losses occur. Treatment zone delineation creates precise mapping of affected areas while optimizing treatment boundaries and application zones that minimize pesticide usage while maximizing treatment effectiveness through targeted application procedures. Targeted intervention recommendations analyze pest and disease information to provide specific treatment recommendations including pesticide selection, application timing, and treatment strategies that optimize crop protection while minimizing environmental impact and operational costs.

Irrigation and nutrient optimization management at step 2103 supports precision agriculture through water and nutrient management that maximizes crop productivity while minimizing resource consumption and environmental impact. Soil moisture analysis employs thermal imaging and multi-spectral analysis to assess soil moisture levels across farm areas while identifying irrigation requirements and moisture stress patterns that support optimal irrigation scheduling and water conservation practices. Nutrient deficiency detection analyzes crop spectral signatures and visual indicators to identify nitrogen, phosphorus, potassium, and micronutrient deficiencies while providing precise mapping of nutrient requirements across farm areas. Variable rate application mapping creates detailed prescription maps for fertilizer application, irrigation scheduling, and soil amendment procedures that optimize resource allocation while minimizing waste and environmental impact through precision application techniques. Resource optimization algorithms analyze crop requirements, soil conditions, and environmental factors to provide comprehensive management recommendations that maximize productivity while minimizing input costs and environmental impact throughout growing seasons.

Yield prediction and harvest coordination at step 2104 provides harvest planning and market optimization through advanced yield modeling and operational coordination that maximizes farm profitability and operational efficiency. Yield estimation modeling may combine crop health data, growth analysis, and historical yield information to provide accurate yield predictions that support harvest planning, market timing, and operational scheduling decisions throughout the growing season. Harvest timing optimization analyzes crop maturity, weather forecasts, and market conditions to provide optimal harvest scheduling recommendations that maximize crop quality and market value while minimizing harvest losses and operational costs. Equipment coordination provides harvest logistics support including field access planning, equipment scheduling, and transportation coordination that optimizes harvest efficiency while minimizing operational delays and resource conflicts. Market timing analysis correlates yield predictions with market conditions, price forecasts, and storage capabilities to provide strategic recommendations that maximize farm profitability through optimal marketing timing and sales strategies.

The "Agricultural Crop Management" method demonstrates practical application of the autonomous drone swarm system for precision agriculture operations that provide crop monitoring and management support while enhancing agricultural productivity and operational efficiency for modern farming operations. The method enables season-long agricultural monitoring that significantly exceeds conventional farming assessment capabilities while providing continuous operational coverage and detailed agricultural intelligence throughout strategic-level timeframes and extensive agricultural areas.

Exemplary Hardware Environment

In one exemplary embodiment, the command drone is implemented as a Queen prototype platform incorporating specific hardware and software configurations that demonstrate practical implementation of the autonomous swarm coordination capabilities described herein.

The Queen drone prototype incorporates a dual-module processing architecture optimized for autonomous swarm coordination and real-time decision-making. In some embodiments, a Mission-AI Module (e.g., i.e., processing system) implements an NVIDIA Jetson AGX Orin 64 GB system providing approximately 275 TOPS of AI performance with configurable power consumption ranging from 15-60 watts. This high-performance computing module provides sufficient computational capacity for large language model processing, multi-modal sensor fusion, and real-time mission planning algorithms. In some aspects, the Mission-AI Module specifically supports the LLaMA-13B architecture implementation described herein while maintaining power consumption within acceptable limits for sustained aerial operations.

According to the prototype embodiment, a Swarm-Control Module (i.e., navigation and control system) utilizes an ARK Jetson PAB Orin NX 16 GB NDAA-compliant bundle providing approximately 100 TOPS INT8 performance with 10-25 watt power consumption. This processing unit handles leader-follower control algorithms, mesh routing protocols, RAFT consensus logic, and telemetry coordination for a plurality of Worker drones. Capacity analysis demonstrates that policy inference requirements of approximately 5 GFLOPS at 10 Hz per Worker drone results in 0.5 TOPS total utilization for a plurality of Workers, representing less than one percent of available 100 TOPS capacity and enabling coordination of a large plurality of Workers while operating at less than fifteen percent utilization for the baseline ten-Worker configuration.

According to the prototype embodiment, a Flight Controller (i.e., navigation and control system) implements a Pixhawk 6X-class or CUAV X7 Pro NDAA-compliant system providing low-latency attitude, rate, and motor-mix control with triple-redundant IMU systems and dual barometers. The flight control system interfaces to twelve PWM/UAVCAN channels, dual GPS receivers, ADS-B transponder, and USB-C connectivity while maintaining 5V at 3A regulation capability. The flight controller serves as the primary autopilot while the Swarm-Control Orin NX functions as the companion computer, adding approximately 0.2 pounds to the overall system weight.

According to an embodiment, the prototype implements swappable lithium-ion smart battery packs utilizing 12-14 series configuration providing approximately 1200 watt-hours of energy storage. The electrical architecture utilizes 50V main bus for propulsion systems, 24V avionics rail, and 5V/12V auxiliary converters for subsystem power distribution. Peak load budget analysis indicates propulsion requirements of 1800 watts, Mission-AI module consumption of 60 watts, Swarm-Control module consumption of 25 watts, and sensors/communications consumption of 40 watts for total system power requirements below 2 kilowatts.

The power management system may comprise hot-swap capabilities enabling continuous operation during battery replacement procedures. The hot-swap buffer system requires two batteries for normal operation but enables battery replacement when one battery remains connected while the second battery is replaced, followed by replacement of the remaining battery after the first replacement is completed. High-current charging ports sized for 1C charging rate enable rapid battery restoration while robotic docking capabilities are deferred to Phase II development.

According to an embodiment, the prototype incorporates comprehensive sensor integration optimized for multi-modal environmental awareness and target identification. Voice command capabilities can utilize a far-field four-microphone array with beam-forming digital signal processing operating at frequencies above 20 kHz. Terrain-aware self-positioning employs RGB global-shutter 12 megapixel cameras in 360-degree under-body mounting configuration, micro-LiDAR and photogrammetry systems with 20-meter range for immediate obstacle mapping, high-density mapping LiDAR and photogrammetry for modular payload applications, and thermal imaging systems equivalent to FLIR capabilities optimized for object detection in low-light and heat-optimized environments.

Target detection and positive identification capabilities utilize electro-optical/infrared dual-sensor gimbal systems providing 640×480 LWIR and 4K RGB imaging capabilities. Mesh networking implementation incorporates tri-band software-defined radio systems supporting S-band, C-band, and HF 3-30 MHz frequency ranges, eye-safe 30 milliwatt laser systems, and LED array visual LiFi capabilities. The HF link serves as the primary long-haul communication pathway utilizing narrow-band frequency-hopping protocols operating at 64 kilobits per second or higher data rates.

Local connectivity includes dual-band Wi-Fi 802.11ac and Bluetooth 5.2 capabilities for maintenance and pre-flight configuration procedures. The mesh network sustains aggregate user data rates of 300 megabits per second or higher to support ten (or more) simultaneous 720p30 H.265 video feeds at 3 megabits per second each plus telemetry margin requirements. Multi-modal fusion capabilities utilize 10 gigabit Ethernet connections to mission computing systems, four-lane CSI-2 camera interfaces, and CAN bus integration for LiDAR and photogrammetry system connectivity.

According to the prototype embodiment, the storage architecture implements 1 TB M.2 NVMe PCIe Gen4 drives shared across both processing modules via carrier backplane for operating system storage, container images, model weights, and operational logs. This storage system operates independently from the 2 TB buffer storage to ensure random-IO performance remains optimal during cache drive streaming operations. The storage system adds approximately 8 grams weight and consumes approximately 4 watts peak power consumption.

According to the prototype embodiment, internal networking utilizes 10 gigabit Ethernet or PCIe Gen4 bridge connections between Mission-AI and Swarm-Control modules with latency specifications below 2 microseconds. Thermal management implements dual heat-pipe systems with 60 millimeter blowers and airflow routing through dorsal chimneys to maintain junction temperatures below 75 degrees Celsius at 40 degrees Celsius ambient temperature.

Buffer storage provides rolling 8-hour sensor buffering and mission replay capabilities with sustained write bandwidth exceeding 1 gigabit per second without impacting inference latencies. The buffer storage system adds approximately 15 grams weight and consumes approximately 4 watts peak power while providing essential mission data preservation and replay capabilities for post-mission analysis and training applications.

This exemplary Queen drone prototype demonstrates practical implementation of the autonomous swarm coordination capabilities described herein while providing specific technical specifications that enable reproduction of the invention by persons skilled in the relevant arts.

Exemplary Computing Environment

FIG. 22 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IOT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance. There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. An autonomous drone swarm system comprising:
at least one command drone comprising an artificial intelligence processor configured to:
process natural language commands from human operators into structured mission parameters;
autonomously generate mission plans based on environmental analysis and available drone resources; and
delegate tasks among subordinate drones based on drone capabilities and positioning;
a plurality of subordinate drones, each comprising autonomous processing capabilities for coordinated task execution;
a multi-modal communication system establishing encrypted communication links between drones using at least two different communication modalities to form a self-healing mesh network;
a distributed sensor integration system comprising multiple sensor types across the command drone and subordinate drones providing environmental awareness and target detection capabilities;
hierarchical coordination algorithms wherein:
the command drone processes natural language operator inputs and generates executable mission plans;
specific tasks are automatically assigned to subordinate drones based on mission requirements and drone status; and
real-time mission adaptation occurs based on environmental changes and operational feedback;
fault-tolerant operation protocols maintaining system coordination despite individual drone failures through automatic task redistribution and dynamic role reassignment;
wherein the artificial intelligence processor implements a large language model architecture configured to interpret voice commands, text instructions, and gesture recognition inputs, and wherein the processor converts high-level operator directives into executable mission parameters through contextual awareness algorithms that analyze current environmental conditions and available swarm resources.

2. The system of claim 1, wherein the multi-modal communication system comprises at least two of:
wireless fidelity communication channels implementing high-throughput local networking protocols for rapid data exchange and integration with existing network infrastructure;
radio frequency communication channels implementing software-defined radio transceivers with frequency-hopping spread spectrum protocols, Low Power Wide Area Network protocols for extended range communication, and Long Range Wide Area Network protocols for low-power long-range telemetry;
laser fidelity communication channels utilizing modulated laser transmission with automatic beam steering and atmospheric compensation for secure line-of-sight operations;
light fidelity communication channels using visible and near-infrared light modulation for covert, low-signature coordination messaging;
communication channels providing short-range protocols for local device integration and maintenance operations; and
visual communication channels employing computer vision-based optical signaling using light emitting diode pattern generation and recognition algorithms;
wherein the multi-modal communication system further comprises a Primary, Alternate, Contingency, Emergency protocol hierarchy implementing conditional fallback logic and dynamic protocol adaptation based on terrain constraints, threat assessment, and mission requirements.

3. The system of claim 1, wherein the hierarchical coordination protocols implement a Queen-Worker architecture where each command drone coordinates one or more subordinate drones, and wherein multiple command drones can collaborate to form larger operational units with automatic leader election using distributed consensus algorithms when command drones become unavailable.

4. The system of claim 1, wherein the distributed sensor integration system comprises:
electro-optical cameras providing high-resolution visual surveillance and target identification;
infrared thermal imaging systems enabling night operations and heat signature detection;
light detection and ranging and photogrammetry systems providing three-dimensional environmental mapping and obstacle detection; and
chemical detection sensors configured for nuclear, biological, and chemical threat identification.

5. The system of claim 1, further comprising configurable operational modes comprising:
tactical operations with configurable time and spatial coverage parameters optimized for immediate response scenarios and localized coordination requirements;
operational missions with configurable time and spatial coverage parameters optimized for sustained regional coverage and persistent surveillance requirements; and
strategic deployments with configurable time and spatial coverage parameters optimized for long-term autonomous operations across extensive geographic areas with automated logistics coordination;
wherein the operational modes implement dynamic parameter adjustment based on mission requirements, available resources, and environmental conditions.

6. The system of claim 1, wherein the fault-tolerant operation protocols comprise:

continuous health monitoring algorithms tracking communication status, hardware performance, and navigation accuracy of all drone platforms;

anomaly detection systems automatically identifying equipment failures and operational problems;

automatic task redistribution algorithms reallocating failed drone tasks to operational platforms; and emergency communication protocols providing backup coordination procedures for catastrophic network failures.

7. The system of claim 1, wherein the subordinate drones implement federated learning protocols comprising:

local artificial intelligence inference systems generating machine learning model weight updates based on operational experience;

compressed learning data transmission systems sending model parameter updates to the command drone without transmitting raw sensor data; and model aggregation algorithms at the command drone that improve overall swarm artificial intelligence capabilities and distribute updated models back to the subordinate drones.

8. The system of claim 1, wherein each drone further comprises autonomous navigation systems comprising:

global positioning system (GPS) or global navigation satellite system receivers with anti-jamming capabilities for precision positioning in standard operational environments;

inertial navigation systems enabling continued operation in GPS-denied environments;

on-board computation and correction systems comprising:

preloaded local maps of operational areas comprising one or more of terrain elevation data, obstacle locations, and geographic reference points;

algorithms for calculating position updates based on last known reliable position combined with real-time telemetry data comprising altitude, speed, bearing, and wind correction factors; and map-referenced position calculation that correlates sensor data with preloaded geographic features;

collaborative navigation protocols utilizing mesh network communication to share computed positions and telemetry data across the swarm for distributed position verification and drift correction; and terrain analysis algorithms for identifying optimal vantage points and tactical positioning locations based on preloaded map data and real-time environmental assessment.

9. The system of claim 1, wherein the real-time mission adaptation comprises:

environmental monitoring algorithms continuously assessing operational conditions and threat levels;

resource optimization algorithms dynamically adjusting task assignments based on drone availability and performance status;

tactical repositioning protocols automatically modifying drone formations and coverage patterns based on mission requirements; and mission parameter updating systems modifying operational objectives while maintaining overall mission effectiveness and coordination.

10. A method for autonomous drone swarm coordination comprising the steps of:

processing natural language commands from human operators into structured mission parameters at a command drone using artificial intelligence algorithms;

autonomously generating mission plans based on environmental analysis and available drone resources;

delegating tasks among a plurality of subordinate drones based on drone capabilities and positioning within a hierarchical command structure;

establishing encrypted communication links between drones using at least two different communication modalities to form a self-healing mesh network;

integrating sensor data from multiple sensor types distributed across the command drone and subordinate drones to provide environmental awareness and target detection capabilities;

implementing hierarchical coordination algorithms wherein:

the command drone processes natural language operator inputs and generates executable mission plans;

specific tasks are automatically assigned to subordinate drones based on mission requirements and current drone operational status; and real-time mission adaptation occurs based on environmental changes and operational feedback;

maintaining system coordination despite individual drone failures through automatic task redistribution and dynamic role reassignment; and executing assigned tasks autonomously at subordinate drones while maintaining coordination with command drone mission objectives;

wherein processing natural language commands comprises the steps of:

detecting input modality from voice commands, text instructions, or gesture recognition inputs;

implementing large language model processing to interpret high-level operator directives;

analyzing current environmental conditions and available swarm resources through contextual awareness algorithms; and converting operator directives into executable mission parameters based on operational context and resource availability.

11. The method of claim 10, wherein establishing encrypted communication links comprises at least two of:

configuring wireless fidelity communication channels for high-throughput local networking and rapid data exchange with existing network infrastructure;

implementing radio frequency communication using software-defined radio transceivers with frequency-hopping spread spectrum protocols, Low Power Wide Area Network protocols for extended range communication, and Long Range Wide Area Network protocols for low-power long-range telemetry;

establishing laser fidelity optical communication channels utilizing modulated laser transmission with automatic beam steering and atmospheric compensation for secure line-of-sight operations;

activating light fidelity communication channels using visible and near-infrared light modulation for covert, low-signature coordination messaging;

configuring communication channels providing short-range protocols for local device integration and maintenance operations; and implementing visual communication channels using light emitting diode pattern generation and computer vision recognition algorithms;

wherein the method further comprises executing Primary, Alternate, Contingency, Emergency protocol hierarchy procedures including conditional fallback logic and dynamic protocol adaptation based on terrain constraints, threat assessment, and mission requirements.

12. The method of claim 10, wherein implementing hierarchical coordination protocols comprises the steps of:

establishing Queen-Worker coordination architecture with each command drone managing one or more subordinate drones;

enabling collaboration between multiple command drones for larger operational areas;

implementing distributed consensus algorithms for automatic leader election when command drones become unavailable; and maintaining coordination hierarchy while adapting to changing operational requirements and drone availability.

13. The method of claim 10, wherein integrating sensor data comprises the steps of:

collecting visual surveillance data from electro-optical cameras for target identification;

gathering thermal imaging data from infrared systems for night operations and heat signature detection;

obtaining three-dimensional environmental mapping data from light detection and ranging and photogrammetry systems for obstacle detection;

monitoring for nuclear, biological, and chemical threats using specialized detection sensors; and fusing multi-modal sensor data to create comprehensive environmental awareness and threat assessment.

14. The method of claim 10, further comprising configuring operational modes by:

implementing tactical operations with operator-configurable time duration and spatial coverage parameters optimized for immediate response scenarios and localized coordination requirements;

executing operational missions with operator-configurable temporal and spatial parameters optimized for sustained regional coverage and persistent surveillance requirements;

conducting strategic deployments with operator-configurable mission duration and geographic area parameters optimized for long-term autonomous operations across extensive areas with automated logistics coordination;

dynamically adjusting operational parameters based on mission requirements, available resources, and environmental conditions; and optimizing space-time trade-offs by concentrating force deployment within defined spatial areas to reduce mission duration or extending coverage areas for sustained operations based on operational objectives.

15. The method of claim 10, wherein maintaining system coordination despite individual drone failures comprises the steps of:

continuously monitoring health status including communication connectivity, hardware performance, and navigation accuracy of all drone platforms;

automatically detecting equipment failures and operational problems using anomaly detection algorithms;

redistributing tasks from failed drones to operational platforms while maintaining mission continuity; and activating emergency communication protocols when primary coordination systems become unavailable.

16. The method of claim 10, further comprising implementing federated learning by:

generating machine learning model weight updates at subordinate drones based on local operational experience and sensor data analysis;

transmitting compressed model parameter updates to the command drone without sending raw sensor data;

aggregating learning updates from multiple subordinate drones at the command drone to improve overall swarm artificial intelligence capabilities; and distributing updated artificial intelligence models back to subordinate drones to enhance swarm-wide performance.

17. The method of claim 10, further comprising autonomous navigation by:

obtaining precision positioning using global positioning system (GPS) or global navigation satellite system receivers with anti-jamming capabilities in standard operational environments;

maintaining navigation capability in GPS-denied environments using inertial navigation systems for baseline positioning;

implementing on-board computation and correction procedures comprising:

preloading local maps of operational areas including terrain elevation data, obstacle locations, and geographic reference points;

establishing last known reliable position as navigation baseline;

continuously processing real-time telemetry data including altitude measurements, speed and acceleration data, bearing information, and wind correction factors; and calculating position updates by correlating movement data with preloaded geographic features and landmarks;

executing collaborative navigation protocols by:

sharing computed position data and telemetry measurements across the mesh communication network;

implementing distributed position verification and drift correction algorithms; and enhancing individual drone positioning accuracy through swarm-wide data fusion; and analyzing terrain characteristics using preloaded map data combined with real-time environmental assessment to identify optimal vantage points and tactical positioning locations.

18. The method of claim 10, wherein performing real-time mission adaptation comprises the steps of:

continuously monitoring environmental conditions and threat levels using distributed sensor networks;

dynamically optimizing resource allocation and task assignments based on current drone availability and performance status;

automatically repositioning drones and modifying coverage patterns based on changing mission requirements and tactical conditions; and updating mission parameters and operational objectives while maintaining overall mission effectiveness and swarm coordination.

* * * * *